(12) United States Patent
Martinez-Barbreau

(10) Patent No.: US 12,507,698 B2
(45) Date of Patent: *Dec. 30, 2025

(54) USE OF AN EXTRACT OF PART OF A ROCKET PLANT FOR STIMULATING THE DEFENSES OF PLANTS AND TREES AND ASSOCIATED COMPOSITION AND METHOD

(71) Applicant: Christelle Martinez-Barbreau, Cazevieille (FR)

(72) Inventor: Christelle Martinez-Barbreau, Cazevieille (FR)

( * ) Notice: Subject to any disclaimer, the term of this patent is extended or adjusted under 35 U.S.C. 154(b) by 307 days.

This patent is subject to a terminal disclaimer.

(21) Appl. No.: 16/718,226

(22) Filed: Dec. 18, 2019

(65) Prior Publication Data

US 2020/0128833 A1 Apr. 30, 2020

Related U.S. Application Data

(63) Continuation-in-part of application No. PCT/FR2018/051473, filed on Jun. 19, 2018, and a continuation-in-part of application No. 15/505,605, filed on Feb. 21, 2017, now Pat. No. 11,800,873.

(30) Foreign Application Priority Data

| Jun. 19, 2017 | (EP) | 17176535 |
| Jun. 19, 2017 | (FR) | 1755569 |
| Jun. 19, 2017 | (FR) | 1755574 |
| Jun. 19, 2017 | (FR) | 1755576 |
| Jul. 11, 2017 | (FR) | 1756568 |

(51) Int. Cl.
*A01N 65/00* (2009.01)
*A01G 7/06* (2006.01)
*A01G 25/02* (2006.01)

(52) U.S. Cl.
CPC .............. *A01N 65/00* (2013.01); *A01G 7/06* (2013.01); *A01G 25/023* (2013.01)

(58) Field of Classification Search
CPC . A01G 7/06; A01N 65/00; C05F 11/00; C05F 11/10
USPC ............................................... 504/118
See application file for complete search history.

(56) References Cited

U.S. PATENT DOCUMENTS

| 2006/0111238 A1* | 5/2006 | Lazzeri | A01N 65/08 504/117 |
| 2009/0111861 A1* | 4/2009 | Harayama | C07D 257/04 548/253 |
| 2015/0037389 A1* | 2/2015 | Ragot | A23G 1/30 424/439 |
| 2017/0020132 A1* | 1/2017 | Erro Garces | C05G 3/00 |

FOREIGN PATENT DOCUMENTS

FR 3003131 A1 * 9/2014 ............. A01N 65/08

OTHER PUBLICATIONS

Areej Ali Baeshen, Morphological and elements constituent effects of alleopathic activity of some medical plants extracts on *Zea mays*, Int.J. Curr. Res.Aca. Rev. 2014; 2(4): 135-145.*
Hopkins, D. L.; Purcell, A. H. (Oct. 1, 2002). "Xylella fastidiosa: Cause of Pierce's Disease of Grapevine and Other Emergent Diseases". Plant Disease. 86 (10): 1056-1066. doi:10.1094/pdis.2002.86.10.1056 (Year: 2002).*
Bell, L; Wagstaff, C. "Glucosinolates, Myrosinase Hydrolysis Products, and Flavonols Found in Rocket (*Eruca sativa* and *Diplotaxis tenuifolia*)" Journal of Agricultural and Food Chemistry 2014 62 (20), 4481-4492 doi: 10.1021/jf501096x (Year: 2014).*
Machine translation of Martinez-Barbreau Espacenet [online]. 2014 [retrieved on Nov. 30, 2023]. Retrieved from internet :<URL https://translationportal.epo.org/emtp/translate/?ACTION=description-retrieval&COUNTRY=FR&ENGINE=google&FORMAT=docdb&KIND=A1&LOCALE=en_EP&NUMBER=3003131&SRCLANG=fr&TRGLANG=en > (Year: 2023).*

* cited by examiner

*Primary Examiner* — Ali Soroush
*Assistant Examiner* — Afua Bamfoaa Boateng
(74) *Attorney, Agent, or Firm* — Patshegen IP; Moshe Pinchas

(57) ABSTRACT

The method for stimulating the defenses of a plant or tree against an infection of bacterium or fungus comprises the application on the plant or tree of an aqueous extract from at least leaves of a Rocket plant. The application on the plant or tree is achieved by foliar spray. The extract is obtained by grinding the Rocket plants in an aqueous medium, filtering the ground material obtained and recovering the liquid extract of Rocket plants obtained after filtering.

20 Claims, 23 Drawing Sheets

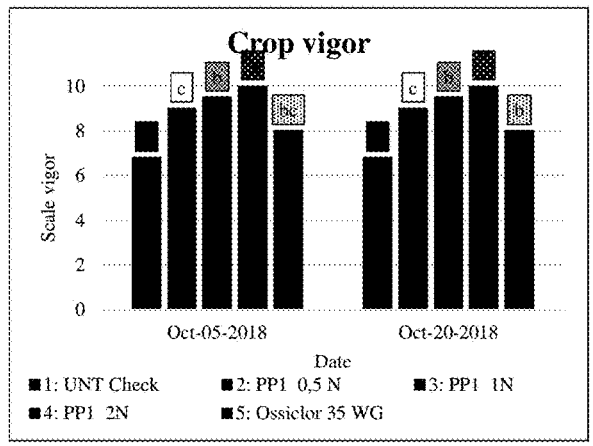
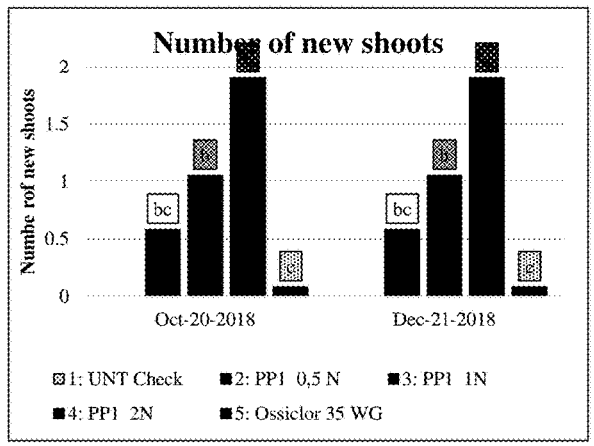
Figure 25	Figure 26
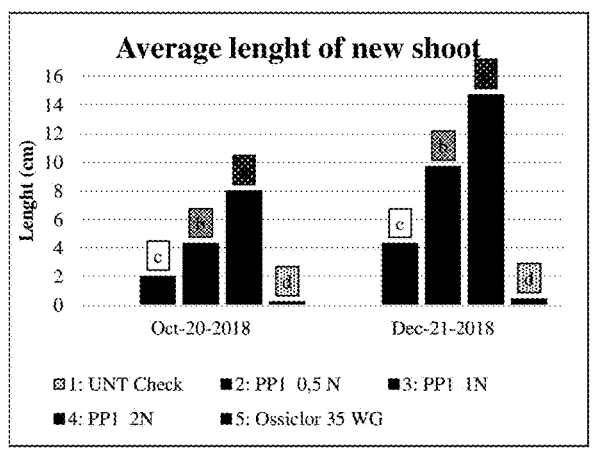
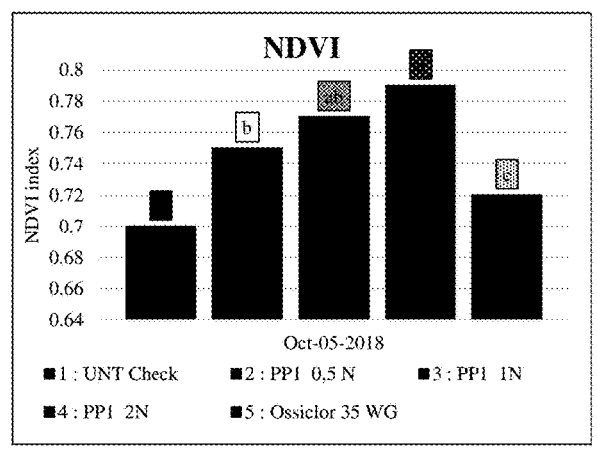
Figure 27	Figure 28

USE OF AN EXTRACT OF PART OF A ROCKET PLANT FOR STIMULATING THE DEFENSES OF PLANTS AND TREES AND ASSOCIATED COMPOSITION AND METHOD

TECHNICAL FIELD

The present invention relates to the use of an extract of a Rocket plant for stimulating the defenses of plants and trees, associated composition and method. The present invention aims to reduce the effects of an attack by a pathogenic element on a plant or a tree, in order to, at least, enable the plant or tree to continue to grow properly despite this infection, surpassing the disease, i.e. by allowing the plant or the tree to develop despite the pathogenic agent, by reducing or eliminating the impact of the pathogenic agent. The extract of a rocket plant can also, in certain uses, allow the plant to eradicate certain pathogenic agents. This use can be curative or preventive.

In particular, it concerns the treatment of:
plants and trees infected by *Xylella fastidiosa* bacteria, in particular the following plants and trees:
   Myrtle-leaf milkwort,
   Grape vines,
   Olive trees,
   Citrus trees,
   Oleander,
   Almond trees,
   Coffee trees,
   Peach trees and stone fruit trees,
   Oak trees,
   Lavender,
   Rosemary, and
   Broom;
plants of the *Actinidia* genus infected by *Pseudomonas syringae* pv *actinidiae* bacteria;
trees infected by *Xantomonas arboricola* pv *juglandis* bacteria, in particular walnut trees, or by *Xanthomonas arboricola* pv. *Pruni* bacteria, especially *Prunus* spp., and in particular fruit/nut trees such as apricot trees, almond trees, cherry trees, peach trees, plum trees, *P. salicina*, cherry laurel and other exotic or ornamental *Prunus* species, including *P. davidiana* and *P. laurocerasus*;
pear trees infected by Pear Decline *Phytoplasma* bacteria or *Candidatus Phytoplasma pyri*;
an attack by *Candidatus Phytoplasma solani* bacteria on grape vines, lavender, potato plants, tomato plants, aubergine plants, pepper plants and tobacco plants;
grape vines attacked by downy mildew (*Plasmapora viticola*), as well as potato plants and tomato plants (infected by *Phytophtora infestans*), citrus trees (infected by *phytophtora citrophtora*), pear trees and apple trees (infected by *Phytophtora cactorum*), or artichokes (infected by *Bremia lactucae*); or
rose bushes and grape vines attacked by powdery mildew (oidium), fungi respectively known as *Podosphaera pannosa* and *Erysiphe necator*, formerly *Uncinula necator*, and also tomato plants, lettuces, cucumbers, strawberry plants, raspberry plants, currant bushes, peach trees, pear trees, privet, carnations infected by oidium.

In crop protection, the future no longer lies with synthetic pesticides. They will have to be progressively replaced by more natural products, able to overcome pathogenic agents and palliate the well-known adverse effects of toxicity and damage to the environment. Society is increasingly reluctant to bear their heavy ecological and health costs.

Social and regulatory pressure to reduce the use of chemical pesticides continues to rise. Many farmers seek products that are more environmentally friendly, sustainably applicable in new agricultural systems, simple to use and that contribute to a positive image for their produce. Increasingly, consumers want wholesome food, without the harmful impacts of pesticides that have become known in recent years.

There are a number of reasons for the disparity that still exists between the rejection of chemical pesticides and the availability of more environmentally-friendly products. More specifically, but non-exhaustively, the following reasons are mentioned most frequently:
   Commercial biopesticide production is more difficult;
   The formulation of biopesticides (limited stability);
   The effectiveness of biopesticides (rarely equivalent to that of synthetic chemical molecules);
   Financing for biopesticide research; and
   The cost of approvals, which are very expensive.

The known effects of using rocket plants in the fight against pathogenic agents are detailed below. In the field of plant protection against pathogenic agents, the literature reports several actions involving rocket (*Eruca sativa*):
   Solvent extraction of bioactive compounds from the leaves, seeds, flowers and roots of rocket (*Eruca sativa*) allows an in vitro antimicrobial activity to be observed (Solana et al., 2014; Koubaa et al., 2015). This antimicrobial activity has been studied for both gram-positive and gram-negative bacteria. The results show a gradient of in vitro effectiveness and significant differences depending on the solvents used.

Compounds derived from glucosinolates (GLS), produced during hydrolysis catalyzed by the enzyme myrosinase (MYR), have also been shown to have antimicrobial actions. In the presence of the MYR enzyme, the GLS are hydrolyzed with the formation of β-D-glucose, sulfate ions, and certain compounds such as isothiocyanates, nitriles, or thiocyanates.

In vitro, isothiocyanates have shown cytotoxic properties towards nematodes (Lazzeri et al., 1993) and antifungal effects in the soil (Manici et al., 1997).

Obtaining isothiocyanates specifically entails a complex extraction based on solvents.

One of the solutions provided in the literature is therefore the direct use of seed powder containing at least one glucosinolate and at least one enzyme (glucosidic or thioglucosidic enzyme), which can be used as a soil improver, fighting soil parasites. To optimize the content of GLS and enzymes, the seeds are de-oiled at ambient temperature to protect the GLS/enzyme complex. The seed powder obtained in this way can be spread in the soil. Contact with water initiates the hydrolysis of the compounds, and also the cytotoxic action against parasites. In this context, *Eruca sativa* seed powder has been cited as one of the examples that can have these characteristics (Lazzeri et al., 2004).

Biofumigation is a biological method aimed at reducing the number of pathogens, pests and weed seeds in the soil. It is based on the use of plants rich in glucosinolates, which mainly belong to the Cruciferae family. When these plants decompose, the glucosinolates are transformed into isothi- and thiocyanates through the action of the myrosinase enzyme. The isothi- and thiocyanates are volatile and are toxic to certain soil organisms. In this regard, it is also known from the literature that burying entire *Eruca sativa* plants in the soil, combined with synthetic nematicides, would make it possible to keep the invasion of nematodes (*Meloidogyne chitwoodi, Meloidogyne hapla, Meloidogyne incognita*) in check (Riga et al., 2006). In this specific case, *Eruca sativa* would serve as nematode traps and a reservoir of citotoxic compounds.

SUBJECT OF THE INVENTION

The present invention aims to remedy all or part of these drawbacks.

To this end, according to a first aspect, the present invention envisages the use of an extract of at least a part of Rocket plants, preferably chosen from the group of rocket plants of the *Eruca* (*Eruca sativa, Eruca vesicaria*, etc.), *Diplotaxis* (*Diplotaxis erucoides, Diplotaxis tenuifolia, Diplotaxis muralis*, etc.), *Bunias* (*Bunias erucago, Bunias orientalis*, etc.), *Erucastrum* (*Erucastrum nasturtiifolium, Erucastrum incanum*, etc.) and *Cakile* genuses, in order to stimulate, by application, the defenses of plants or trees and reduce the effects of:

Xylella fastidiosa bacteria on myrtle-leaf milkwort, grape vines, olive trees, citrus trees, oleander, almond trees, coffee trees, peach trees and stone fruit trees, oak trees, lavender, rosemary, or broom,

*Pseudomonas syringae* pv *actinidiae* bacteria on plants of the *Actinidia* genus,

*Xantomonas arboricola* pv *juglandis* bacteria on walnut trees,

*Xanthomonas arboricola* pv. *Pruni* bacteria on *Prunus* spp., and preferably the following group of fruit/nut trees: apricot trees, almond trees, cherry trees, peach trees, plum trees, *P. salicina*, cherry laurel and other exotic or ornamental *Prunus* species, including *P. davidiana* and *P. laurocerasus*, Pear Decline *Phytoplasma* bacteria or *Candidatus Phytoplasma pyri* on pear trees,

*Candidatus Phytoplasma solani* bacteria on grape vines, lavender, potato plants, tomato plants, aubergine plants, pepper plants and tobacco plants,

*Plasmapora viticola* fungus on grape vines, or *Phytophtora infestans* on potato plants and tomato plants, or *phytophtora citrophtora* on citrus trees, or *Phytophtora cactorum* on pear trees and apple trees, or *Bremia lactucae* on artichokes. All these pathogenic fungi are responsible for mildew, or oidium-type fungi such as *Podosphaera pannosa* on rose bushes, and *Erysiphe necator*, formerly *Uncinula necator*, on grape vines, and oidia on tomato plants, lettuces, cucumbers, strawberry plants, raspberry plants, currant bushes, peach trees, pear trees, privet, carnations.

It is noted here that rocket ("*Eruca sativa*") is an annual plant of the Brassicaceae (or Cruciferae) family, with white or yellowish flowers veined with brown or purple, whose generally elongated, indented leaves have a pungent peppery flavor. Depending on the region, rocket is called rucola, arugula, rouquette or riquette. Riquette is a wild form of rocket with very tasty small leaves. Other similar plants, of the *Dilotaxis* genus, are called rocket. When they need to be differentiated, *Diplotaxis* rockets are called "wild rocket" and *Eruca* rockets "garden rocket". The present invention is not restricted to this type of rocket, and extends beyond *Eruca sativa*. Rocket's description can also vary depending on origin and regions. It should be noted that the common name of rocket also includes Rucola and Arugula.

Preferably, the rocket utilized by the present invention is of the type *Eruca* (*Eruca sativa, Eruca vesicaria*, etc.), *Diplotaxis* (*Dilotaxis erucoides, Dplotaxis tenuifolia, Dplotaxis muralis*, etc.), *Bunias* (*Bunias erucago, Bunias orientalis*, etc.), *Erucastrum* (*Erucastrum nasturtiifolium, Erucastrum incanum*, etc.) or *Cakile* (*Cakile maritima*, etc.). In the context of the present invention, Rocket includes all these types, which can be mixed. The rocket mentioned below belongs to the Capparales species and the Brassicaceae family.

It is also noted that the active principle (or active compound, active ingredient, or active substance) is all the ingredients of products that stimulates the defenses of the plants and trees mentioned above infected by one of the pathogenic agents mentioned above.

Such a composition can consist of a total crude extract obtained by grinding and extraction from the rocket plant, of a fraction enriched in the active compound(s) of such a total extract, or of one or more active compound(s) in a mixture. Such a composition advantageously makes it possible, in an effective amount, to combat the symptoms of the infection of a plant or tree mentioned above by a bacteria or fungus mentioned above.

It is noted that the reduction of the effects of pathogenic agents on the plants or trees includes, in certain cases, the total or partial reduction of the symptoms, even the eradication of the pathogenic agent. This is because, when their defense system is functioning (in particular thanks to the stimulation obtained by utilizing the invention), the plants and trees have the ability to defeat a parasite. The use of the extract of rocket plant that is the subject of the present invention aims to stimulate what the plants can already do, but don't do in the case of "sensitivity" because they don't recognize their attacker. The decrease in pathology thus appears in some examples of the description.

In some embodiments, the application on the plant or tree is achieved by foliar spray, watering the soil, drop-by-drop irrigation, use in hydroponics, seed treatment and/or seed coating.

In some embodiments, the application on the plant or tree is achieved with a dilution of the composition in water between 2 g/L and 150 g/L expressed in grams of plants on which the extraction was carried out per liter of product.

In some embodiments, the application on the plant or tree is achieved with a dilution of the composition in water between 5 g/L and 70 g/L expressed in grams of plants on which the extraction was carried out per liter of product.

In some embodiments, said extract of at least a part of Rocket plants is a liquid extract of Rocket of the *Eruca* genus obtained from ground material of said Rocket plants, and:

said extract of at least a part of Rocket plants includes at least Rocket leaves, preferably mainly leaves, and the method making it possible to obtain said liquid extract comprises the following steps:

a) a step of grinding said Rocket plants of the *Eruca* genus in an aqueous medium;

b) filtering the ground material obtained; and c) recovering the liquid extract of Rocket of the *Eruca* genus obtained after filtering.

Here, the term "mainly includes" means including at least (for example) 75-80% of Rocket leaves by weight, for example dry, relative to the total weight of rocket, before mixing with the aqueous solvent.

In some embodiments, said extract of at least a part of Rocket plants is a liquid extract of Rocket of the *Eruca sativa* genus.

According to a second aspect, the present invention envisages a method for stimulating the defenses of plants or trees and reducing the effects of:

*Xylella fastidiosa* bacteria on myrtle-leaf milkwort, grape vines, olive trees, citrus trees, oleander, almond trees, coffee trees, peach trees and stone f will follow, made as an example that is in no way limiting, with reference to the drawings included in an appendix, in which.

Figure 6:
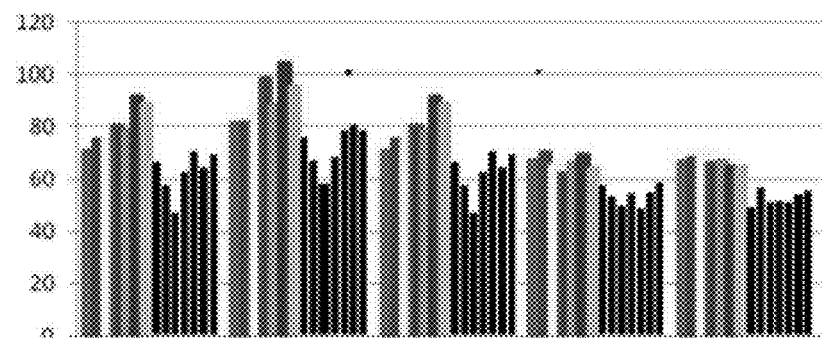
Figure 7:
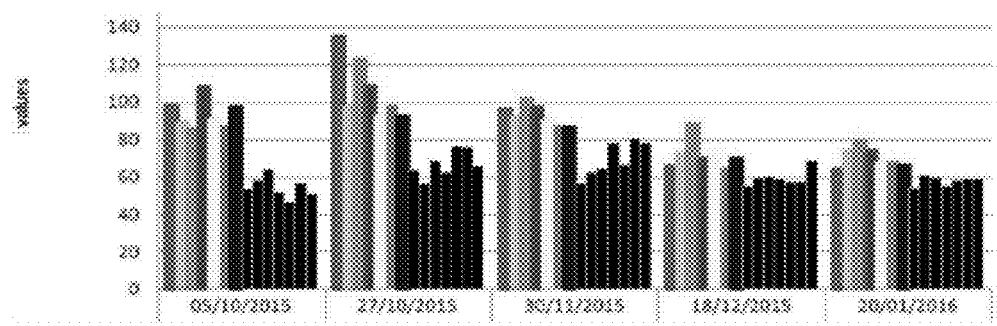
Figure 8:
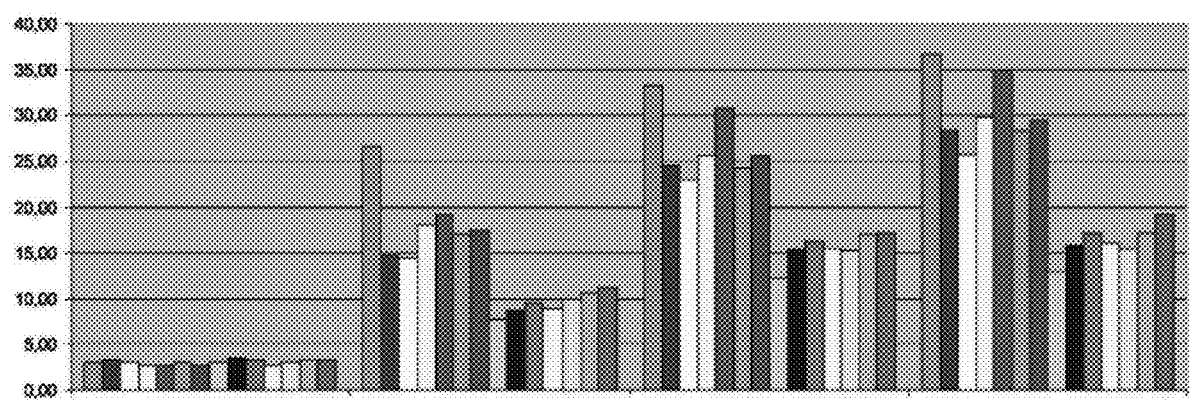
Figure 9:
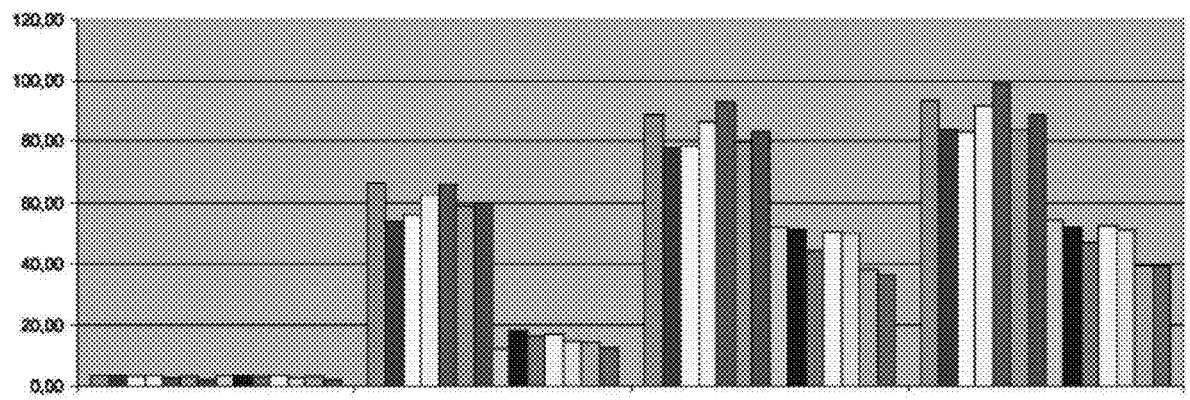
Figure 10:
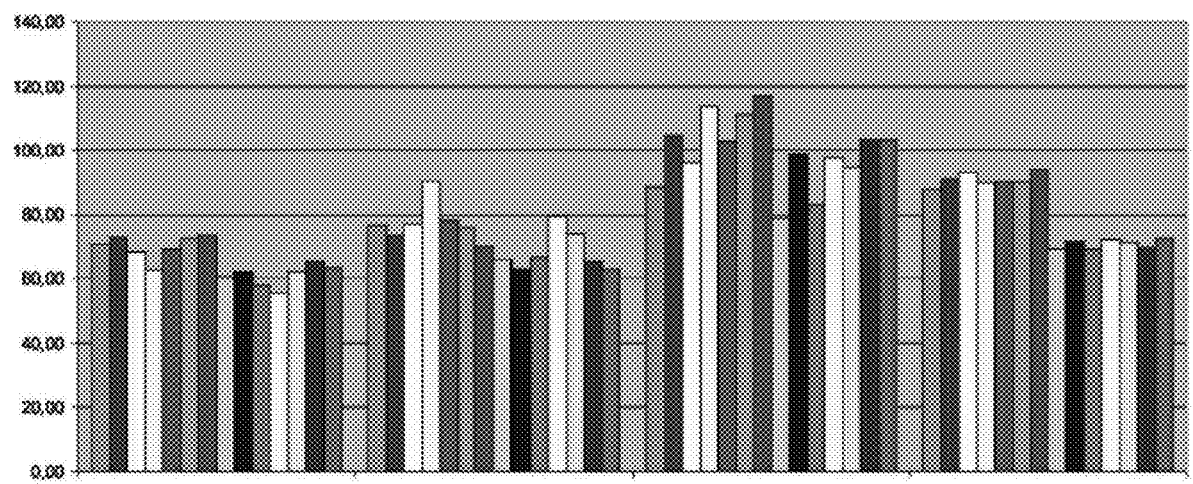
Figure 11:
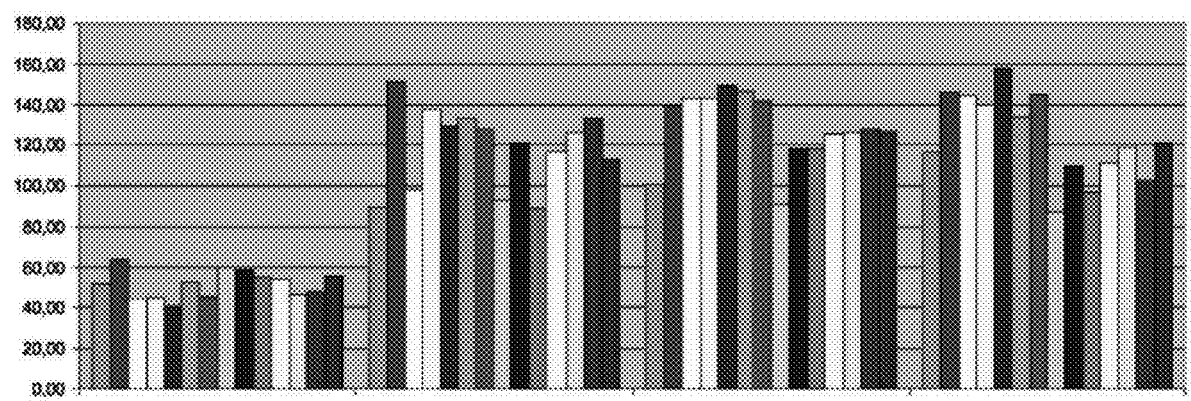
Figure 12:
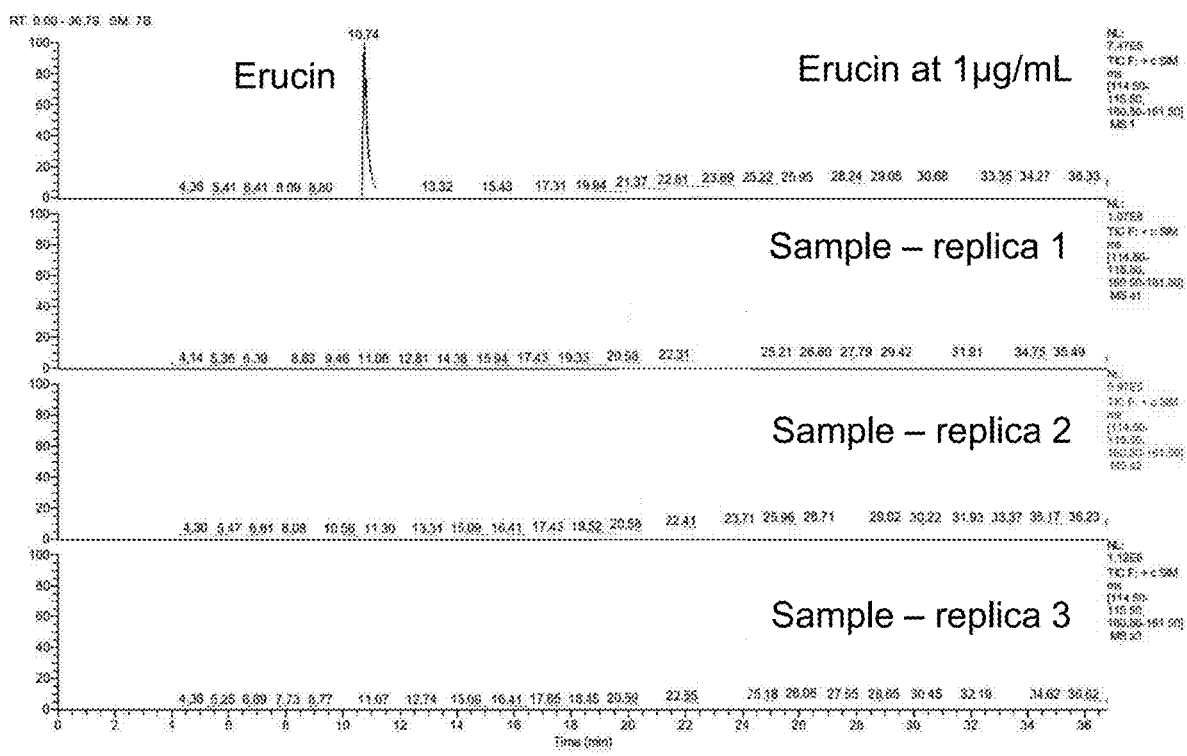
Figure 13:
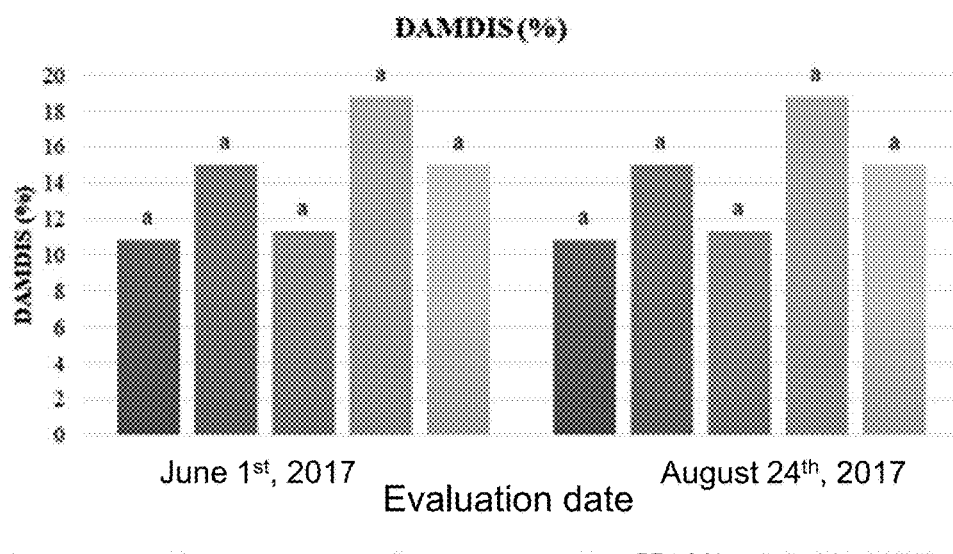
Figure 14:
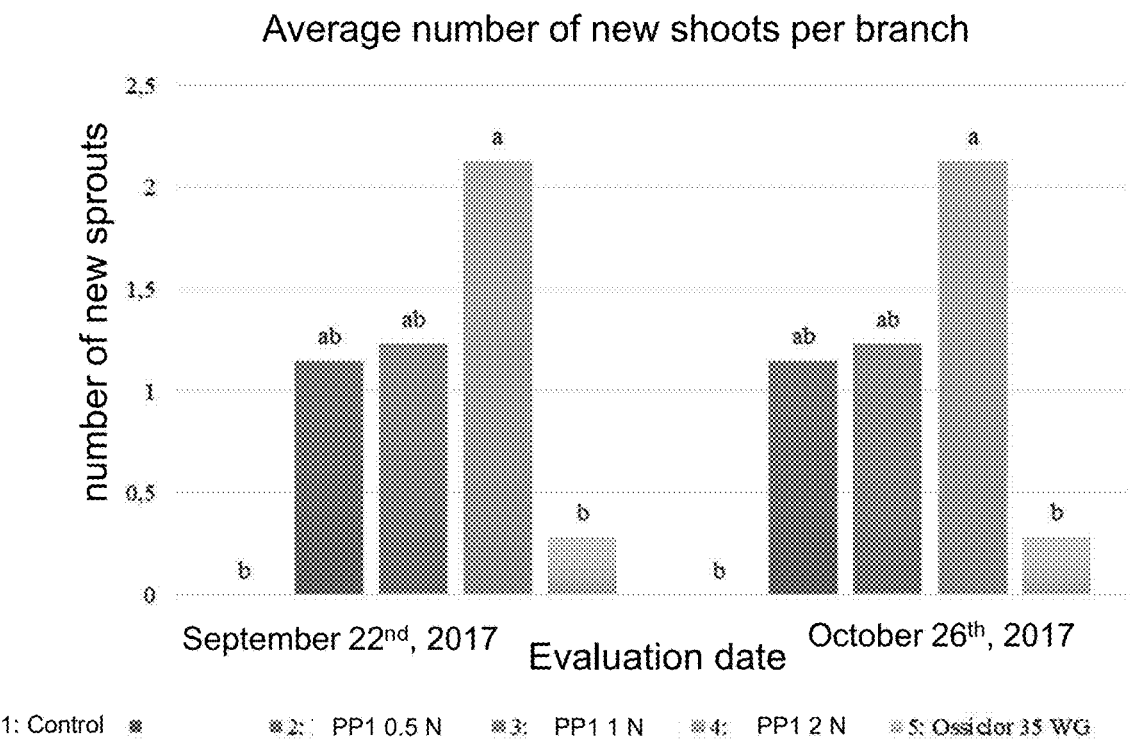
Figure 15:
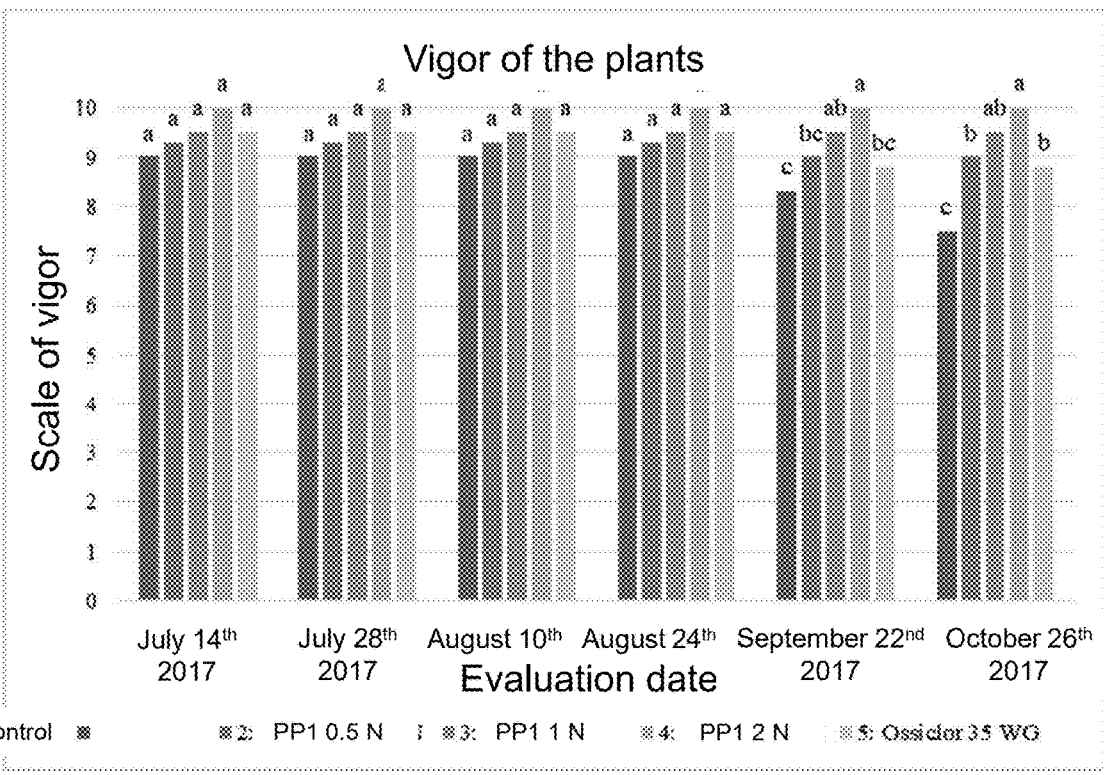
Figure 16:
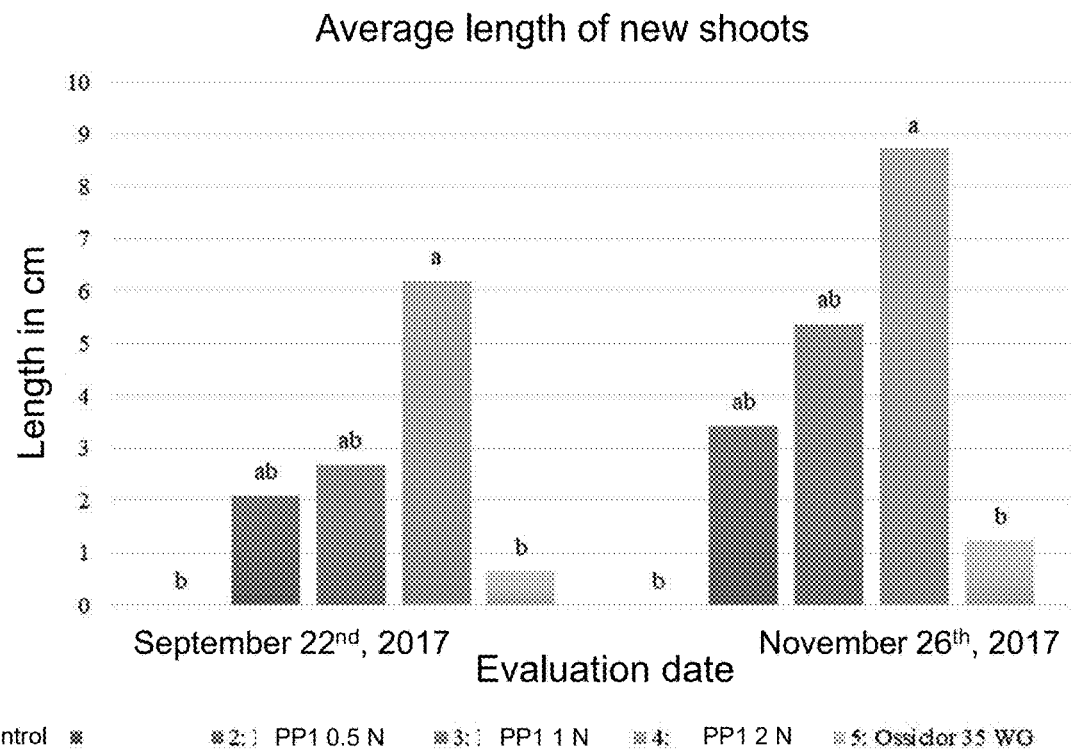
Figure 17:
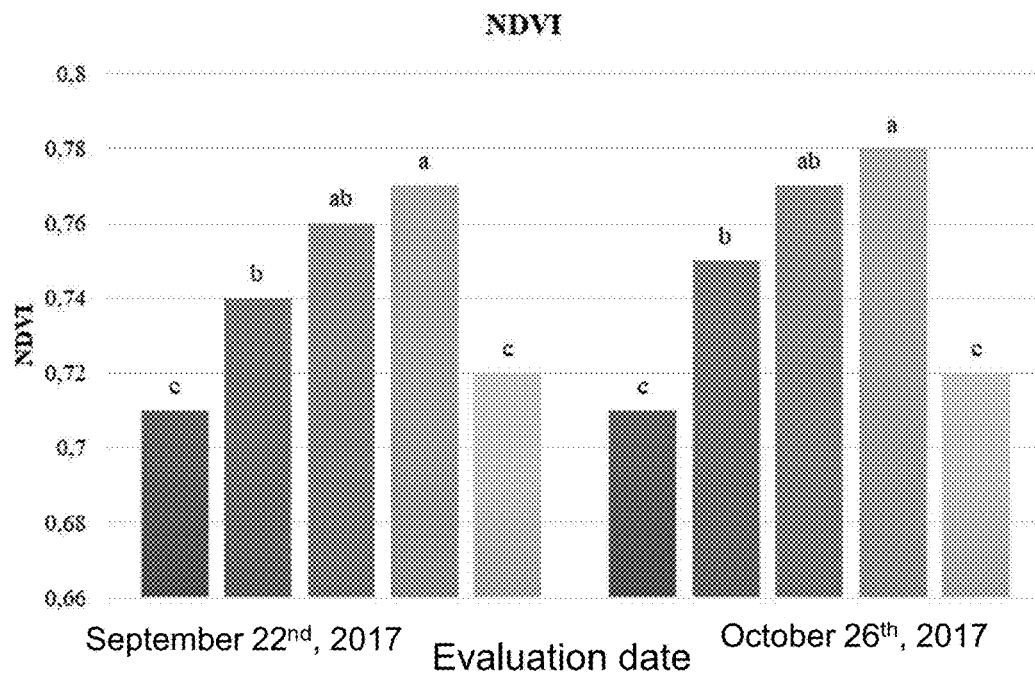
Figure 18:
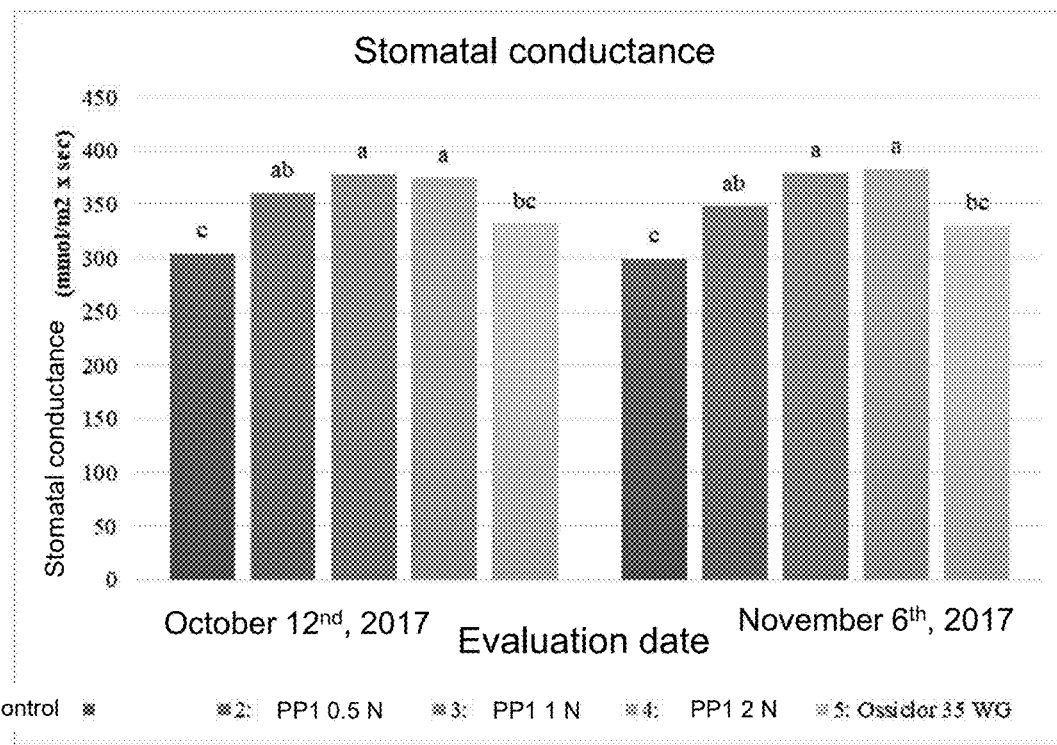
Figure 19:
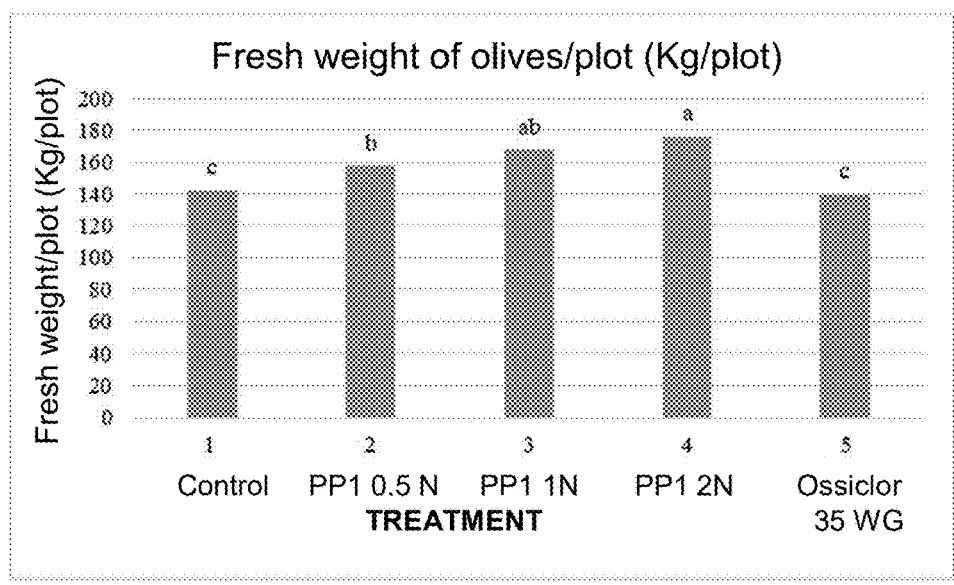
Figure 20:
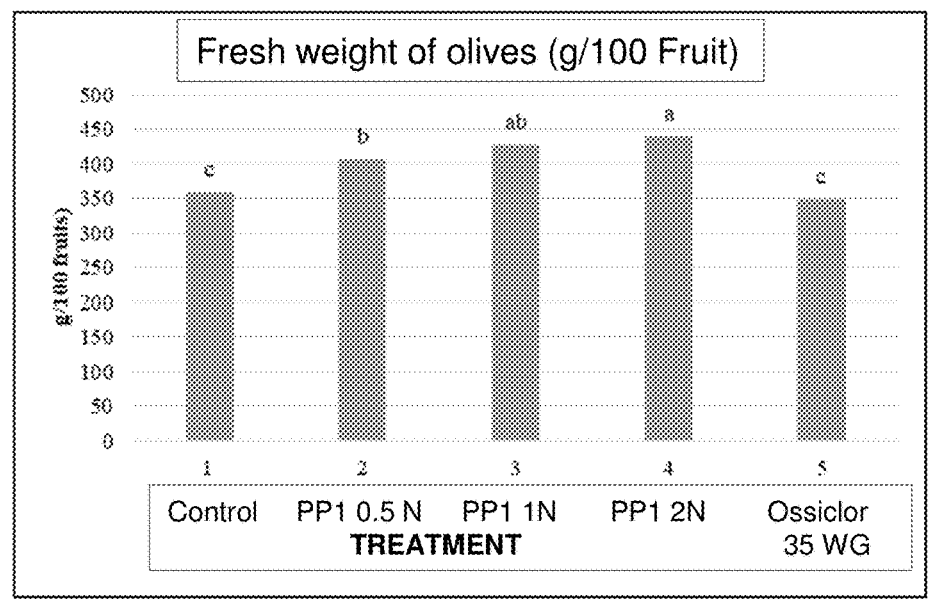
Figure 21:
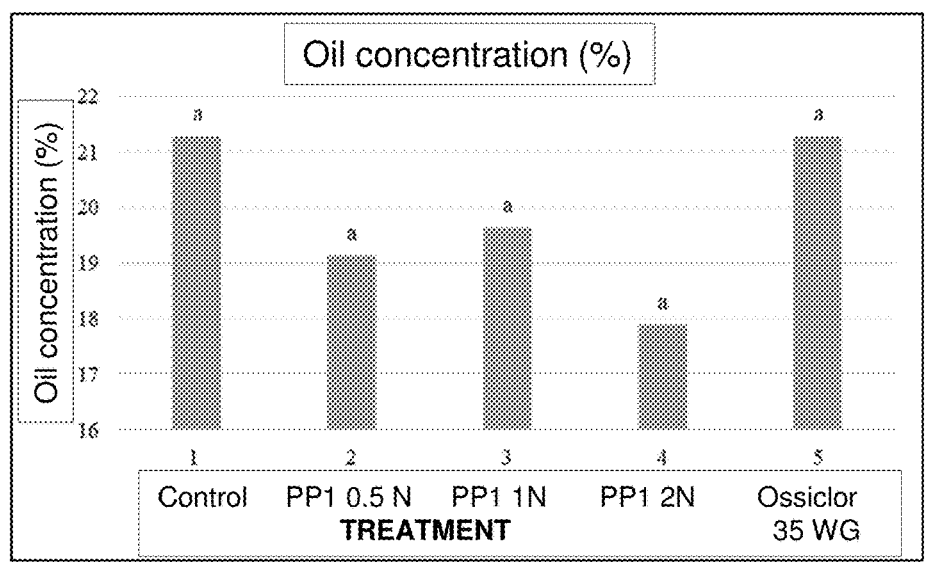
Figure 22:
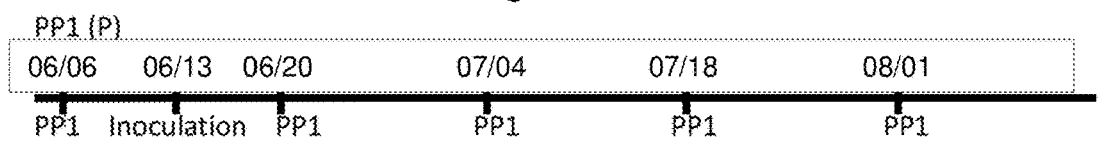
Figure 22:
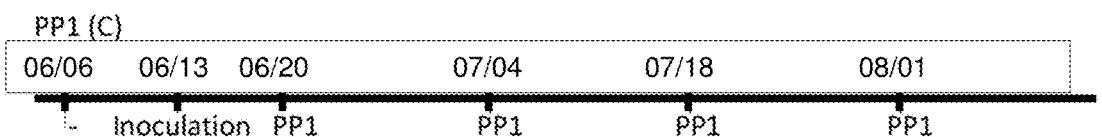
Figure 23:
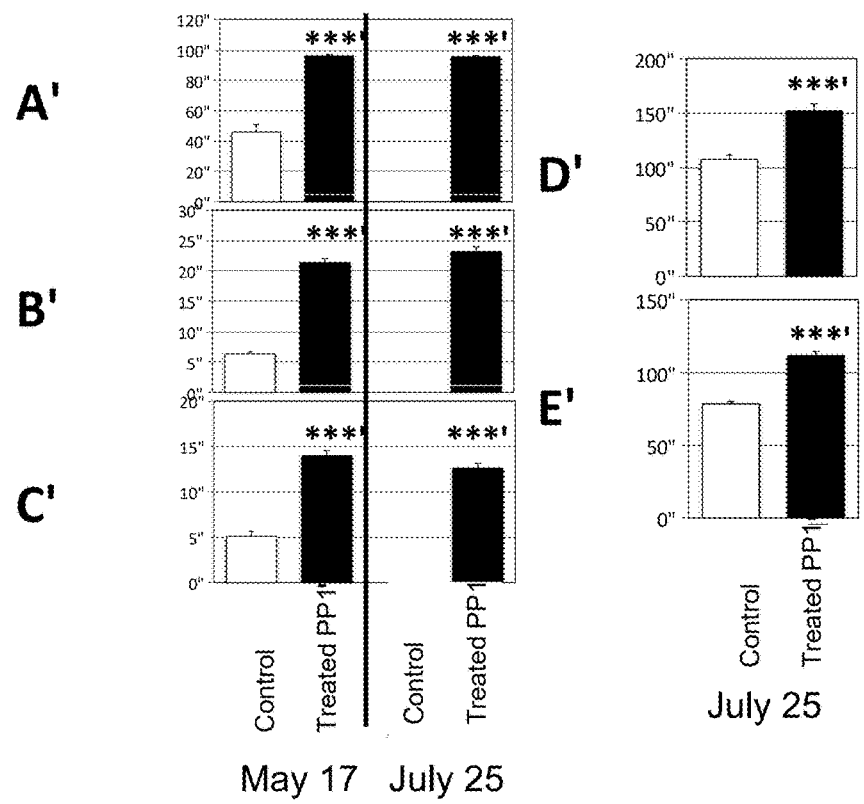
Figure 24:
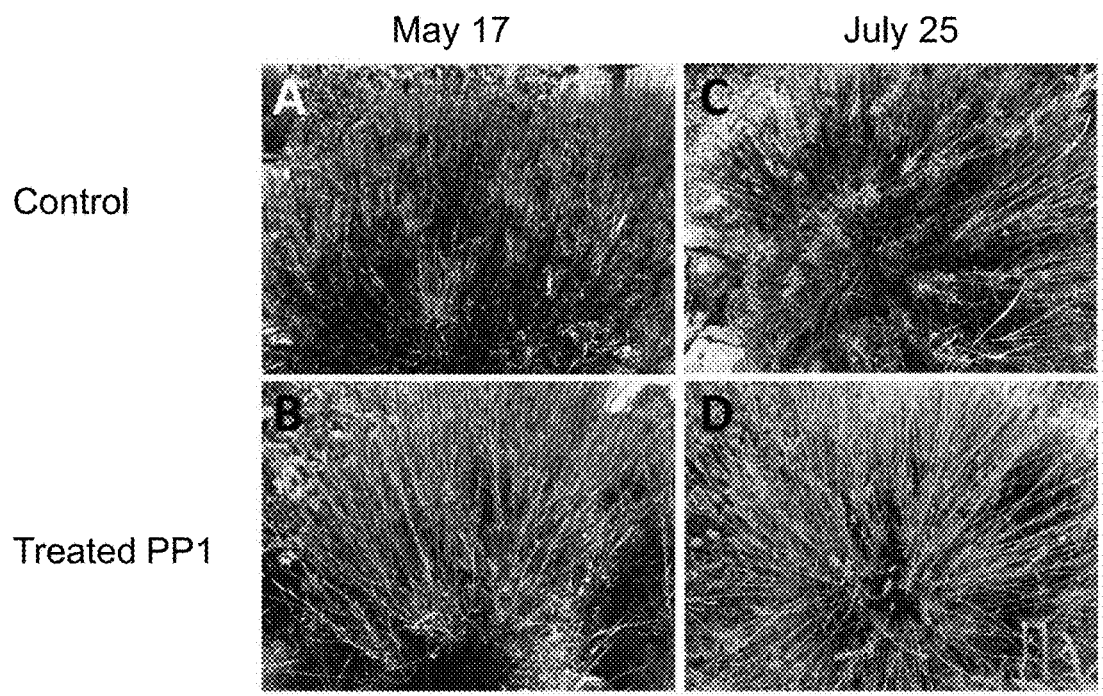
Figure 39:
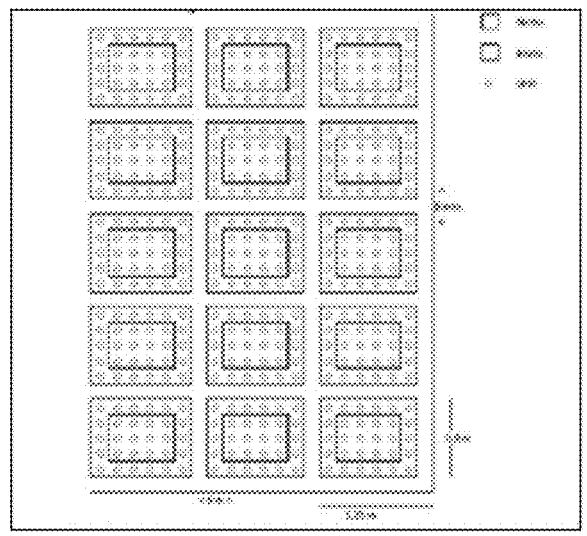
Figure 40:
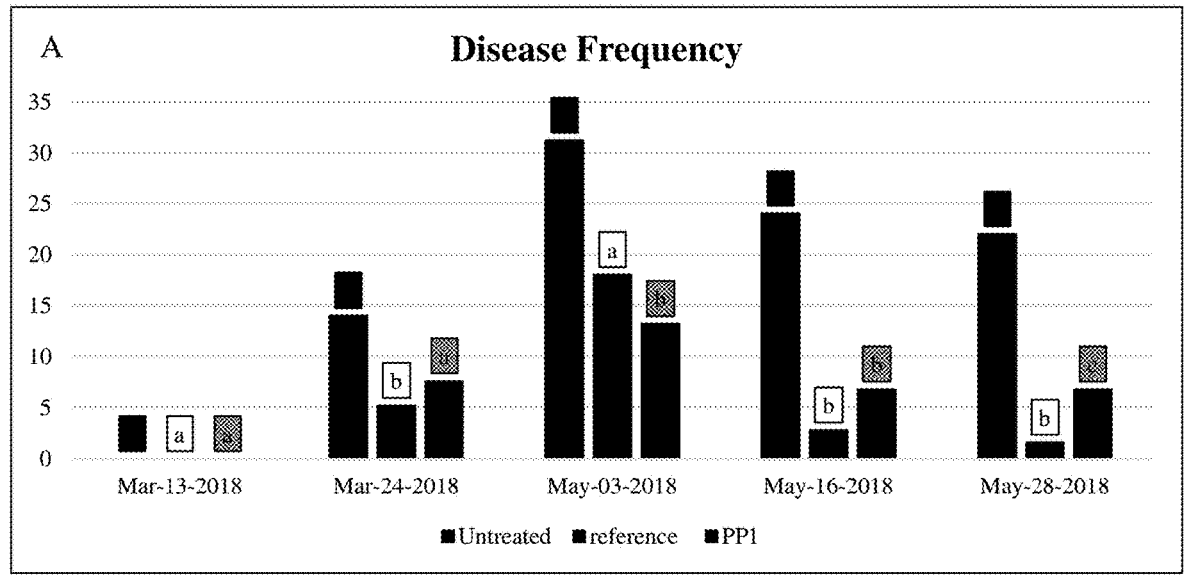
Figure 41:
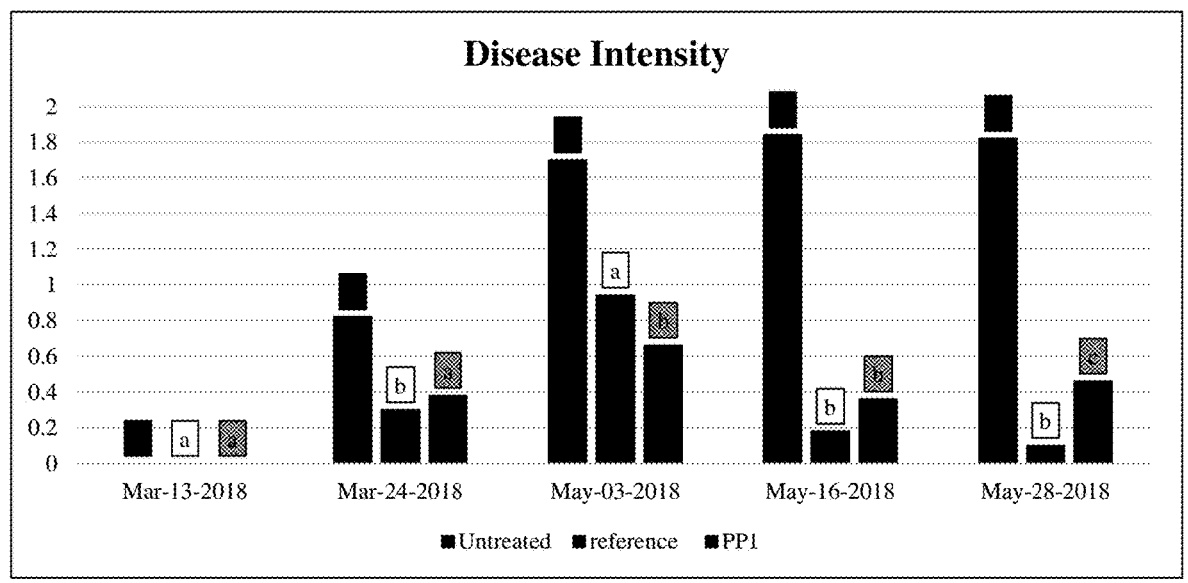
Figure 42:
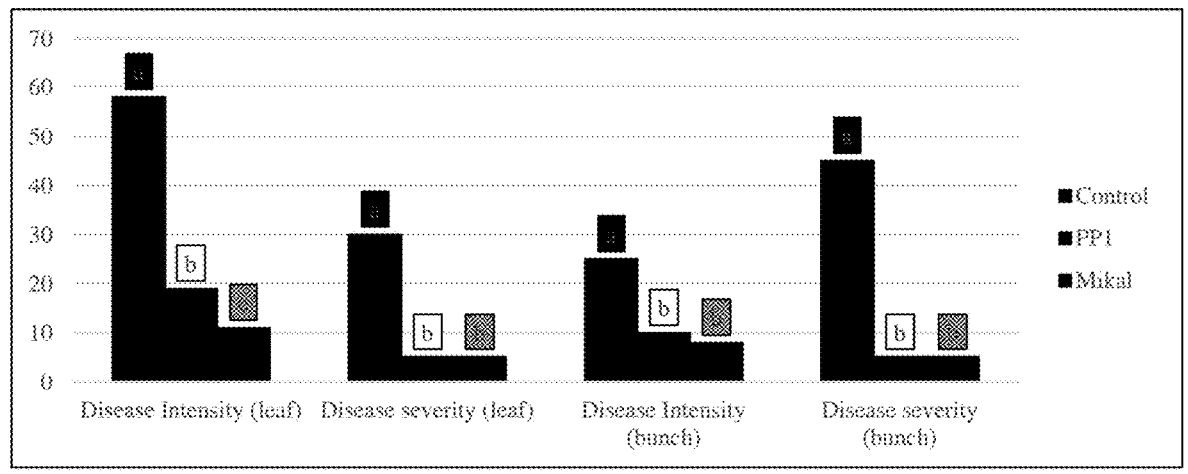
Figure 43:
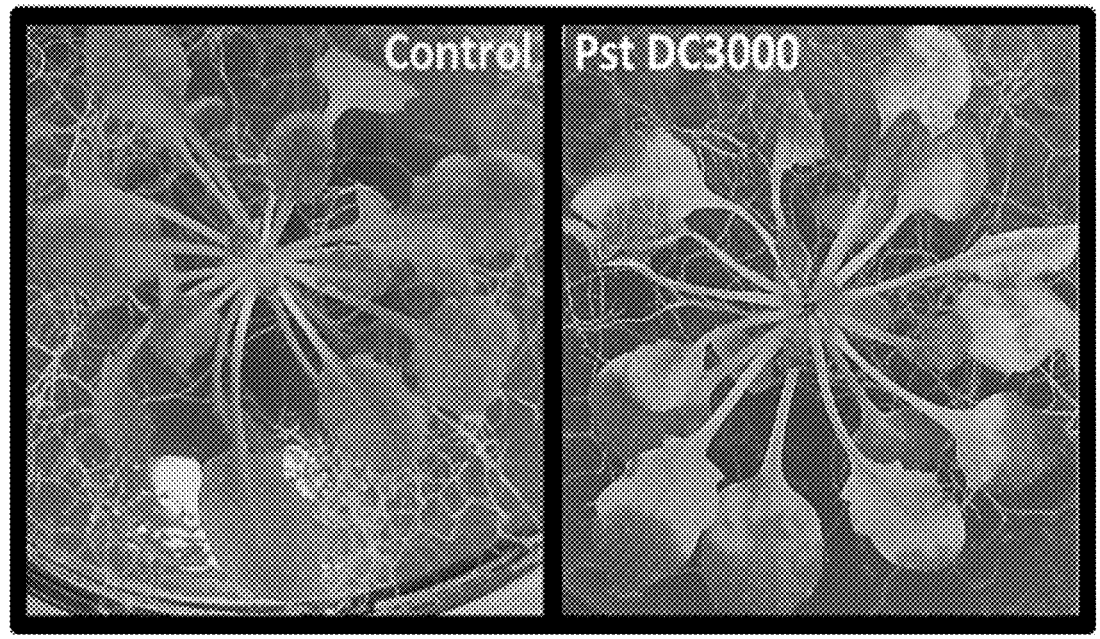
Figure 44:
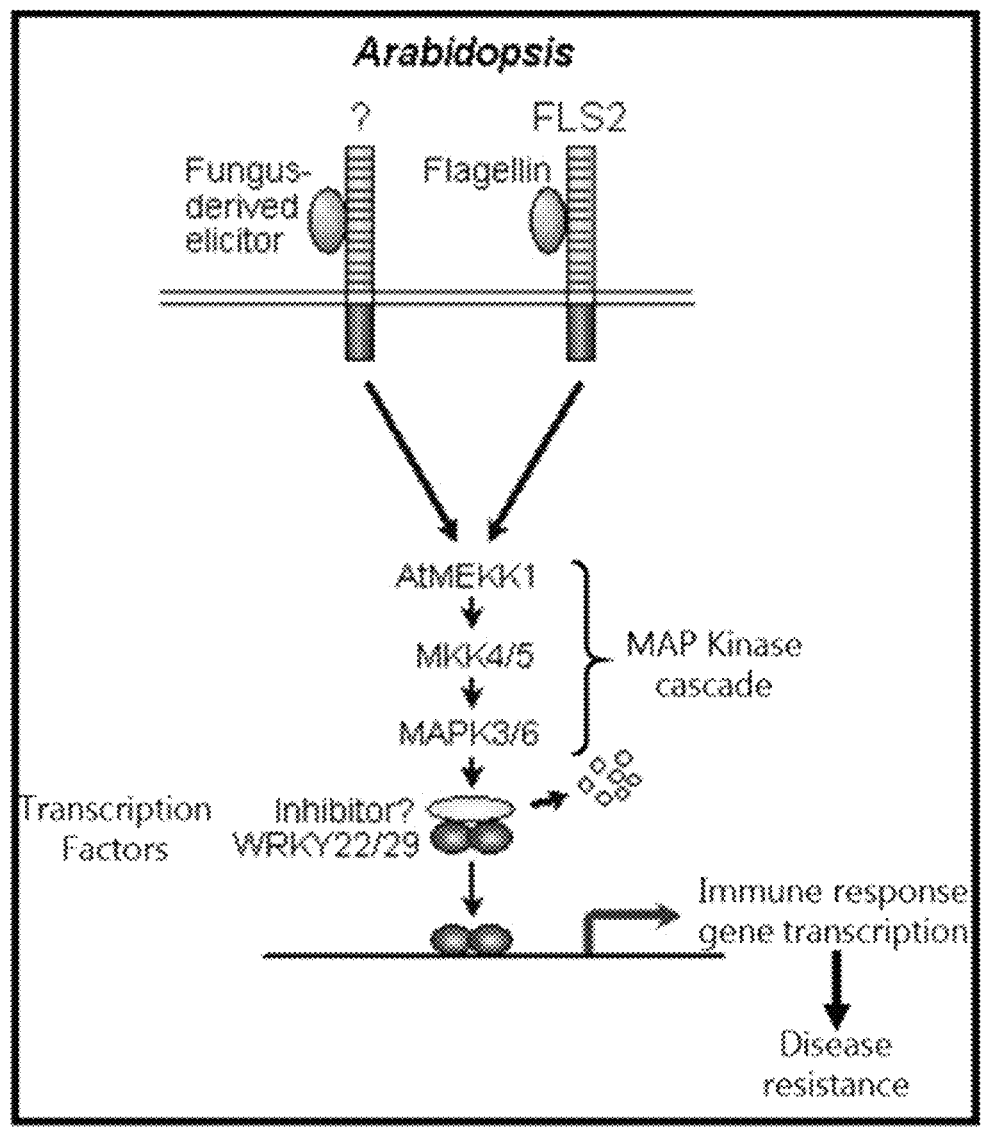
Figure 45:
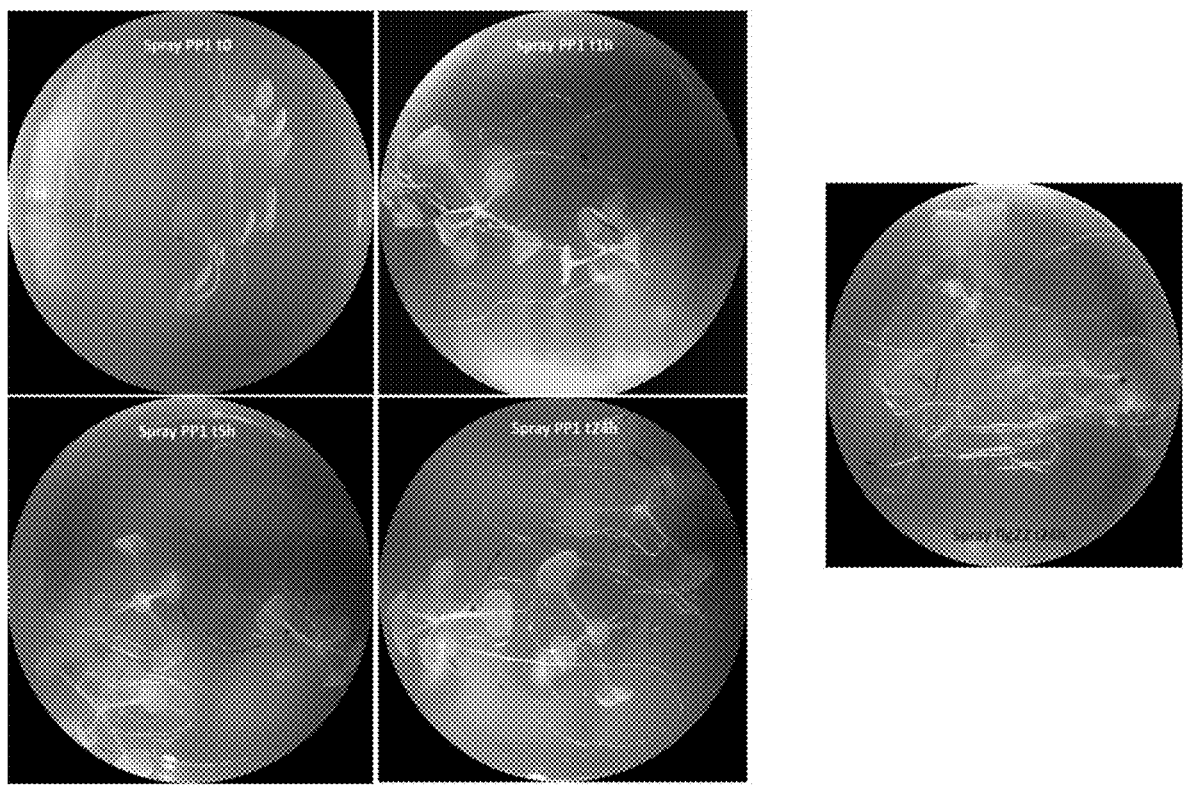
Figure 46:
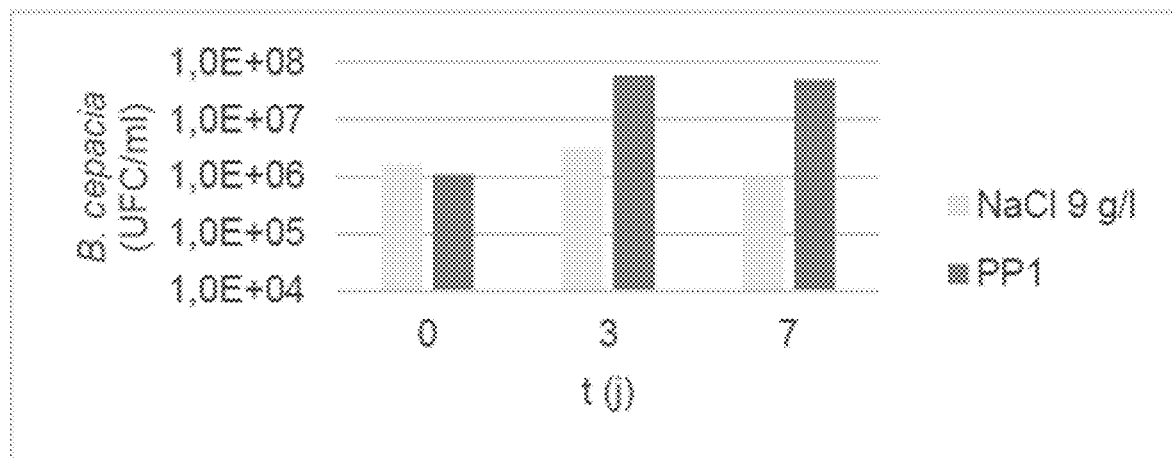
Figure 47:
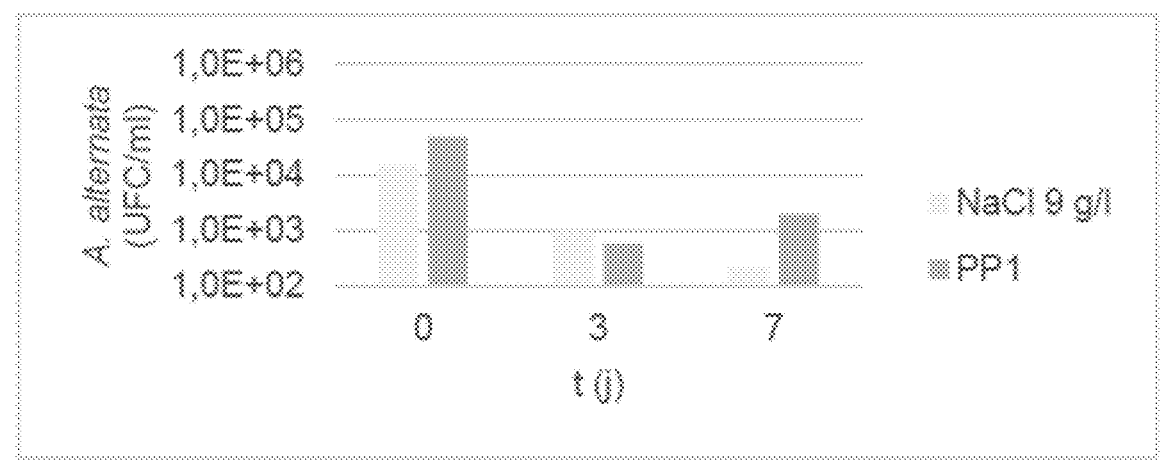
Figure 48:
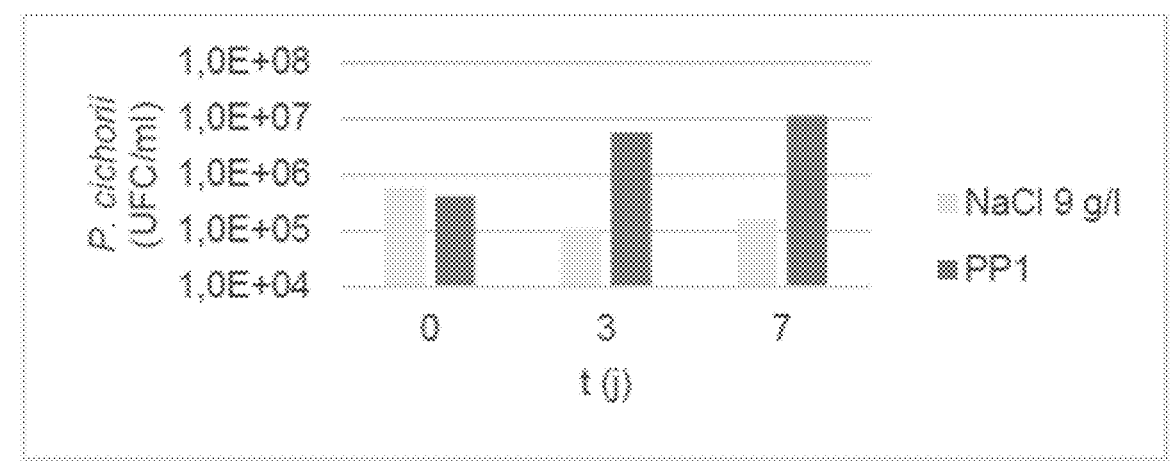
Figure 49:
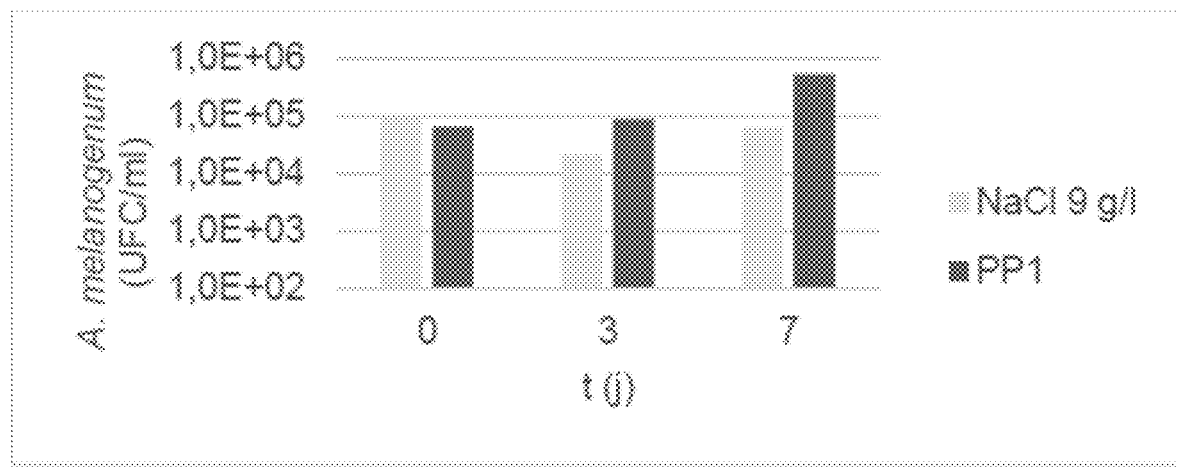
Figure 50:
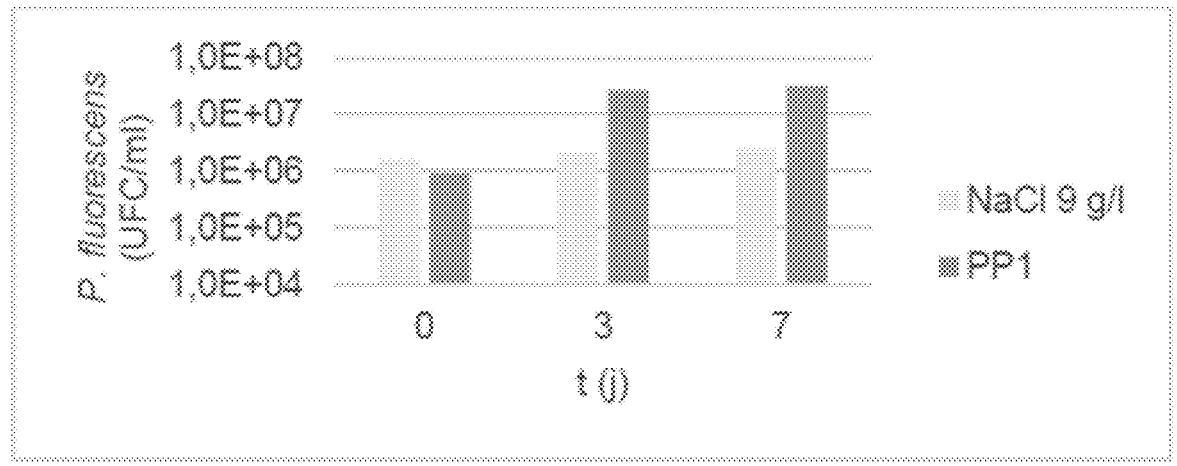
Figure 51:
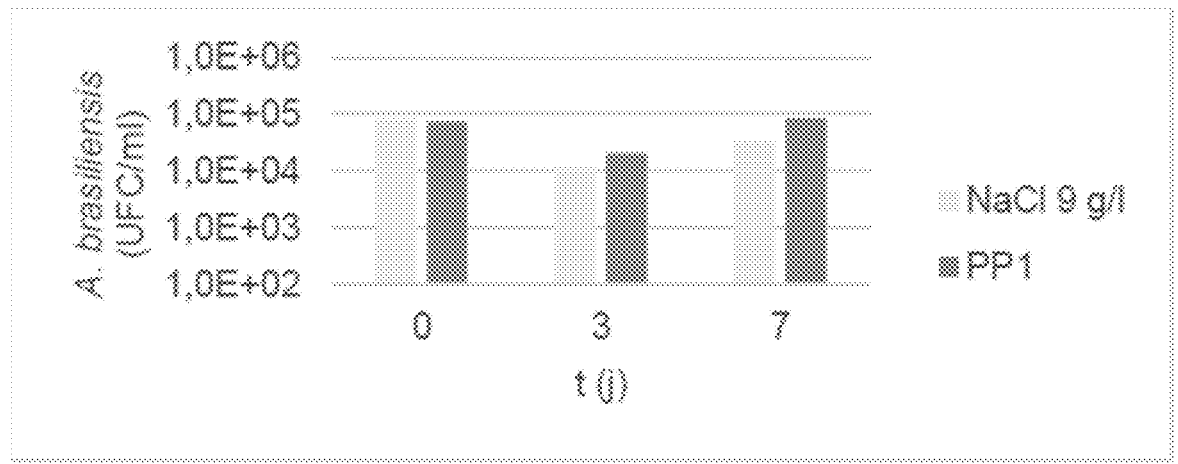

FIG. 6 compares the chlorophyll content of the leaves ("Spad Index") of treated olive trees and "control" olive trees;

FIG. 7 compares the stomatal conductance (water potential) of the leaves of treated olive trees and "control" olive trees;

FIG. 8 shows the re-growth of vegetation (number of new young leaves/shoot) for the treated olive trees and the "control" olive trees, on the different sampling dates;

FIG. 9 shows the re-growth of vegetation (length of young branches) for the treated olive trees and the "control" olive trees, on the different sampling dates;

FIG. 10 compares the chlorophyll content of the leaves (Spad Index) of the treated olive trees and "control" olive trees, on the different sampling dates;

FIG. 11 compares the stomatal conductance (water potential) of the leaves of the treated olive trees and the "control" olive trees, on the different sampling dates;

FIG. 12 represents chromatograms obtained during analyses of an analytical standard solution and three sample replicas for demonstrating the absence of Erucin in the product that is the subject of the invention;

FIG. 13 represents results of a trial program in the form of the percentage of *Xylella fastidiosa* disease (DAMDIS) representing the average severity/seriousness of the disease per plot of olive trees;

FIG. 14 represents an evaluation of the number of new sprouts/shoot of olive trees;

FIG. 15 represents an evaluation of the vigor of the olive cultivation during a trial program;

FIG. 16 represents an evaluation of the length of new olive sprouts during a trial program;

FIG. 17 represents an evaluation of the NVDI character of the olive trees during a trial program;

FIG. 18 represents an evaluation of the stomatal conductance of olive trees during a trial program;

FIG. 19 represents an evaluation of the fresh weight of olives/plot during a trial program;

FIG. 20 represents an evaluation of the fresh weight of olives per 100 fruit during a trial program;

FIG. 21 represents an evaluation of the oil concentration during a trial program;

FIG. 22 represents a treatment schedule of walnut trees;

FIG. 23 represents a development of physiological parameters of growth in treated lavender plants, compared with the untreated "controls";

FIG. 24 represents photographs showing a disease evolution caused by *Stobur phytoplasma* (*Candidatus phytoplasma solani*) in control plants and plants treated with the product that is the subject of the invention;

FIGS. 25 to 32 represent graphically, respectively, crop vigors, numbers of new shoots, average lengths of new shoots, NDV index, stomatal conductances, yields, weights of hundreds of olives and oil contents during a trial on olive trees;

FIGS. 33 to 38 represent graphically, respectively, areas infected on leaves, numbers of leaves infected, areas infected on husks, numbers of husks infected, yields and weight of unmarked husks during a trial on walnuts;

FIG. 39 represents represents distributions of plants in greenhouses during a trial on roses;

FIGS. 40 and 41 represent graphically, respectively, disease frequency and disease intensity during a trial on roses;

FIG. 42 represents graphically disease parameters during a trial on grapevine;

FIG. 43 represents a photograph of Arabidopsis;

FIG. 44 represents schematically defense responses of Arabidopsis;

FIG. 45 represents photographs of effects of sprays of the invented composition; and FIGS. 46 to 51 represent, graphically, respectively, numbers of viable microorganisms at different times.

DESCRIPTION OF EXAMPLES OF REALIZATION OF THE INVENTION

The product comprising the composition that is the subject of the present invention, subsequently called "PP1", does not correspond to what the literature describes:

1/ PP1 (leaves, stems, flowers, seeds, roots) is extracted, according to a preferred mode of extraction, with water, according to the method described below (FIG. 1). In field use, the product is further diluted in the spray tanks to be sprayed at foliar level (or other use described in the description of uses)

2/ The product PP1, obtained under these conditions of extraction, has no direct antimicrobial activity (no antibacterial or antifungal activity). This demonstration was realized during three different in vitro experiments:

2.a/ In a specific experiment carried out by BIOPRESERV (Grasse, France) concerning the ready-to-use PP1 product. Under laboratory analysis conditions, after three and seven days of contact, the PP1 sample showed no toxic effect on the microbial strains studied (Example 1)

Example 1—Absence of Antibacterial and Antifungal Effects

To test the antimicrobial effect of PP1, the effect of PP1 was evaluated on the growth of six microbial strains:

Bacteria: *Burkholderia cepacia, Pseudomonas cichorii, Pseudomonas fluorescens*

Molds: *Alternaria alternata, Aspergillus brasiliensis, Aureobasidium melanogenum* (formerly *A. pullulans*).

The sample analyzed is the ready-to-use PP1 product, at the dosage of use.

Experimental Conditions:

The protocol followed is based on the European Pharmacopoeia—9th edition § 5.1.3. Effectiveness of the antimicrobial preservation.

The sample was filtered at 0.22 μm and kept refrigerated before use.

The strains studied are detailed in the following table of the composition of the inocula:

| microorganisms | references |
|---|---|
| Bacteria | |
| Burkholderia cepacia | DSM 7288 |
| Pseudomonas cichorii | DSM 50259 |
| Pseudomonas fluorescens | DSM 50090 |
| Yeasts/molds | |
| Alternaria alternata | DSM 620 10 |
| Aspergilus brasiliensis | DSM 1988 |
| Aureobasidium melanogenum | DSM 2404 |

For each strain, an inoculum at 10-10 CFU/m was placed in contact with the product during three to seven days at 22° C.±2° C. Physiological water (NaCl 9 g/l) was subjected to the same treatment as control.

To quantify the contamination at each measurement time, a count was performed by distribution on the surface or in mass of decimal dilutions from 0.1 ml of sample on the following media:

TSA (Tryptic Soy Agar, registered trademark) agar for the bacterial count (incubation: 2-5 days at 30° C.±2° C.)

Sabouraud (registered trademark) agar for the mold count (incubation: 3-7 days at 23° C.±2° C.).

The results were expressed in "colony-forming units" per milliliter (CFU/ml).

This analysis method makes it possible to detect a contamination from 10 CFU/ml (detection limit). Contamination below 10 CFU (<10) cannot be detected.

Results:

The results are set out in the following table, summarizing the number of viable microorganisms (CFU/ml) at different contact times.

| Microorganism | Strain | Product | t = 0 | t = 3 d | t = 7 d |
|---|---|---|---|---|---|
| Bacteria | Burkholderia cepacia | NaCl 9/l | $1.6 \times 10^6$ | $3.1 \times 10^6$ | $9.7 \times 10^5$ |
| | | PP1 | $1.1 \times 10^6$ | $6.0 \times 10^7$ | $5.0 \times 10^7$ |
| | Pseudomonas cichorii | NaCl 9/l | $6.0 \times 10^5$ | $1.1 \times 10^5$ | $1.5 \times 10^5$ |
| | | PP1 | $4.2 \times 10^5$ | $5.7 \times 10^6$ | $1.1 \times 10^7$ |
| | Pseudomonas fluorescens | NaCl 9/l | $1.6 \times 10^6$ | $2.1 \times 10^6$ | $2.5 \times 10^6$ |
| | | PP1 | $9.4 \times 10^5$ | $2.7 \times 10^7$ | $3.2 \times 10^7$ |
| Molds | Alternaria alternata | NaCl 9/l | $1.5 \times 10^4$ | $1.0 \times 10^3$ | $2.2 \times 10^2$ |
| | | PP1 | $5.0 \times 10^4$ | $6.0 \times 10^2$ | $2.0 \times 10^3$ |
| | Aureobasidium melanogenum | NaCl 9/l | $9.5 \times 10^4$ | $2.1 \times 10^4$ | $6.5 \times 10^4$ |
| | | PP1 | $6.6 \times 10^4$ | $8.8 \times 10^4$ | $5.4 \times 10^5$ |
| | Aspergillus brasiliensis | NaCl 9/l | $8.6 \times 10^4$ | $1.2 \times 10^4$ | $3.3 \times 10^4$ |
| | | PP1 | $7.6 \times 10^4$ | $2.1 \times 10^4$ | $8.6 \times 10^4$ |

With respect to the bacteria, the same behavior was observed for the three strains (B. cepacia, P. cichorii, P. fluorescens). Populations were maintained in the physiological water and increased on contact with the PP1 sample.

With respect to the molds,

For A. alternata, a decrease in populations over time in the physiological water and in the PP1 sample was observed.

For A. melanogenum, a maintenance of the population in the physiological water and an increase in the PP1 sample was observed.

For A. brasiliensis, a slight decrease of the population in the physiological water and a maintenance in the PP1 sample was observed.

However, it has to be noted that the results for the molds should be tempered by the fact that the formation of filaments makes the count less accurate than that of the bacteria.

Under laboratory analysis conditions, after three and seven days of contact, the PP1 sample showed no toxic effect on the strains studied.

2.b/ In the Walnut Tree and *Xanthomonas arboricola* pv *juglandis* trial presented in this patent. The PP1 product showed no bactericidal activity on the *Xanthomonas* bacteria in vitro, whereas it acted effectively in fighting this parasite on walnut trees in the field (Example 8).

2.c/ On *Xylella fastidiosa*, the direct application of the PP1 product on the bacteria in vitro had no antibacterial effect (Examples 3 and 4) whereas effectiveness against this bacteria was demonstrated in the field trials carried out in southern Italy.

In addition, in these same trials, the PP1 product was also tested under in vitro conditions on other main fungal species associated with "CoDiRO" disease: *Phaeoacremonium, Phaeomoniella, Pleurostomophora, Colletotrichum, Botryosphaeriaceae*. The PP1 product did not seem to directly inhibit fungal growth in vitro, and each microorganism developed. Nevertheless, in the field, none of these microorganisms was found on the drupes of the treated trees, whereas they were found on the control trees. No pathogenic fungus was isolated on the olives (700) coming from trees treated with the product of the present invention (examples 3 and 4).

Similarly,

3/ A company specializing in plant extracts (AKINAO, registered trademark, Perpignan, France) carried out a quantitative determination of the major isothiocyanate of the *Eruca sativa* plant, which was not detectable in the ready-to-use PP1 product (Example 2).

One of the main characteristics of the Brassicaceae family, which rocket is a member of, is the production of specific secondary metabolites, called glucosinolates (anionic thioglucosides) (Fahey et al., 2001; Bones and Rossiter, 2006). The glucosinolates form an important group of non-volatile secondary metabolites containing sulfur.

However, glucosinolates have little biological activity in themselves, but they are hydrolyzed by the thioglucosidase enzymes, called myrosinases, to form of variety of hydrolysis products, including isothiocyanates, nitriles, epithionitriles and thiocyanates (Bones and Rossiter, 1996). These hydrolysis products are responsible for the glucosinolates' toxicity for herbivores, for their taste and smell, for their anti-cancer activity, and for almost all the other biological activities of glucosinolates (Halkier and Gershenzon, 2006). Spontaneous hydrolyzation of the glucosinolates is prevented in the plant because the glucosinolates and the myrosinase are separated in different tissues or cellular compartments. The glucosinolate/myrosinase defense system is distributed in all the plant's organs, including the leaves, roots, flowers, fruit and seeds (Textor and Gershenzon, 2009). When damage occurs to the plant tissues, the glucosinolates are rapidly hydrolyzed by the inherent myrosinase enzyme (β-thioglucoside glucohydrolase, thioglucosidase), producing the hydrolysis metabolites, according to the pH and other conditions (Bones and Rossiter, 2006, 1996; Fenwick et al., 1983). The system in which the glucosinolate and myrosinase come into contact in the event of tissue destruction is called the "glucosinolate-myrosinase system" (Bones and Rossiter, 2006, 1996).

Thus, the glucosinolate-myrosinase complex is a chemical defense system developed evolutionarily against herbivores and found in the members of the Brassicaceae family (one of which is Rocket (*Eruca sativa*)). This complex is considered a constituent and inducible defense system. It is very dynamic, interacts with insect pests and forms a well-established integrated management mechanism against pests (Bones and Rossiter 2006, 1996; Rask et al., 2000; Wittstock et al., 2004; Müller and Sieling, 2006). The defense complex is inactive in plants' defenses while the two molecules are stored in their respective compartments in the plants' leaves, until the leaf is torn by a herbivore (Tong-Xian Liu and Le Kang, 2011).

The isothiocyanates (ITC) produced after the myrosinases have hydrolyzed the glucosinolates play a crucial ecological role in the protection of plants against various pests, including insects and microbial systems.

Various studies have shown that the ITCs exhibit biocidal activities against various bacterial pathogens. There is no general rule concerning the effectiveness of ITCs with respect to various types of bacteria. Antimicrobial activity appears to be always higher in hydroxy and/or aromatic ITCs than in aliphatics (Dudour et al., 2015). However, this effect is closely linked to the dose (Aires et al., 2009).

Because of these characteristics, the glucosinolates and their degradation products have been studied due to their potential use as agricultural pesticides in a technique known as biofumigation. In biofumigation, a culture rich in glucosinolates is mulched in the field, releasing toxic secondary by-products of glucosinolates, in order to reduce the incidence of pests, weeds and diseases in the following agricultural and horticultural crops (Ngala et al., 2015; Lord et al., 2011).

However, obtaining this complex in a plant extract product is very complicated. The hydrolysis products of glucosinolates are important volatile metabolites that are difficult to extract. The different conditions, such as the extraction method, the solvent and the drying method, are responsible for successful extractions. Therefore, a precise and effective extraction method is essential for extracting these valuable compounds, which can then be used for different biological activities such as anti-cancer, anti-mutagenic, bioherbicide, antimicrobial, antigenotoxic and anti-tumor activities (Arora et al., 2014).

In our case, in the PP1 production process, the leaves, stems, seeds, roots or flowers are ground and highly diluted in water, making the formation of the glucosinolate-myrosinase complex very difficult since the probability of the myrosinase enzyme entering into contact with its glucosinolate substrate is very low, thus preventing the formation of toxic products.

Example 2—Demonstration of the Absence of Erucin in the PP1 Extract

In rocket (*Eruca sativa* Mill and *Diplotaxis tenuifolia* L.), glucoerucin is a glucosinolate found in high concentrations, which can be hydrolyzed to Erucin.

As indicated earlier, isothiocyanates (ITC) are the products of the reaction of plant glucosinolates with myrosinase, an enzyme released by the disintegration of plant tissues. This myrosinase-glucosinolate system is present in plants of the Brassicaceae family, such as rocket. ITCs are volatile substances that exercise an inhibitor effect on a large number of pathogenic microorganisms at low concentrations, which makes them promising antimicrobial candidates (Dufour et al., 2015). The natural isothiocyanates closely linked to sulforaphane (SF) have already been shown to have a bactericidal effect (erucin, berteroin, hirsutine, phenethyl isothiocyanate and allysine) (Wittstock and Gershenzon, 2002; Fahey et al., 2013). For example, Ganin (2013) found that sulforaphane and erucin, two natural isothiocyanates that are very abundant in broccoli, rocket, and other cruciferous vegetables, strongly inhibited quorum sensing and virulence in *Pseudomonas aeruginosa*.

In accordance with the protocol followed, the PP1 extraction method was based on the grinding and aqueous extraction of rocket leaves, stems, flowers, seeds or roots, and the result of this extraction was highly diluted in water during use. This technique makes the formation of the glucosinolate/glucoerucin/myrosinase complex very difficult.

To confirm this assertion, we have chosen to detect Erucin, a major isothiocyanate in rocket (*Eruca sativa*) leaves, in the product that is the subject of the invention, extracted here from *Eruca sativa*:

The quantitative determinations were assigned to a laboratory specializing in plant extracts: AKINAO, Perpignan, France. AKINAO has developed a method for analyzing Erucin in a PP1 sample, at the dilution of use.

Material and Method:

Analytical Standards and Reagents:

The references for the analytical standards and reagents are indicated in the following table:

| Analytical standard/reagents | CAS number | Purity | Reference | Batch number |
| --- | --- | --- | --- | --- |
| Erucin | 4430-36-8 | Analytical standard | TRC-M330763 LGC | 5-YMK-41-1 |

The main equipment used in this study is indicated in the following table:

| Equipment | Identification code |
| --- | --- |
| Gas chromatography coupled to a mass spectrometer: GC oven (Thermo Fisher Scientific ®), Al 3000 automatic injector (Thermo Fisher Scientific ®), DSQII mass spectrometry detector (Thermo Fisher Scientific ®)—Library: The NIST/EPA/NIH Mass Spectral Library Version 2.2 of Jun. 10, 2014 | BIO2MAR-2 |
| DB-5MS 30 m*0.25 mm*0.25 µm (PN: 122-5532/SN: USR124665H) | Column P |

Execution:

A method for extracting erucin has been developed and validated in terms of performance by the standard addition method. The erucin was extracted by liquid/liquid extraction with an organic solvent. A second solid-phase extraction (SPME) was performed to validate the results.

The extracts were analyzed by GC-MS (registered trademark). The analytical method was developed based on an analytical standard solution of erucin. The detection and quantification were carried out on the specific ions of erucin in order to improve the sensitivity of the analysis by external calibration.

Results:

FIG. 12 shows the chromatograms obtained during analyses of an analytical standard solution and three sample replicas: Chromatogram in SIM mode of the erucin standard (1 µg/mL) of the three sample replicas.

The linear range extends from 0.1 to 50 µg/mL of sample. The erucin detection limit under these conditions is estimated to be 0.2 µg/mL.

Erucin was not identified in the sample.

The invention relates to the use of an extract of at least a part of rocket plants, preferably chosen from the group of rocket plants of the *Eruca* (*Eruca sativa; Eruca vesicaria*, etc.), *Diplotaxis* (*Diplotaxis erucoides, Diplotaxis tenuifolia, Diplotaxis muralis*, etc.), *Bunias* (*Bunias erucago, Bunias orientalis*, etc.), *Erucastrum* (*Erucastrum nasturtiifolium, Erucastrum incanum*, etc.) and *Cakile* genuses, in order to stimulate, the defenses of plants or trees and reduce the effects of:

*Xylella fastidiosa* bacteria on myrtle-leaf milkwort, grape vines, olive trees, citrus trees, oleander, almond trees, coffee trees, peach trees and stone fruit trees, oak trees, lavender, rosemary, or broom,

*Pseudomonas syringae* pv *actinidiae* bacteria on plants of the *Actinidia* genus,

*Xantomonas arboricola* pv *juglandis* bacteria on walnut trees,

*Xanthomonas arboricola* pv. *Pruni* bacteria on *Prunus* spp., and preferably the following group of fruit/nut trees: apricot trees, almond trees, cherry trees, peach trees, plum trees, *P. salicina*, cherry laurel and other exotic or ornamental *Prunus* species, including *P. davidiana* and *P. laurocerasus*, Pear Decline *Phytoplasma* bacteria or *Candidatus Phytoplasma pyri* on pear trees,

*Candidatus Phytoplasma solani* bacteria on grape vines, lavender, potato plants, tomato plants, aubergine plants, pepper plants and tobacco plants,

*Plasmapora viticola* fungus on grape vines, or *Phytophtora infestans* on potato plants and tomato plants, or *phytophtora citrophtora* on citrus trees, or *Phytophtora cactorum* on pear trees and apple trees, or *Bremia lactucae* on artichokes. All these pathogenic fungi are responsible for mildew, or oidium-type fungi such as *Podosphaera pannosa* on rose bushes, and *Erysiphe necator*, formerly *Uncinula necator*, on grape vines, and oidia on tomato plants, lettuces, cucumbers, strawberry plants, raspberry plants, currant bushes, peach trees, pear trees, privet, carnations.

In the aim of clarity and conciseness, the examples of the description that will follow do not cover all the combinations of pathogenic agents and plants or trees indicated above, but demonstrate the effectiveness of the present invention in all these combinations.

In the absence of antibacterial and antifungal effects, PP1 works by stimulating the plants' defenses, and by enabling the treated plants to defend themselves against the pathogenic agents. PP1 can be defined as an elicitor, given that molecules having the property of inducing in the plant a cascade of defense reactions against the pathogenic agents are called elicitors.

The demonstration of the elector activity of defense mechanisms was also demonstrated at several levels:

4.1/ PP1 presented no direct antibacterial or antifungal activity as described above.

4.2/ The demonstration of the production of defense molecules, such as jasmonic acid, salicylic acid, or peroxidases, was carried out after treatment with PP1, under infection conditions on the walnut tree treated with PP1 and infected with *Xanthomonas arboricaola* pv *juglandis*, and on grape vines treated with PP1 and infected with *Candidatus phytoplasma solani* (demonstration of effectiveness and stimulation of defense) (Examples 8 and 11).

In effect, in the absence of direct antibacterial and antifungal activities, PP1 has the characteristic of stimulating plants' defenses and enabling them to react effectively, even in the case of invasive pathogens that are difficult to fight.

The effectiveness of PP1 was demonstrated in the following cases, in parallel with a stimulation of the plants' defenses:

effectiveness of PP1 against *Xanthomonas campestris* pv *juglandis*: An in vitro test showed that PP1 had no antibacterial activity against *Xanthomonas*. A high production of salicylic acid and peroxidase was observed in the plants treated and infected.

effectiveness of PP1 against *Candidatus phytoplasma solani* (*Stobur phytoplasma*) on Grape Vines (*Vitis vinifera*). Jasmonic acid was detected in the trees treated with PP1 and infected.

In the case of attack by the quarantine organism *Xylella fastidiosa* in olive trees, PP1 was shown to have had no effect on the bacteria's growth in vitro. But, as for the other models, PP1 showed significant effectiveness against *Xylella fastidiosa* in olive trees (Examples 3 to 5), by allowing them to regain vigor, and to recommence producing new sprouts and fruit (Examples 3 to 5).

To understand the operation of PP1 on diseased olive trees, it is very important to decipher how the symptoms observed in the infected olive trees are produced through infection by *Xylella fastidiosa*. Plants deploy various defense responses after infection by a specific xylem pathogen, including compounds involved in the constitution of physical barriers (such as the formation of tyloses, for example) or compounds including metabolic pathways linked to defense (such as phenolic compounds, PR proteins, phytoalexins and peroxidases, for example). These compounds are aimed at stopping the spread of pathogens and thus inhibiting their replication (Rapicavoli et al., 2018).

In certain very specific cases, the xylem cells undergo programmed cell death and, as a consequence, are unable to trigger defense responses by their own means (Yadeta and Bart, 2013; Hilaire et al., 2001; Berne and Javornik, 2016; Rep et al., 2002). The vascular pathogens are then probably recognized by receptors in the living parenchyma surrounding the xylem (Yadeta and Bart, 2013; Berne and Javornik, 2016).

In the specific case of *Xylella fastidiosa*, the bacteria colonize the vessels of the host plant's xylem and cause the production of prolific occlusions in the xylem, which reduces hydraulic conductivity in the plant (Sun et al., 2013; Choat et al., 2009). Wilting of plant parts as a result of xylem dysfunction is the most conspicuous symptom of this type of disease. Daugherty (2010) has shown clearly in his studies that *Xylella* induces hydric stress in alfalfa. Many factors can contribute to xylem occlusion, such as the high- and low-molecular weight polysaccharides secreted by the bacteria during xylem colonization, or the presence of pathogen biomass (bacterial cells) (Yadeta and Bart, 2013).

However, the defense responses of plants can also contribute to xylem occlusion, such as the formation of tyloses by the parenchymatous cells and the secretion of gums and gels (Fradin and Thomma, 2006; Klosterman et al., 2009; Beattie, 2011). Embolism (the formation of air bubbles) in xylem vessels is another factor that can reduce the hydraulic conductivity of the xylem (Pérez-Donoso et al., 2007).

Nevertheless, this effective stress response can turn against the plant itself. Various studies, in particular on grape vines (*Vitis vinifera*), have shown that the extensive formation of vascular occlusions in the plant does not hinder the systemic spread of the pathogen, but can significantly reduce the plant's water conduction and thus contribute to the development of symptoms of the disease (Sun et al., 2013).

Thanks to studies carried out on other crops attacked by *Xylella fastidiosa*, such as grape vines, it is suggested that the multiplication of the bacteria is the only factor responsible for blocking the movement of water in the plant's xylem. However, studies by Pérez-Donoso (2007) showed (by using magnetic resonance imaging) that the vascular obstructions resulting from the grape vine's active responses to the presence of *Xylella*, introduce a reduction in xylem conductivity and probably other aspects of the disease. These blockage symptoms may be linked to the plant's defense rather than the direct action of the bacteria.

However, the results obtained with PP1 showed that the olive trees infected and treated with PP1 were able to overcome these occlusions in the vessels caused by the formation of tyloses, gums or gels, and the blockage syndrome therefore became reversible (Examples 3 to 5). The infected trees resumed their growth after treatment with PP1. This allows us to formulate two hypotheses, which may be complementary rather than exclusive:

1. PP1 enables the implementation of mechanisms to break down tyloses, gums or gels obstructing vessels in the olive tree by specific enzymes or processes (in association with metabolic mechanisms linked to defense, such as phenolic compounds, PR proteins, phytoalexins, etc.).

2. PP1 enables the active development, in response to the infection, of new xylem vessels that will conduct the sap.

4.3/ Although it has no antimicrobial activity, PP1 has significant effectiveness against various pathogens in the field that are difficult to defeat (Examples 3 to 15).

Figure 1:
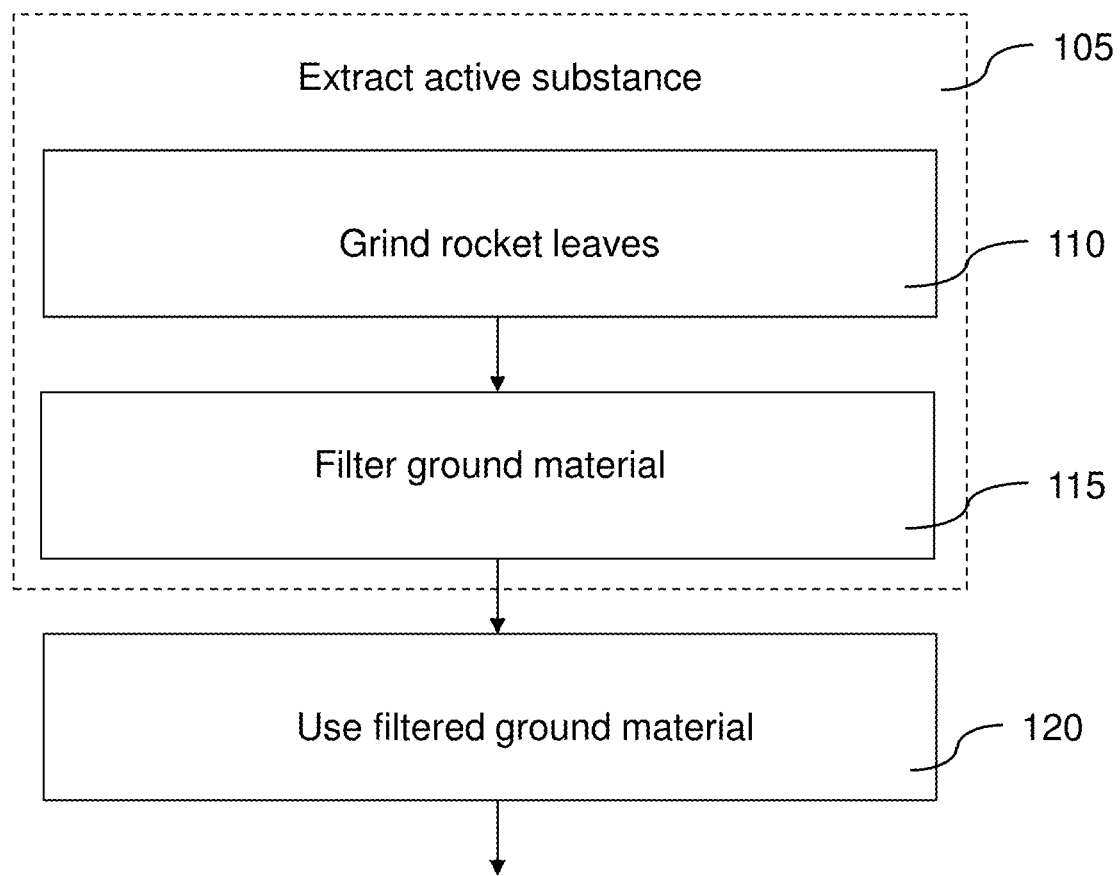
FIG. 1 represents, in the form of a logical diagram, steps in a particular embodiment of a method for producing and using ground material, which is a preferred example of the product that is the subject of the invention.
Figure 2:
FIG. 2 represents an insertion point where the leaves of olive trees are counted to evaluate the development of the last branch of the current year.

As shown in FIG. 1, in an embodiment, the method for producing and using the composition that is the subject of the present invention comprises a step 105 of extracting a rocket plant extract. For example, this extraction is performed according to the following procedure:

During a grinding step 110, the rocket leaves, roots, stems, seeds, and/or flowers are finely ground in tap water, for fifteen minutes, in a suitable mixer device to obtain a homogeneous ground material;

During a filtration step 115, the ground material is filtered to separate the leaf matter and obtain green-colored liquid without leaf residue (the filtrate), which constitutes the product that is the subject of the present invention.

In a variant, at least one of the active principles of the ground material is obtained by oil extraction.

In a variant, at least one of the active principles of the ground material is obtained by solvent extraction, by mechanical extraction, by microwaves, or by extraction of oil cakes or pastes.

In a variant, at least one of the active principles is obtained by mechanical extraction or by microwave extraction.

In a variant, the extraction step 105 comprises a step of compressing rocket leaves, roots, stems, seeds or flowers and collecting the liquid extract by gravity or by centrifugation. In a variant, simple centrifugation is utilized during the extraction step 105 to extract the liquid from the rocket parts used.

As described in the following description, the inventor has discovered that using this product has a significant effect on the plants and trees mentioned above and infected by one of the pathogenic agents mentioned above.

Note that the liquid product obtained at the end of step 105 can be formulated to make it easier to use. For example, it can be used in the form of powder, soluble powder, wettable powder, granules, dispersible granules, wettable granules or slow-diffusion granules, to be diluted in water at the time of use, liquid, soluble concentrated liquid, emulsifiable concentrate, concentrated suspension, or ready to use, depending on the formulation chosen and the use envisaged. The formulations are realized using the product from the extraction step 105 according to techniques well known to the person skilled in the art.

Active fractions can possibly be purified, by any means, to facilitate the formulation.

Different extraction steps can be added to improve its quality.

The product that is the subject of the invention can be diluted in water depending on the required dose, at the time of its use.

With respect to the use, during step 120 and formulation of the product, the finished product that is the subject of the present invention can be applied in any form whatsoever (liquid, powder, soluble powder, granules, dispersible granules, slow-diffusion granules, etc. formulation) depending on the uses and formulation envisaged. The use of the product that is the subject of the present invention can be by foliar vaporization, watering the soil, irrigation of the soil, drop-by-drop, use in hydroponics, seed treatment and/or seed coating.

The product that is the subject of the invention can be used at a frequency of between one day and one hundred and twenty days, or continuously, or according to the key growth stages of the plant, or in accordance with best agricultural practices and the treatment schedules for each plant species. The product of the present invention can be mixed with other products (phytosanitary products, growing mediums and fertilizing materials, fertilizers, biocides or any other product intended for agriculture).

The application doses and the application frequencies are adjusted to the uses and the plant types.

The application doses are, for example, between 0.001 g/L and 500 g/L of plant extracts, preferably between 2 g/L and 150 g/L of plant extracts and, more preferably, between 5 g/L and 70 g/L of plant extracts, expressed in grams of plants on which the extraction was carried out per liter of product.

The doses per liter or per hectare may be adjusted to the types of plant infected, to the level of infection and to the level of symptoms caused by the bacteria. The doses and the rates of treatment with the product of the present invention will also be adjusted to the strategy of curative or preventive action against these bacteria.

With regard to the rocket plants from which the extracts used in the present invention are obtained, they are preferably freshly collected. Alternatively, the rocket plants or the parts of interest are suitably dried, in a way well known to the person skilled in the art.

The grinding can be performed with two grinders (1000 W and 700 W of power), which are used with different blade speeds. The first ground material, obtained with 10 min of grinding, is then deposited in the second grinder, which has a faster blade speed. The ground material is homogeneous, with no visible residue of part of the leaves, stems or flowers. The quantity of water added during the grinding is 200 mL of water at ambient temperature per 100 g of leaves, stems, roots, flowers or seeds.

Two successive filtrations are performed, with a filtration fabric made of nylon (Dutcher, registered trademark) of 1000 μm and then of 500 μm. The filtration is performed at ambient temperature, without pressure.

To recover the filtrate that is active, depending on the quantity to be sprayed, the dilution (dose per hectare) is adjusted. Depending on uses, between 5 g of plant extracts per liter of slurry to be sprayed and 20 g of plant extracts per liter of slurry to be sprayed, as described with reference to examples.

The inventor has observed that the filtrate obtained can be kept for at least six days in a container at ambient temperature without losing its property of stimulating the defenses of plants and trees.

The extract of at least a part of Rocket plants can therefore be a liquid extract of Rocket of the *Eruca* genus obtained from ground material of said Rocket plants, and:
said extract of at least a part of Rocket plants includes at least Rocket leaves, preferably mainly leaves, and
the method making it possible to obtain said liquid extract comprises the following steps:
a) a step of grinding said Rocket plants of the *Eruca* genus in an aqueous medium;
b) filtering the ground material obtained; and
c) recovering the liquid extract of Rocket of the *Eruca* genus obtained after filtering.

For the formulation in the form of powder, granules, dispersible granules or slow-diffusion granules, a drying temperature is utilized and, in some embodiments, the coating of particles by other natural molecules (preferably very hydrophilic) that enable very good dissolution in water. The formulations are standard formulations in agriculture, in particular for phytosanitary products, intended to be transported and stored in the form of powder, etc., and diluted in water just before application.

In one embodiment, the present invention relates to the use of a plant extract obtained from at least one part of rocket plants in order to stimulate the defenses of plants or trees and reduce the effects of the *X. fastidiosa* bacteria on one of the following trees:
Myrtle-leaf milkwort,
Grape vines,
Olive trees,
Citrus trees,
Oleander,
Almond trees,
Coffee trees,
Peach trees and stone fruit trees,
Oak trees,
Lavender,
Rosemary, and
Broom.

*Xylella fastidiosa* is a gram-negative bacteria that causes serious diseases in many economically important crops, such as Pierce's disease on grape vines, variegated chlorosis on citrus trees, or leaf scorch on almond trees, etc.

*X. fastidiosa* is the only species of the *Xylella* genus. This bacteria consists of six subspecies and several strains (genetic lines), whose range of hosts, virulence and expression of symptoms are variable.

*X. fastidiosa* exclusively colonizes the vessels of the xylem (conducting tissue) of infected plants. This bacteria is transmitted from diseased plants to healthy plants by insects (phloem feeders) that feed on the raw sap of the xylem.

*X. fastidiosa*'s colonization in the xylem vessels blocks the transport of water and nutrients from the root to the stem and leaves, which results in the death of the infected plants.

The geographic infection pattern covers most countries in the world.

In the absence of phytosanitary solutions, *X. fastidiosa* causes irremediable damage to a large number of economically important crops throughout the world. Economic losses due to *X. fastidiosa* on harvests are estimated to be several billion dollars each year.

Example 3

The elements showing the effectiveness of the product that is the subject of the invention against *Xylella fastidiosa* on olive plants are given below. With the aim of making the description easier to read and shorter, only the elements relating to olive trees are given below.

In FIGS. 3 and 6 to 11, the vertical bars represent, from left to right, table data running from top to bottom. Therefore, for each date, the left-most seven vertical bars relate to the treated trees, and the right-most seven vertical bars to the "control" trees.

The results shown below were obtained with the product of the present invention during a first trial on olive trees infected with *X. fastidiosa*, in a declared quarantine area (official decision of the Italian authorities). The experiment consisted of six treatments with the product on the following dates:
September 3
September 16
September 26
October 5
October 31 and
November 12.
Data was collected in the area on the following dates:
October 5
October 27
November 30
December 18 and
January 20.

In this plot, the olive trees showed severe symptoms of the disease caused by *Xylella fastidiosa*, and the branches had been extensively pruned. For this reason, the harvest weight was not measured in this experiment, since this extensive pruning prevented the olive trees from producing olives.

During the studies mentioned above, the following readings were taken.

1. The percentage of necrotic surfaces of leaves or brown surfaces (estimation) in the treated plants and the control plants, employing an empirical evaluation scale that makes it possible to evaluate an infection index. The new leaves could be measured after one month following the start of the treatment.

2. The level of olive tree dieback linked to *X. fastidiosa* in the treated plants and the "control" plants.

3. The level of re-growth of vegetation (number of new young leaves) for the treated olive trees and "control" olive trees.

4. The product was tested under in vitro conditions with the *X. fastidiosa* bacteria (in an accredited laboratory) and other main fungal species associated with CoDiRO disease (olive rapid desiccation syndrome caused by *X. fastidiosa*): *Phaeoacremonium, Phaeomoniella, Pleurostomophora, Colletotrichum, Botryosphaeriaceae*.

5. The chlorophyll content of the leaves (Spad Index) of treated olive trees and "control" olive trees.

6. Stomatal conductance (water potential) of the treated olive trees and the "control" olive trees.

The results obtained are discussed below, point by point.

Activities/Results:

1. Percentage of necrotic surfaces of leaves or brown surfaces (estimation), employing an empirical evaluation scale that makes it possible to evaluate an infection index.

Results:

During all the monitoring studies, no symptoms associated with *X. fastidiosa* (necrotic leaves) were observed on the trees treated with the product. The growth of all the treated trees was good and free of symptoms through to January 20 (last reading).

2. The level of olive tree dieback linked to *X. fastidiosa*

Results:

During the first four monitoring studies, no symptoms associated with dieback were observed on the trees treated with the product of the present invention. In the last monitoring study on January 20, just one olive tree exhibited symptoms of dieback. In contrast, the symptoms appeared and progressed on all the "control" plants.

The results of ELISA tests performed on symptomatic leaves were positive, demonstrating the presence of *X. fastidiosa*. In addition, the results were also positive for all the samples from all the trees, whether treated or not.

3. The level of re-growth of vegetation (number of new young leaves)

Figure 3:
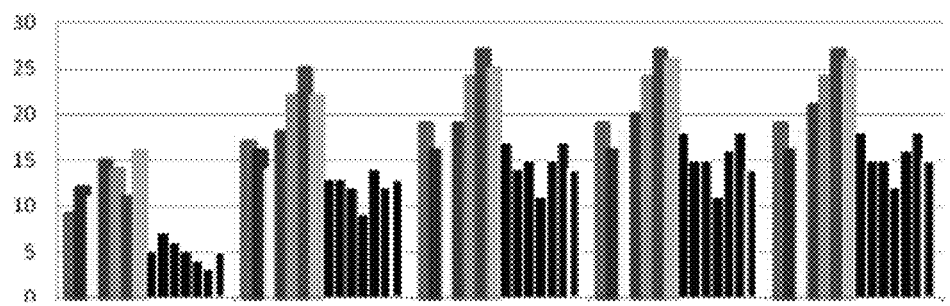
FIG. 3 is a diagram showing the re-growth of vegetation (number of young leaves/shoot) for treated olive trees and "control" olive trees.
Figure 4:
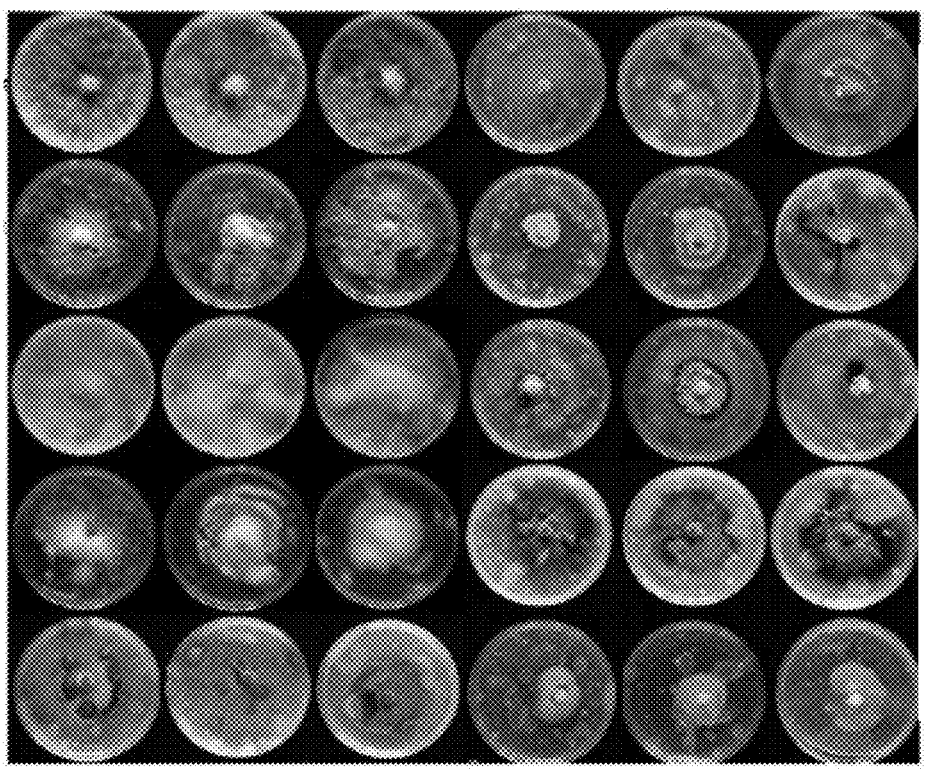
FIG. 4 shows the results of potential inhibition of the product that is the subject of the invention on certain fungal species when the product has been included in the culture medium.
Figure 5:
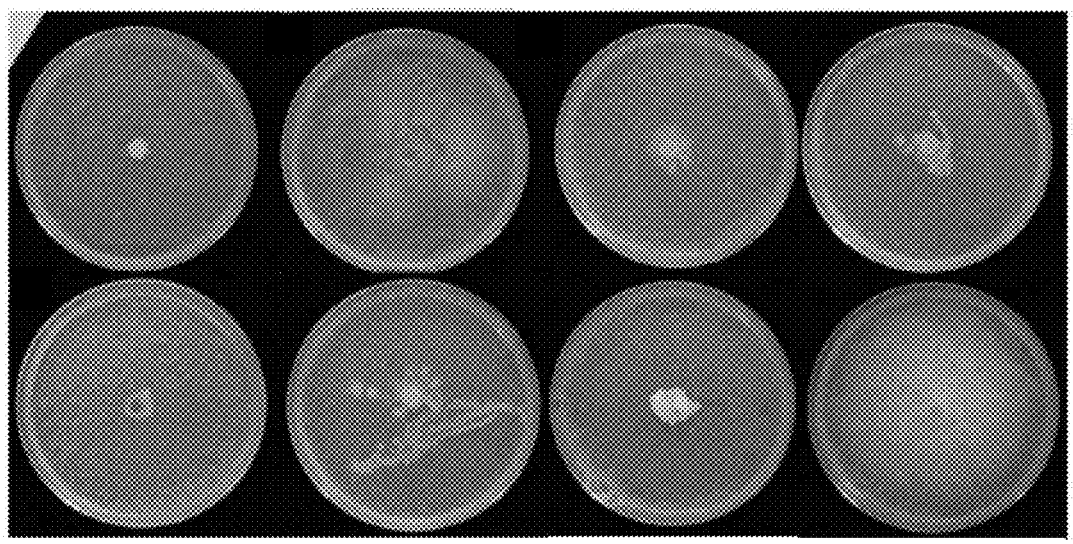
FIG. 5 shows the results of potential inhibition of the product that is the subject of the invention on certain fungal species when the product has been applied on the surface of the culture medium.

Results:

As shown in FIG. 3, all the trees showed a good response to the treatments with the product. The development of the last branches of the current year was evaluated by counting leaves from the insertion point (FIG. 2).

In effect, the untreated olive trees examined produced a smaller number of new leaves, less than twenty per branch, whereas the treated olive trees produced a number much higher than twenty, in certain cases twenty-seven. In the graphs, the numbers refer to the mean values of twelve data, three for each cardinal point.

| Treatments | October 5 | October 27 | November 30 | December 18 | January 20 |
|---|---|---|---|---|---|
| TRT1 | 9 | 17 | 19 | 19 | 19 |
| TRT2 | 12 | 16 | 16 | 16 | 16 |
| TRT3 | 11 | 14 | 17 | 18 | 18 |
| TRT4 | 15 | 18 | 19 | 20 | 21 |
| TRT5 | 14 | 22 | 24 | 24 | 24 |
| TRT6 | 11 | 25 | 27 | 27 | 27 |
| TRT7 | 16 | 22 | 25 | 26 | 26 |
| CTR1 | 5 | 13 | 17 | 18 | 18 |
| CTR2 | 7 | 13 | 14 | 15 | 15 |
| CTR3 | 6 | 12 | 15 | 15 | 15 |
| CTR4 | 5 | 9 | 11 | 11 | 12 |
| CTR5 | 4 | 14 | 15 | 16 | 16 |
| CTR6 | 3 | 12 | 17 | 18 | 18 |
| CTR7 | 5 | 13 | 14 | 14 | 15 |

4. The product was tested under in vitro conditions with the *X. fastidiosa* bacteria (in an accredited laboratory) and other main fungal species associated with CoDiRO disease: *Phaeoacremonium, Phaeomoniella, Pleurostomophora, Colletotrichum, Botryosphaeriaceae.*

Results:

Two different types of trials were performed, as indicated:

Vaporization: the product was sprayed onto Petri dishes containing the Potato Dextrose Agar (PDA) culture medium. When the product was totally absorbed by the medium, the fungal species were transferred. The fungal growth of each species was observed every seven days for twenty-one days. FIG. 4 represents the last observation. The columns of dishes represent successively, from left to right, 100 ppm, 10 ppm, 1 ppm, 100 ppm, 10 ppm, 1 ppm. On the left, from top to bottom, are the dishes with *Botryosphaeriaceae, C. gloeasporioides, R. necatrix, V. dahliae, Pl. richardsiae*. On the right, from top to bottom, are the dishes with *Pm. scolyti, Pm. italicum, Pm. minimum, Pm. parasiticum, Phaeomoniella* spp.

Inclusion: the product was included in the PDA medium before solidification. Three different concentrations were used: 100, 10, and 1 ppm. When the Petri dishes had completely solidified, the fungal species were transferred. The fungal growth of each species was observed every seven days for twenty-one days. FIG. 5 represents the last observation.

The top row in FIG. 5 shows, from left to right, *Phaeomoniella* spp, *Pl. richardsiae, Pm. parasiticum* and *Pm. minimum*. The bottom row in FIG. 5 shows, from left to right, *Pm. italicum, Pm. scolyti, V. dahliae* and *R. necatrix.*

Results:

As the product is an unautoclaved natural extract, when it was sprayed on the surface of the culture medium or when it was included in this medium, many saprophytic bacteria slowed and hindered the growth of the pathogenic fungi tested (see FIGS. 4 and 5). The same problem was detected during trials with *X. fastidiosa*. This is because *X. fastidiosa* is a very slow growing bacteria, and therefore its development is easily slowed by the saprophytic bacteria with more rapid development. Despite these observations, the product did not seem to directly inhibit fungal growth, and each microorganism tested seemed able to develop, in both situations (Spraying and inclusion of the product).

5. The chlorophyll content of the leaves (Spad Index)

Results:

This parameter was detected by the Minolta Chlorophyll Meter SPAD-50 (registered trademarks). This instrument measures, in vivo, the total quantity of chlorophyll contained in the plants tissues, and therefore indirectly measures the plants nutritional status. As shown in FIG. 6, the result of the photosynthetic quality of the leaves treated with the product was better than that of the leaves of the untreated plants. It can be affirmed that the plants treated with the product have a greater capacity to transport nutrients and water than the untreated plants.

| Treatments | October 5 | October 27 | November 30 | December 18 | January 20 |
|---|---|---|---|---|---|
| TRT1 | 70.5 | 81.4 | 70.5 | 67.2 | 66.6 |
| TRT2 | 75.1 | 81.6 | 75.1 | 70.2 | 68.1 |
| TRT3 | 75.3 | 85.8 | 75.3 | 65.4 | 69.8 |
| TRT4 | 80.2 | 98.7 | 80.2 | 62.3 | 66.1 |
| TRT5 | 78.7 | 88.2 | 78.7 | 66.4 | 67.0 |
| TRT6 | 91.3 | 104.5 | 91.3 | 69.5 | 64.9 |
| TRT7 | 88.7 | 95.5 | 88.7 | 63.9 | 65.1 |
| CTR1 | 67.1 | 76.4 | 67.1 | 58.4 | 49.9 |
| CTR2 | 58.4 | 67.5 | 58.4 | 54.0 | 57.2 |
| CTR3 | 47.8 | 58.9 | 47.8 | 50.2 | 51.8 |
| CTR4 | 63.2 | 68.9 | 63.2 | 55.2 | 51.9 |
| CTR5 | 71.0 | 78.9 | 71.0 | 49.5 | 51.6 |
| CTR6 | 64.9 | 81.3 | 64.9 | 55.4 | 54.5 |
| CTR7 | 69.9 | 79.3 | 69.9 | 59.1 | 55.9 |

6. Stomatal conductance (water potential)

Results:

FIG. 7 lists the stomatal conductance values. They have a direct relationship with the plant's potential for transporting water (i.e. its capacity to move the sap from the roots to the leaves). The higher stomatal conductance values indicate the excellent capacity of vessels to transport the raw sap to the leaves. As shown in FIG. 7, the values were always (during the monitoring studies) higher for the olive trees treated with the product of the invention than for the untreated olive trees. The differences diminished during winter periods, which should be viewed in relation to the tree's metabolism during this period.

| Treatments | October 5 | October 27 | November 30 | December 18 | January 20 |
|---|---|---|---|---|---|
| TRT1 | 98.3 | 135.1 | 96.3 | 65.9 | 64.2 |
| TRT2 | 89.3 | 97.8 | 92.2 | 72.8 | 73.9 |
| TRT3 | 85.5 | 122.6 | 101.9 | 88.2 | 79.5 |
| TRT4 | 108.2 | 108.6 | 97.2 | 69.9 | 74.3 |
| TRT5 | 91.3 | 92.5 | 90.4 | 71.5 | 67.9 |
| TRT6 | 87.6 | 98.6 | 88.1 | 65.3 | 68.5 |
| TRT7 | 97.2 | 92.4 | 86.5 | 69.9 | 66.3 |
| CTR1 | 53.8 | 63.5 | 56.9 | 55.2 | 54.4 |
| CTR2 | 58.4 | 56.5 | 62.7 | 60.1 | 61.3 |
| CTR3 | 64.1 | 68.7 | 64.7 | 60.6 | 59.4 |
| CTR4 | 52.1 | 62.9 | 78.5 | 58.9 | 55.4 |
| CTR5 | 46.7 | 76.3 | 66.3 | 57.7 | 58.6 |
| CTR6 | 56.9 | 76.1 | 80.5 | 57.6 | 58.9 |
| CTR7 | 51.2 | 66.2 | 78.4 | 69.0 | 58.9 |

Conclusion

On the basis of the results obtained, it can be established that the treatment with the product of the present invention was capable of limiting the symptoms of *X. fastidiosa*, on all the plants treated, even though the ELISA analyses performed on the samples collected on October 5 and January 20 were still positive for the presence of the bacteria.

This means that, in these trial conditions, the product was not able to completely eradicate the bacteria from the plants, but that it did enable the olive trees, after only six treatments, to recover a normal capacity for growth (increased number of leaves, increased photosynthesis, increased stomatal conductance). The product enabled a significant limitation in the effects of the *X. fastidiosa* bacteria. In addition, the treatments were started at the end of summer (the worst period for starting a trial), and continued through autumn (when plants are not easily responsive).

With the aim of confirming the effects of the product on olive trees, another trial was carded out.

Example 4

The results presented below were obtained in this second trial against *Xylella fastidiosa* on olive trees with the product of the present invention. The olive grove used for the trial is located in an infected area where the presence of *X. fastidiosa* had been observed in October 2013.

The trial consisted of seven treatments, with the product of the present invention, carried out on the following dates:

May 19
May 26
June 10
July 22
August 10
September 7 and
October 7

Data was collected in the area on the following dates:

May 13
June 15
October 6 and
November 24.

1. The percentage of necrotic surfaces of leaves or brown surfaces (estimation) in the treated plants and the "control" plants, using an empirical evaluation scale that makes it possible to evaluate an infection index. The new leaves could be measured one month after the start of the treatment.

2. The level of olive tree dieback linked to *X. fastidiosa* in the treated plants and the "control" plants.

3. The level of re-growth of vegetation (number of new young leaves) for the treated olive trees and "control" olive trees.

4. The harvest weight (if there is a harvest). It is undoubtedly likely that the olive trees used for the trial are not capable of producing olives, because they had been extensively pruned.

5. The product was tested under in vitro conditions with the *X. fastidiosa* bacteria (in an accredited laboratory) and other main fungal species associated with CoDiRO disease: *Phaeoacremonium, Phaeomoniella, Pleurostomophora, Colletotrichum, Botryosphaeriaceae.*

6. The chlorophyll content of the leaves (Spad Index) of treated olive trees and "control" olive trees.

7. Stomatal conductance (water potential) in the control plants and the treated plants.

8. An ELISA test for the presence of the *X. fastidiosa* bacteria on samples of olives collected during each collection phase, including before the treatments (5 tests).

The results obtained are discussed below, point by point.

Activities/Results:

1. The percentage of necrotic surfaces of leaves or brown surfaces (estimation)

Results:

All the plants had been pruned on May 13 to eliminate all the parts with symptoms. On May 19, an initial reading was taken to record the chlorophyll and stomatal conductance levels, and also to confirm the presence of the *X. fastidiosa* bacteria. Following this, and during all the monitoring studies, the symptoms of *X. fastidiosa* associated with necrotic leaves were never observed on the plants treated with the product of the present invention. The growth of all the trees treated with the product was good and free of symptoms through to November 24, whereas the untreated "control" plants exhibited symptoms of decline such as apical necrosis of the leaves and their yellowing.

2. The level of olive tree dieback linked to *X. fastidiosa*

Results:

During the trial, the symptoms associated with dieback were not observed on the trees treated with the product of the present invention, and the treated trees showed normal development throughout the period. The untreated "control" plants rapidly exhibited symptoms of dieback.

In the last monitoring study on November 24, just one treated olive tree exhibited symptoms of dieback. In this case, these symptoms have been associated with the presence of fungal pathogenic agents such as *Phaeoacremonium* spp. and *Botryosphaeriaceae* spp., *Phaeocaremonium* spp. These isolates are vascular pathogens of the wood of the olive trees, responsible for the browning of the wood and the weakening and dieback of the branches and stems. The isolates of *Botryosphaeriaceae* are pathogenic agents responsible for dieback in woody plants including olive trees. The samples collected from the untreated "control" plants that showed the symptoms of decline characteristic of *X. fastidiosa* were also infected by the same fungi mentioned above. The presence of vascular fungi and wood fungi is in correlation with the age of the plant. These fungi are common in olive trees and are the cause of a slow decline in the infected tree. Some fungi can be more aggressive and cause a rapid dieback in part or all of the plant. Generally, a good agricultural practice such as pruning is suitable to reduce the effects of these pathogens and their aggressiveness.

The results of ELISA tests performed on the symptomatic leaves were positive for the *X. fastidiosa* bacteria. In addition, the results were also positive for all the examples of leaves collected from the treated or untreated plants.

3. The level of re-growth of vegetation (number of new young leaves).
Results:
In FIG. 8/Table 1, all the plants treated showed a good response to the treatments with the product of the present invention. The development of the last branches of the current year was evaluated by counting leaves from the insertion point and the length of the same branch up to the following collection (November 24).

Last evaluation: The untreated olive trees produced a smaller number of new leaves, less than 21 per branch (East, control tree T7, November 24), whereas the olive trees treated with the product produced more than 25 new leaves, in some cases the number of new leaves was 41 (West, control tree T5, November 24).

In addition, the difference in length of the same branches was significant (FIG. 9/Table 2). In fact, the greatest length achieved in the control trees was 63 cm (South, control tree T7, November 24), whereas the greatest branch length in the treated trees was 111 cm (West, control tree T5, November 24). The numbers indicated in FIG. 9/Table 2 represent the mean values of twelve data, three per cardinal point. An analysis of variance (Anova) and a Fisher test with $P<0.01$ were performed on the data.

4. The harvest weight (if there is a harvest).

Results:

Following the heavy pruning carried out on the trees before the treatments, the production of olives was very small. The production figure for each tree varied between 11.5 kg and 25.8 kg.

However, the different level of initial pruning between the trees did not make it possible to seriously demonstrate a significant difference in the total harvest for each tree.

5. Mycological analyses:

One hundred olives coming from each treated and untreated tree were used for the mycological analyses. No pathogenic fungus was isolated on the olives (700) coming from trees treated with the product of the present invention. Only saprobe fungi such as *Penicillium* spp., *Aspergillus* spp., *Mucor* spp., Rhizopus spp., (in total 17 isolates), etc. were detected.

In contrast, in the olives (700) from the untreated "control" olive trees the fungi isolated were:

442 isolates of *Collototrichum* spp. (antrachnose),
136 isolates of *Botryosphaeriaceae* spp. (drupe rot),
42 isolates of *Alternaria/Stemphyllium* (Sooty mold),
55 isolates of *Fusarium* spp. (saprobes or drupe rot),
25 isolates of *Penicillium* spp., *Aspergillus* spp., *Mucor* spp., *Rhizoctonia* spp. etc.

5. The product was tested under in vitro conditions with the *X. fastidiosa* bacteria (in an accredited laboratory) and other main fungal species associated with CoDiRO disease: *Phaeoacremonium, Phaeomoniella, Pleurostomophora, Colletotrichum, Botryosphaeriaceae.*

Two different types of trials were performed, as indicated:

Vaporization: the product was sprayed onto Petri dishes containing the Potato Dextrose Agar (PDA) culture medium. When the product was totally absorbed by the medium, the fungal species were transferred. The fungal growth of each species was observed every seven days for twenty-one days.

Inclusion: the product was included in the PDA medium before solidification. Three different concentrations were used: 100, 10, and 1 ppm. When the Petri dishes had completely solidified, the fungal species were transferred. The fungal growth of each species was observed every seven days for twenty-one days.

Results:

As the product is an unautoclaved natural extract, when it was sprayed on the surface of the culture medium or when it was included in this medium, many saprophytic bacteria developed and they slowed the growth of the pathogenic fungi tested. The same problem had been detected when *X. fastidiosa* was used. The product did not seem to hinder fungal growth directly.

This result was the same as for the first trial.

6. The chlorophyll content of the leaves (Spad Index).

Results:

This parameter was detected by the Minolta Chlorophyll Meter SPAD—50 device. This instrument measures, in vivo, the total quantity of chlorophyll contained in the plant's tissues, and therefore indirectly measures the plant's nutritional status. As FIG. 10/Table 3 shows, the result of the photosynthetic quality of the leaves treated with the product can be seen to be better than that of the leaves of the untreated plants. It can be affirmed that the plants treated with the product have a greater capacity to transport nutrients and water than the untreated plants.

An analysis of variance (Anova) and a Fisher test with $P<0.01$ were performed on the data.

The results were significantly better after several treatments (last monitoring study).

7. Stomatal conductance (water potential)

Results:

FIG. 11/Table 4 lists the stomatal conductance values. They have a direct relationship with the plant's potential for transporting water (i.e. its capacity to move the raw sap from the roots to the leaves). The higher stomatal conductance values indicate the excellent capacity of vessels to transport the raw sap to the leaves. The values are always (for all monitoring studies) higher for the olive trees treated with the product of the invention than for the untreated olive trees. An analysis of variance (Anova) and a Fisher test with $P<0.01$ were performed on the data. The results were better after several treatments (last monitoring study).

FIG. 8/Table 1. Re-growth of vegetation (number of new young leaves) for each plant treated, including the control plants (* the values indicated represent the mean of 12 data, 3 per cardinal point).

Number of Leaves

| Treatments | May 13 | June 15 | October 6 | November 24 |
|---|---|---|---|---|
| TRT_1 | 3.00 | 26.50 | 33.25 | 36.75 |
| TRT_2 | 3.25 | 14.75 | 24.50 | 28.25 |
| TRT_3 | 3.00 | 14.50 | 23.00 | 25.75 |
| TRT_4 | 2.75 | 18.00 | 25.50 | 29.75 |
| TRT_5 | 2.75 | 19.25 | 30.75 | 35.00 |
| TRT_6 | 3.00 | 17.00 | 24.25 | 28.25 |
| TRT_7 | 2.75 | 17.50 | 25.50 | 29.50 |
| CTR_1 | 3.00 | 7.75 | 12.25 | 13.00 |
| CTR_2 | 3.50 | 8.75 | 15.50 | 15.75 |
| CTR_3 | 3.25 | 9.50 | 16.25 | 17.25 |
| CTR_4 | 2.75 | 9.00 | 15.50 | 16.00 |
| CTR_5 | 3.00 | 10.00 | 15.25 | 15.50 |
| CTR_6 | 3.25 | 10.75 | 17.00 | 17.25 |
| CTR_7 | 3.25 | 11.25 | 17.25 | 19.25 |

FIG. 9/Table 2. Re-growth of vegetation (length of new branches) for each plant treated, including the control plants (* the values indicated represent the mean of 12 data, 3 per cardinal point). The same letters indicate that there is no significant difference between the values.

| Treatment | May 13 | June 15 | October 6 | November 24 |
|---|---|---|---|---|
| TRT_1 | 3.25 A* | 66.25 B | 88.75 B | 93.75 B |
| TRT_2 | 3.50 A | 53.75 B | 78.18 B | 84.00 B |
| TRT_3 | 3.00 A | 56.00 B | 78.25 B | 83.00 B |
| TRT_4 | 3.25 A | 62.50 B | 86.75 B | 92.00 B |
| TRT_5 | 2.75 A | 65.75 B | 93.25 B | 99.00 B |
| TRT_6 | 3.00 A | 59.00 B | 79.75 B | 84.25 B |
| TRT_7 | 2.25 A | 60.00 B | 83.25 B | 89.00 B |
| CTR_1 | 3.25 A | 12.08 A | 52.13 A | 54.25 A |
| CTR_2 | 3.50 A | 18.15 A | 51.03 A | 52.00 A |
| CTR_3 | 3.00 A | 16.50 A | 44.35 A | 46.75 A |
| CTR_4 | 3.25 A | 16.85 A | 50.40 A | 52.25 A |
| CTR_5 | 2.75 A | 14.65 A | 49.85 A | 51.13 A |
| CTR_6 | 3.00 A | 14.33 A | 38.30 A | 39.58 A |
| CTR_7 | 2.25 A | 12.38 A | 36.25 A | 39.25 A |

FIG. 10/Table 3. The chlorophyll content (Spad Index) (* the values indicated represent the mean of 12 data, 3 per cardinal point). The same letters indicate that there is no significant difference between the values.

Chlorophyll Index

| Treatments | May 13 | June 15 | October 6 | November 24 |
|---|---|---|---|---|
| TRT_1 | 70.80 A* | 76.73 AB | 88.45 AB | 87.90 B |
| TRT_2 | 72.73 A | 73.88 AB | 104.48 AB | 91.08 B |
| TRT_3 | 68.45 A | 76.83 AB | 96.03 AB | 92.95 B |
| TRT_4 | 62.65 A | 90.13 B | 113.48 AB | 89.75 B |
| TRT_5 | 69.00 A | 78.40 AB | 102.85 AB | 90.03 B |
| TRT_6 | 72.33 A | 75.73 AB | 111.18 AB | 90.00 B |
| TRT_7 | 73.55 A | 70.13 A | 117.08 B | 93.93 B |
| CTR_1 | 60.58 A | 65.88 A | 78.50 A | 69.08 A |
| CTR_2 | 62.15 A | 63.03 A | 98.70 AB | 71.60 A |
| CTR_3 | 58.23 A | 66.60 A | 83.23 AB | 69.25 A |
| CTR_4 | 55.65 A | 79.55 B | 97.75 AB | 72.23 A |
| CTR_5 | 61.98 A | 74.23 AB | 94.85 AB | 71.15 A |
| CTR_6 | 65.58 A | 65.50 A | 103.18 AB | 69.48 A |
| CTR_7 | 63.33 A | 63.10 A | 103.18 AB | 72.40 A |

FIG. 11/Table 4. The water potential of leaves and stomatal conductance (* the values indicated represent the mean of 12 data, 3 per cardinal point).

| Treatments | May 13 | June 15 | October 6 | November 24 |
|---|---|---|---|---|
| TRT_1 | 52.13 | 89.38 | 100.63 | 116.30 |
| TRT_2 | 63.63 | 151.43 | 139.68 | 146.45 |
| TRT_3 | 43.98 | 97.93 | 143.13 | 144.13 |
| TRT_4 | 45.15 | 137.60 | 142.85 | 139.88 |
| TRT_5 | 40.95 | 129.00 | 149.65 | 157.68 |
| TRT_6 | 52.90 | 133.48 | 147.05 | 133.93 |
| TRT_7 | 45.75 | 127.83 | 141.75 | 144.93 |
| CTR_1 | 59.55 | 92.60 | 91.23 | 87.00 |
| CTR_2 | 58.75 | | 118.45 | 110.10 |
| CTR_3 | 55.25 | 88.75 | 118.50 | 96.78 |
| CTR_4 | 53.73 | 117.05 | 125.23 | 110.90 |
| CTR_5 | 46.65 | 126.10 | 126.23 | 118.65 |
| CTR_6 | 47.88 | 133.48 | 128.30 | 102.70 |
| CTR_7 | 55.65 | 112.85 | 126.53 | 121.08 |

Conclusions

On the basis of the results obtained, treatment by the product of the present invention made it possible to limit the symptoms of *X. fastidiosa* bacteria on all the trees treated, even though the ELISA analyses performed on the samples collected on November 24 were always positive for demonstrating the presence of *X. fastidiosa*. This means that, in trial conditions, the product was not able to totally eradicate the bacteria from the plants. However, the product enabled trees to limit the pathogenic effects of the *X. fastidiosa* bacteria very significantly, and to prevent the symptoms.

In addition, on the basis of the results obtained by the fungal analyses, the product of the present invention was capable of completely preserving the olives from fungal pathogens such as *Colletotrichum, Botryosphaeriaeae, Alternaria/Stemphylium*, and *Fusarium* spp, responsible for severe diseases in olive trees, and generally associated with damage caused by *X. fastidiosa*.

The use of the product on the olive trees showed that it was also a good protector for the other olive diseases.

The plants treated with the product were well developed, because the vegetable crown of the olive trees was rich, the color of the leaves superb, the length of the young branches significant, the quality of the olives excellent, the state of the trees was perfect, they looked healthy.

The product is of great interest in the emergency phytosanitary context, when time is urgent with the disease caused by the *X. fastidiosa* bacteria, and a solution has to be found to preserve the trees from this very serious disease. A protocol is being studied in order to be also used as a preventive treatment over several years, and contain the epidemic caused by Xf, so as to preserve and conserve the legacy of olive trees, in the south of Italy, and in the other parts of the world.

Example 5

To verify the product's effectiveness against *Xylella*, the product was tested again, by a BPE authorized organization, on the olive trees in the quarantine area, in the south of Italy. In this trial, the name of the product was PP1.

Note that the trial had to be carried out over three years, in order to have sufficient time to review the effectiveness of the product in fighting *Xylella fastidiosa* (recovery of tree vigor, increased olive production), and also its capacity to limit the spread of the bacteria and contain the epidemic.

Summary

The trial was aimed at evaluating the effectiveness of the experimental biostimulant against the pathogenic bacteria *Xylella fastidiosa*. The experimental product was tested in three different concentrations (0.5N, 1N and 2N) and compared with Ossiclor (registered trademark) 35 WG standard (copper oxychloride 35%, WG), a copper-based special product, the only reference used against bacterial diseases, with no great effectiveness against *Xylella*. The list of treatments is presented in the following table:

| Treatment number | Type | Treatment Name | Concentration | Description | Application code | Application description | Frequency |
|---|---|---|---|---|---|---|---|
| 1 | CHK | Not treated | — | Not treated | — | — | — |
| 2 | FUNG | PP1 | 0.5N | Stimulate defenses | ABCDEFGHIJK | From leaf buds to crop maturity | 15 days |
| 3 | FUNG | PP1 | 1N | Stimulate defenses | ABCDEFGHIJK | | 15 days |
| 4 | FUNG | PP1 | 2N | Stimulate defenses | ABCDEFGHIJK | | 15 days |
| 5 | FUNG | Ossiclor 35 WG | 35% (2.86 Kg/ha) | Curative/ Preventive | AG | | A: after pruning B: after flowering C: end of August/beginning of September |

Introduction

The trial was carried out near Ugento in the Lecce province, Apulia region (southern Italy), in a farm typical of this region in terms of varieties, cultivation techniques of olives for oil production. The presence of olive trees showing symptoms due to *Xylella fastidiosa* had been confirmed beforehand.

Olive trees belonging to the genotype Olea europaea of the variety Carolea were selected for this trial, in an olive grove transplanted in January 1993.

This was a randomized complete block (RCB) trial with four repetitions. The surface area of the plot was 96 m$^2$ (6×16 m) with four plants per plot.

The weather conditions recorded during the trial period became drier and warmer than the average seasonal values, especially in the first periods of the establishment of the trial, i.e. from June to the end of August, which had a negative impact on the vegetative luxuriance of the olive trees in general, and on the progression of the disease.

From the protocol, a total of 11 foliar applications were carried out, except for the copper-based treatment for which only three applications were scheduled (in accordance with the instructions for user), according to local practices. The first application (application A) took place on Jan. 1, 2017 at the stage BBCH 70 (first fruit visible), while the last application (application K) was carried out on Oct. 26, 2017 at a stage BBCH 81 (beginning of fruit ripening). All the experimental applications were carried out with an interval of 13-15 days between them.

All the modalities were applied by means of a backpack sprayer operating at a pressure of 4 BAR, using a water volume of 80 liters per treatment.

Evaluation:

Eight evaluations were carried out during the trial: just before application A (0 DA-A (for "Day After A"), 0 DA-D, 0 DA-E, 0 DA-G, 0 DA-I, 7 DA-J, 0 DA-K and 11 DA-K. The evaluations involved the following parameters:

Percentage of the disease (DAMDIS): average severity of the disease per plot;

Number of new sprouts per shoot;

Vigor of the cultivation, expressed on a scale of 0 to 10, where "10"=maximum vigor of the cultivation, and "0"=dead plant;

Mean length of new sprouts;

NDVI index (0-1): Normalized Difference Vegetation Index. The normalized difference vegetation index (NDVI) quantifies the vegetation by measuring the difference between the near infra-red (which the vegetation reflects strongly) and red light (which the vegetation absorbs);

Transpiration of the leaves, expressed as the stomatal conductance (mmol/m$^2$×sec) measured by means of a porometer (mean value obtained from four measurements per tree);

At harvest (11 DA-K), evaluation of the yield (kg/plot), the weight of 100 olives (g) and the oil content (%);

Selectivity evaluations of the cultivations were carried out (0 DA-B; 0 DA-C; 0 DA-D; 0 DA-F; 0 DA-G; 0 DA-I. 0 DA-H) during cultivation in order to detect all the symptoms of phytotoxicity (PHYGEN) due to the application of the experimental product, such as chlorosis, yellowing, through comparisons with the untreated plots. The results were expressed as percentages, where "0" signifies the absence of symptoms, and "100" signifies a maximum of damage to the crop.

Statistical Analyses

The data were analyzed using ANOVA in the Agriculture Research Manager (ARM) version 2017.4 research database system. When this involved significant statistical differences, the analyses were followed by a Student-Newman-Keuls test at 95%. When two means share the same alphabetic rating, they are not significantly different.

Results: Percentage of the disease (DAMDIS): average severity/seriousness of the disease per plot (FIG. 13). FIG. 13 shows:

On Jun. 1, 2017 (0 DA-A, at stage BBCH 70), before the first application of the products (application A), the pressure of the disease was characterized for the trial (DAMDIS) as varying from 10.8% to 18.8% (see FIG. 13).

On Aug. 24, 2017 (0 DA-G, at stage BBCH 76), the DAMDIS values were unchanged from the previous evaluation, varying from 10.8% to 18.8% (see FIG. 13).

The distribution of the disease was homogeneous between the modalities, which confirmed the validity of the trial.

1. Number of New Sprouts Per Shoot

On Sep. 22, 2017 (0 DA-I, stage BBCH 78), with respect to the mean number of new sprouts per shoot recorded, the untreated control gave 0.0 sprouts/shoot (see FIG. 14). The results recorded for the other treatments changed little during the trial. Treatment 4 (PP1 2N) obtained the highest result with 2.13 new sprouts/shoot, followed by treatment 3 (PP1 1N) and treatment 2 (PP1 0.5N) with 1.23 and 1.15 new sprouts/shoot respectively. Lastly, treatment 5 (Ossiclor 35 WG) recorded the smallest number of new sprouts/shoot, equal to 0.28.

On Oct. 26, 2017 (0 DA-K, stage BBCH 81), the results recorded were identical to the previous evaluation on Sep. 22, 2017.

It should be noted that the weather conditions (severe drought) affected the growth of trees generally in the region.

In addition, in the event of attack by *Xylella fastidiosa*, the trees generally tend to decline and die within a period of 3 to 5 years. In addition, the plants of the control modality produced no new sprouts (FIG. 14).

The fact that the trees treated with the product of the invention enabled the trees to produce new sprouts on each shoot, reflects the fact that stimulation of the metabolism is operating.

It can be seen on the plants treated with the cupric reference (antibacterial action) that this did not enable the trees to generate as many new sprouts, which showed its limit of action against the bacteria (FIG. 14). FIG. 14: Evaluation of the number of new sprouts/shoot.

2. Vigor of the Cultivation: FIG. 15: Evaluation of the Vigor of the Cultivation On Jul. 14, 2017 (0 DA-D, stage BBCH 73)/Jul. 28, 2017 (0DA-E, stage BBCH 74)/Aug. 10, 2017 (0 DA-F, stage BBCH 75)/Aug. 24, 2017 (0 DA-G, stage BBCH 78), no statistical difference was identified between the treatments (FIG. 15).

On Sep. 22, 2017 (0 DA-I, stage BBCH 78), the best performance was obtained by treatment 4 (PP1 2N, see FIG. 15), which continued to have the maximum vigor value of 10.0. Treatment 3 (PP1 1N) showed a slightly lower value of 9.5, followed by treatment 2 (PP1 0.5N) with 9.0. The lowest cultivation vigor among the treatments was obtained by the copper-based commercial treatment (Ossiclor 35 WG) with 8.8, which is not statistically different from the control with 8.3.

On Oct. 26, 2017 (0 DA-K, stage BBCH 81), the best performance was achieved with treatment 4 (PP1 2N, see FIG. 15), which continued to have the maximum vigor value of 10.0. Treatment 3 (PP1 1N) showed a slightly lower value of 9.5, followed by treatment 2 (PP1 0.5N) with 9.0. The lowest cultivation vigor among the treatments was obtained by the copper-based commercial treatment (Ossiclor 35 WG) with 8.8, and the untreated control with 7.5.

The last readings therefore show the first positive effects of PP1 on the vigor of the trees, in a significant way, whereas the disease continued to progress in the control trees.

3. Mean Length of New Sprouts: FIG. 16: Evaluation of the Length of New Sprouts

On Sep. 22, 2017 (0 DA-I, stage BBCH 78), the largest mean length of sprouts was achieved with treatment 4 (2N), (6.18 cm, see FIG. 16), followed by treatments 3 and 2 (1N and 0.5 N) which respectively measured on average 2.69 cm and 2.10 cm, while treatment 5 (cupric reference) again recorded the lowest result, with only 0.65 cm.

On Oct. 26, 2017 (0 DA-I, stage BBCH 81), the largest mean length of sprouts was obtained by treatment 4 (2N), (8.72 cm, see FIG. 16), followed by treatments 3 and 2 (1N and 0.5 N) which respectively measured on average 5.38 cm and 3.43 cm, while treatment 5 (cupric reference) again recorded the lowest result, with only 1.22 cm.

As indicated in point 2 above, not only did the treatments with the product of the invention enable a significantly higher production of new sprouts relative to the control, but the treatments also enabled a significantly greater growth of new sprouts.

4. NVDI: FIG. 17: Evaluation of the NVDI Character

On Sep. 22, 2017 (0 DA-I, stage BBCH 78), treatments 4 and 3 (PP1 N and 2N) obtained the best performance levels, with a mean NDVI of 0.77 and 0.76, followed by treatment 2 (PP1 0.5 N) which obtained a mean NDVI equal to 0.74. The lowest NDVI was recorded by treatment 5 (Ossiclor 35 WG), comparable to that of the control (NDVI equal to 0.71, see FIG. 17).

On Oct. 26, 2017 (0 DA-I, stage BBCH 81), treatments 4 and 3 (PP1 N and 2N) obtained the best performance levels, with a mean NDVI of 0.78 and 0.77, followed by treatment 2 (PP1 0.5 N) which obtained a mean NDVI equal to 0.75. The lowest NDVI was recorded by treatment 5 (Ossiclor 35 WG), comparable to that of the control (NDVI equal to 0.71, see FIG. 17).

5. Stomatal conductance: FIG. 18: Evaluation of the Stomatal Conductance

On Oct. 12, 2017 (7 DA-J, stage BBCH 78), the stomatal conductance was measured by means of a porometer (mean value obtained from four measurements per tree). The highest results were reached by treatment 4 (2 N) and treatment 3 (1N), which respectively showed mean values of 374.5 and 378.2 mmol/m$^2$×sec, followed by treatment 2 (0.5N) which showed mean values of 360.1 mmol/m$^2$×sec. The lowest stomatal conductance value was obtained by treatment 5 (Ossiclor 35 WG) with 331.6 mmol/m$^2$×sec, which was not statistically different from the untreated control (308.8 mmol/m$^2$×sec, see FIG. 18).

On Nov. 6, 2017 (11 DA-K, stage BBCH 87), the highest results were reached by treatment 4 (2 N) and treatment 3 (1N), which respectively showed mean values of 383 and 379.5 mmol/m$^2$×sec, followed by treatment 2 (0.5N) which showed a value of 348.1 mmol/m$^2$×sec. The lowest stomatal conductance value was obtained by treatment 5 (Ossiclor 35 WG) with 329.5 mmol/m$^2$×sec, which was not statistically different from the untreated control (299.6 mmol/m$^2$×sec, see FIG. 18).

The PP1 product therefore enabled the trees to acquire substantially higher stomatal conductance than the control trees, which indirectly reflects the reduction in Xf infection.

6. Evaluation of the Yield a/ Fresh Weight of Olives/Plot (Kg/Plot): FIG. 19: Evaluation of the Fresh Weight of Olives in kg/Plot On Nov. 6, 2017 (11 DA-K, stage BBCH 87), the highest fresh weight of olives per plot was recorded by treatment 4 (PP1 2N) with 176.30 kg/plot (see FIG. 19). Treatment 3 (PP1 1N) showed a slightly lower value, equal to 167.74 kg/plot, followed by treatment 2 (PP1 0.5N) with 157.51 kg/plot. Treatment 5 (Ossiclor 35 WG) recorded 140.02 kg/plot and turned out to be slightly smaller than the control (141.79 kg/plot, see FIG. 19).

b/ Weight of the Fruit (g/100 Fruit): FIG. 20: Evaluation of the Fresh Weight of Olives (g/100 Fruit)

Treatment 4 also recorded the highest weight by far of 100 fruit, equal to 439.99 g, followed by treatment 3 (PP1 1N) with 426.99 g, and treatment 2 (PP1 0.5N) with 406.19 g. Treatment 5 (Ossiclor 35 WG) achieved 349.02 g, which is less than the control (358.15 g, see FIG. 20). The PP1 product makes it possible to produce not only the highest yield per plot by far (Kg of olives/plot), since a difference in production of almost 40 Kg was observed (which, given the size of the plot, is considerable), but also the highest yield in terms of weight of olives per 100 fruit.

c/ Oil Concentration: FIG. 21: Evaluation of the Oil Concentration

With respect to the oil content (% weight, see FIG. 21), even though differences were observed, they were not significant. Treatment 5 (Ossiclor 35 WG) and the untreated control obtained statistically similar results, equal to 21.27% and 21.28% respectively, followed by treatment 3 (PP1 1N) and treatment 2 (PP1 0.5N) with 19.63% and 19.14%. Treatment 4 (PP1 2N) recorded an oil content of 17.89% (see FIG. 21).

CONCLUSION. Based on the data collected, during this trial, the following observations have been made:

The product tested showed an interesting vegetative response in the olive trees affected by *Xylella fastidiosa*, regardless of the doses tested (0.5N, 1N and 2N). These results involved an improvement in the vegetative activity of the plants indicated by a rise in the number of new sprouts, the length of the new sprouts, the cultivation vigor and the NDVI. The overall performance of the product tested, with all the parameters described above, was always better than the copper-based formulation (Ossicior 35 WG) usually adopted by farmers.

It was also important to note than a dose effect appeared. The 2N dose showed better overall effectiveness than the 1N or 0.5N dose.

In terms of the fresh weight of the olives and the size of the fruit (weight of 100 fruit in g), the product tested showed a significant improvement regardless of the dose used, compared to the untreated control and the copper-based formulation. The 2N dose systematically gave the highest results, by far. Oil production, as a % of the weight of the olives, was statistically equivalent for all modalities. Application of the product tested at the 2N dose seemed to reduce the oil production percentage (difference not significant). This may be explained, if the phenomenon persists, by PP1's stimulation of the metabolism oriented towards defense against a bacteria as invasive as *Xylella fastidiosa.*

Application of the product tested caused no symptom of phytotoxicity on olive trees of the 'Carolea' variety during the trial regardless of the dose used.

No problem appeared during the handling of the experimental products.

In a particular embodiment, the present invention relates to the use of ground material obtained from at least one part of "rocket" plants in order to stimulate the defenses of plants and reduce the effects of the *Pseudomonas syringae* pv *actinidiae* bacteria ("PSA") on plants of the *Actinidia* genus.

The extract, which serves to supply the composition that is the subject of the present invention, was used here by foliar spray.

Example 6—Effectiveness of PP1 Against *Pseudomonas syringae* Pv *actinidiae* on Kiwi (*Actinidia chinensis*)

Introduction

Kiwi bacteriosis, caused by *Pseudomonas syringae* pv *actinidiae*, causes weakening of kiwi plants, leading to the death of the plants over a shorter or longer period.

Kiwi bacteriosis is spread by the wind and rain, and by the equipment used for pruning.

The flowers, pruning wounds, injuries caused by animals, and those left by leaf fall, are all entry points for the bacteria. As a result, the infection period reaches its peak at the end of autumn and the start of spring.

Currently, no phytosanitary product is available for curative treatments against this disease. It is only possible to carry out preventive treatments (generally copper-based) during autumn and the winter period. However, there is reason to fear phytotoxicity problems with the copper molecule, and bacterial resistance against this active substance is increasingly appearing.

I/ Installation of the Trial:

Year: 2016

Kiwi variety: Hayward

Age of the trees: 5 years

Location: Drôme (France)

Inoculation: Natural.

Number of modalities: Three modalities were tested:

Fifteen modalities were used per modality.

The modalities were the following:

1/ Control

2/ PP1 (f) sprayed at foliar level. PP1 (f) was extracted from *Eruca sativa* leaves 3/ Preventive copper treatment the previous year n−1 and the current year n+PP1 (f) sprayed at foliar level.

Recommendations:

Applications of copper are carried out immediately after the harvest, at the start of leaf fall, and at the 50% leaf fall stage.

PP1 application every 10 days, from the 2-3 leaves stage through to fruit ripening.

Volume: 700 L/Ha (volume of final slurry applied to the plants. In this case, for example, for 700 L water/Ha, the equivalent of 10 g plants/L, was ground, i.e. 7 Kg of plants. The obtained filtrate was initially obtained in a smaller volume, for transportation, and was diluted in 700 L before application).

II/ Observations Made:

A/ N Mean percentage of leaves attacked by PSA, per kiwi plant.

B/ Severity of the symptoms on leaves (mean % of leaf area presenting symptoms).

Reading: Presence of necrotic spots surrounded by a yellow halo.

The readings were taken on 100 leaves chosen at random per modality.

C/ Mean percentage of branches/plant presenting flows.

Reading: Presence observable on all the wood (trunks, branches) with a gummy exsudate flow whose color can vary from beige to brownish.

III/ Results:

A/ N Mean percentage of leaves attacked by PSA, per kiwi plant: table 1

| Date: May 25, 2016 | Mean percentage of leaves attacked by PSA, per kiwi plant. |
|---|---|
| Control | 32 a |
| PP1 | 5 b |
| PP1 + Cu (preventive) | 0 c |
| Cu (preventive) | 12 d |

The readings were taken on 100 leaves chosen at random per modality.

The different letters indicate results that differ significantly according to the Newman-Keuls test with an error threshold of 5%.

B/ Severity of the symptoms on leaves (mean % of leaf area presenting symptoms): table 2

| Date: May 25, 2016 | % of leaf area presenting symptoms |
|---|---|
| Control | 39 a |
| PP1 | 5 b |
| PP1 + Cu (preventive) | 0 c |
| Cu (preventive) | 29 a |

In this table, the readings were taken on 100 leaves chosen at random per modality. The different letters indicate results that differ significantly according to the Newman-Keuls test with an error threshold of 5%.

C/ Mean percentage of branches/plant presenting flows: table 3

| Date: May 25, 2016 | Percentage of branches/plant presenting flows |
|---|---|
| Control | 16 a (with dieback of some side branches). |
| PP1 | 1 b |
| PP1 + Cu (preventive) | 1 b |
| Cu (preventive) | 8 c (with dieback of some side branches). |

IV/ Conclusion:

The plot chosen had shown symptoms of the bacteriosis caused by PSA for several years. Drastic pruning was carried out each year to eliminate the affected branches, and prevent the contamination of neighboring groves. Despite this, the disease reappeared each year, to a greater extent.

PP1 was used to provide a new solution in the fight against this bacteria, as a preventive treatment at the onset of these symptoms. PP1 was therefore applied as of the re-growth of vegetation, at a frequency of one application every 10 days.

The preventive treatments with copper were continued in only two plots.

The treatments with PP1 significantly reduced the symptoms. This effect was visible not only on the mean % of leaves attacked (table 1), but also on the severity of the disease (table 2).

Visually, the plot treated with PP1 seemed healthy and disease-free, even though the symptoms of the bacteriosis could be detected in rigorous appraisals (32% of leaves attacked/plant in the control plot, 5% of leaves attacked/plant for the modality treated by PP1, 0% of leaves attacked/plant for the modality treated by PP1+Copper as a preventive treatment, and 12% of leaves attacked/plant for the modality treated by Copper as a preventive treatment) (table 1).

Nevertheless, on the leaves attacked by bacteriosis in the plots treated by PP1, the severity of the symptoms was significantly reduced (39% of leaf area presenting symptoms in the control plot, 5% of leaf area presenting symptoms in the PP1 plot, 0% of leaf area presenting symptoms in the PP1+Copper (preventive treatment) plot, 29% of leaf area presenting symptoms in the Copper (preventive treatment) plot) (table 2).

If the observation of exsudate flow is considered, only the treatments with PP1 made it possible to stimulate the defenses of plants or trees and reduce practically all these symptoms (table 3)

Copper, used as a preventive treatment, also made it possible to significantly reduce the symptoms. However, its level of effectiveness remained below that observed in the case of treatments with PP1 (Table 1, 2, 3).

Given the totally different mode of action of the 2 active substances (Copper and PP1), it appears interesting to combine the two treatments. In trial conditions, combining the two treatments enabled an effective fight against KIWI bacteriosis, because this program made it possible to restrict the disease to its lowest level.

In one embodiment, the present invention relates to the use of an extract from at least one part of "rocket" plants in order to stimulate the defenses of plants or trees and reduce the effects of the *Xantomonas arboricola* pv *juglandis* bacteria on walnut trees and the *Xanthomonas arboricola* pv. *Pruni* bacteria on *Prunus* spp., and in particular fruit/nut trees such as apricot trees, almond trees, cherry trees, peach trees, plum trees, *P. salicina*, cherry laurel and other exotic or ornamental *Prunus* species, including *P. davidiana* and *P. laurocerasus*.

The ground material, which serves to supply the composition that is the subject of the present invention, can be used by foliar spray or watering the soil.

Examples 7 and 8: Effectiveness of PP1 against *Xanthomonas arboricola* pv *juglandis* on walnut trees (*Juglan regia*). Demonstration of the stimulation of defenses of trees by PP1.

Introduction

Walnut tree bacteriosis is due to the *Xanthomonas arboricola juglandis* (Xaj) bacteria. Currently, no treatment is really effective against the necrosis and nut falls caused by this disease. Infection by this bacteria can cause over 50% of crops to be lost. The bacteria can attack all growing organs: leaves, shoots, female flowers, catkins and fruit.

The intensity of attacks by Xaj is increasing over time, for several reasons: Intensification of cultivation, establishment of orchards in unsuitable soils, and increasing outbreaks of the bacteria's resistance to copper.

In the absence of a solution to fight against this bacteria, in a context of the limitation of copper doses and in the presence of increased bacterial resistance, it is important to find other solutions for fighting Xaj.

Two trials on walnut trees were carried out in 2017 with the PP1 product:
  One trial under orchard conditions on 19-year-old trees of the GrandJean variety, contaminated naturally (example 7).
  One trial under nursery conditions on 7-year-old trees of the Chandler variety, contaminated artificially. The fact that PP1 works by stimulating the trees' defenses was evidenced in this second trial (example 8).

Example 7

I/ Installation of the Trial:
  Year: 2017
  Walnut variety: GrandJean
  Orchard planted: 1998
  Location: Grenoble (Isbre)
  Inoculation: Natural: This orchard had been infected since 2013
  Number of modalities: 3
  Three modalities were tested: 6 rows of 10 trees (60 trees). Each modality consisted of 2 rows of 10 trees (20 trees).
  The modalities were the following:
  1/ Control
  2/ PP1 (t) sprayed at foliar level. PP1 (t) was extracted from *Eruca sativa* stems
  3/ PP1 (f) sprayed at foliar level. PP1 (f) was extracted from *Eruca sativa* leaves
    Recommendation: Application of PP1 every 14 days, from bud burst stage (stage Cf)—7 Applications
    Advantage of PP1: No phytotoxicity at flowering stage.
    Volume: 600 L/Ha
II/ Observations Made:
  A/ N Counting the nuts fallen to the ground from fruit set to harvest.
  These counts were taken on 10 trees chosen at random per modality. During the count, the nuts with a diameter less than 1 cm presenting no symptoms were differentiated. This abscission phenomenon was considered a physiological process (abortion).

The nuts were collected every 5 days, on a tarpaulin spread around each tree.

The results will be expressed in mean % of nuts/tree, compared to the total number of nuts recorded at the end of the season (physiological fall and nuts collected on the tree)

B/ Yield (Kg of nuts/tree).

All the nuts (fallen and collected) were recorded.

C/ Size:

This result will be expressed in mean % of nuts/tree having a size greater than 32 mm.

D/ Presence of shoots presenting leaf curl symptoms.

III: Results:

A/ Counting the nuts fallen to the ground from fruit set to harvest (table 1):

| Modalities | mean % of nuts fallen to the ground/tree "Physiological" fall | mean % of nuts fallen to the ground/tree and infected by Xanthomonas |
|---|---|---|
| Control | 6% a | 35% a |
| PP1 (t) | 5.5% a | 12% b |
| PP1 (f) | 6.5% a | 9% b |

In this table, the different letters indicate results that differ significantly according to the Newman-Keuls test with an error threshold of 5%.

B/ Yield (Kg of nuts/tree) (table 2)

| Modalities | Kg of nuts/tree |
|---|---|
| Control | 24 +/− 3.5 a |
| PP1 (t) | 38 +/− 6.5 b |
| PP1 (f) | 41 +/− 5.0 b |

In this table, the different letters indicate results that differ significantly according to the Newman-Keuls test with an error threshold of 5%.

C/ Size (table 3):

| Modalities | mean % of nuts > 32 mm/tree |
|---|---|
| Control | 39.6 +/− 3.0 a |
| PP1 (t) | 52.3 +/− 7.3 b |
| PP1 (f) | 61.0 +/− 6.5 c |

In this table, the different letters indicate results that differ significantly according to the Newman-Keuls test with an error threshold of 5%.

D/ Presence of shoots presenting leaf curl symptoms.

On the control plants not treated with PP1, a large number of shoots presented desiccation with leaf curl of the tip.

This phenomenon was not observed in the other modalities treated with PP1.

IV/ Conclusion:

The treatments with PP1 (t) or PP1 (f) had no effect on the physiological fall of the nuts (table 1).

In contrast, the percentage of nuts fallen to the ground because of contamination by Xaj fell significantly thanks to the two treatments with PP1, whether the product was extracted from the leaves or stems of *Eruca sativa* (35% of nuts fallen to the ground/tree for the Control modality, 12% and 9% of nuts fallen to the ground/tree for PP1(t) and PP1 (f), respectively) (table 1).

The two treatments with PP1 also had a significant effect on the yield, which rose significantly (24 Kg of nuts/tree for the Control modality, 38 Kg and 41 Kg of nuts/tree respectively for the modalities PP1 (t) and PP1 (f)) (table 2).

With regard to the size of the nuts, the 2 treatments with PP1 had a significant effect, even though a bigger effect was observed with the PP1 (f) product extracted from leaves (39.6% of nuts had a size >32 mm in the trees of the control modality, whereas 52.3% and 61.0% of the nuts respectively had a diameter >32 mm in modalities PP1 (t) and PP1 (f)) (table 3).

It should be noted that the leaf curl symptoms of the shoots, linked to severe contamination of the tree, were only observed on the controls. No shoot presented leaf curl symptoms in the trees of modality PP1 (t) and PP1 (f).

The treatments with PP1 showed a significant action in the fight against *Xanthomonas arboricola* pv *juglandis* on walnut trees. The walnut trees treated with PP1 did not seem weakened by the disease throughout the trial.

Example 8

I/ Installation of the Trial:

Year: 2016

Walnut variety: CHANDLER

Age of the trees: 4 years

Location: Grenoble

Inoculation: Artificial

The Xaj strains were grown on the LPGA medium. The strain was kept at 5° C. to reduce the risks of loss of virulence. The inocula used during this study were prepared by transferring, after checking the purity of the strain, a colony into 100 mL of LPG liquid medium. The cultures were incubated under agitation at 30° C. for 12 hrs. The bacterial suspension was then centrifuged at 6000 g for 10 min. The final bacterial suspension was adjusted in a spectrophotometer to a $DO_{600}$ of 0.1, corresponding to 108 cfu/mL.

Two leaves of all the shoots of all the trees of the "inoculated" modalities were infected with the bacterial suspension ($10^8$ cfu/mL.) with a needle-less syringe, applying the syringe on the underneath surface of the leaves. The infiltration was realized under pressure forcing the liquid to penetrate the leaves by the stomata.

The leaves were infiltrated by the suspension, such that the infiltration visually covered the whole surface of the leaf.

For the control plants, the same infiltration protocol was carried out with sterile water.

Number of modalities: Four modalities were tested. Each modality consisted of 12 trees.

1/ Uninoculated, untreated control (T0)

2/ Inoculated, untreated control (Tin)

3/ PP1 (P) sprayed at foliar level, under preventive conditions (treatments 7 days before inoculation with Xaj)

4/ PP1 (P) sprayed at foliar level, under curative conditions (treatments 7 days after inoculation with Xaj)

Recommendation: Application of PP1 every 14 days, from bud burst stage (stage Cf)—7 Applications Volume: Equivalent of 600 L/Ha The schedule of treatments is shown in FIG. 22.

II/ Observations Made:

A/ N Percentage of contaminated leaves per shoot, as a function of time.

B/ Severity of damage on leaves according to the percentage of the surface of the leaf visually affected by the disease, as a function of time.

For A and B, the readings were taken on 10 shoots per modality, two shoots per tree, chosen at random. The observation concerned all the shoot's leaves.

C/ Antibacterial test of PP1 on Xaj.

To understand PP1's mode of action and its high effectiveness against Xaj while this bacteria is difficult to treat with these phytosanitary products, its antibacterial potential was tested.

One milliliter of PP1 (at the dosage of use and effectiveness and at doses X2) was deposited on a Petri dish, 24 (hours?) after distribution of the *Xanthomonas* culture.

Three replications were carried out per modality (application of 1 mL of PP1, or 1 mL of sterile water).

The mean diameter of the colonies was read 3 days and 7 days after the application of PP1 in the Petri dishes.

D/ Quantitative determination of the peroxidase activity in the leaves, as a function of time.

Although it is also involved in functions other than those linked to defense against parasites, the peroxidase activity is nevertheless closely linked to plants' defense against phytopathogenic bacteria.

The walnut tree leaves (5 leaves per tree, chosen at random) were collected at different times. One gram of leaf was mixed in a 2 mL sodium phosphate buffer (pH 5, 0.05 m). The extract was centrifuged at 10,000 g for 5 min. The quantitative determination of the peroxidases on the supernatant was carried out in a citrate-phosphate buffer (pH 6, 0.05 m), using guaiacol as hydrogen donor, in the presence of oxygenated water. The activities were estimated from A 470. The total activity was expressed as nKat/mg of proteins.

The quantitative determination was carried out on 2 leaves of 6 different shoots chosen at random, per modality. The result is therefore the expression of the mean activity obtained on 12 leaves.

E/ Quantitative analysis of endogenous free salicylic acid (SA) in the leaves

At different times after inoculation, the leaves and their petioles were sampled (2 leaves per plant). The leaves were cut longitudinally into very thin strips, and were positioned vertically in a centrifuge tube. The intercellular and phloemic liquid was collected by centrifugation (5000 g), and recovered in an aqueous solution of 50% methanol (v/v). The sample was analyzed by HPLC on column C18 balanced in a mixture formed of 95% sodium acetate buffer 50 mM, pH 4.5, and 5% acetonitrile. The SA, eluted after a retention time of 15 min at a flow rate 2 mL/min, was detected by fluorescence by a spectrofluorometer (excitation at 290 nm, emission at 402 nm). The SA concentration is expressed in µg SA $g^{-1}$ of fresh material.

The quantitative determination was carried out on 2 leaves of 6 different shoots chosen at random, per modality. The result is therefore the expression of the mean quantity of salicylic acid obtained on 12 leaves.

III/ Results:

A/ Percentage of contaminated leaves per shoot, as a function of time (Table 4):

| 2017 dates | 06/06 | 06/13 | 06/20 | 07/04 | 07/18 | 08/01 |
|---|---|---|---|---|---|---|
| $T_0$ | 0 a | 0 a | 0 a | 0 a | 0 a | 0 a |
| $T_{in}$ | 0 a | 0 a | 0 a | 10 +/− 2 b | 30 +/− 4 d | 32 +/− 5 d |
| PP1 (P) | 0 a | 0 a | 0 a | 0 a | 4 +/− 1 b | 5 +/− 1 b |
| PP1 (C) | 0 a | 0 a | 0 a | 5 +/− 2 b | 7 +/− 2 b | 7 +/− 3 b |

The readings were taken on 10 shoots per modality, two shoots per tree, chosen at random.

The observation concerned all the shoot's leaves.

The different letters indicate results that differ significantly according to the Newman-Keuls test with an error threshold of 5%.

B/ Severity of damage on leaves according to the percentage of the surface of the leaf visually affected by the disease, as a function of time (Table 5).

| 2017 dates | 06/06 | 06/13 | 06/20 | 07/04 | 07/18 | 08/01 |
|---|---|---|---|---|---|---|
| $T_0$ | 0 a | 0 a | 0 a | 0 a | 0 a | 0 a |
| $T_{in}$ | 0 a | 0 a | 0 a | 5 b | 25 c | 38 c |
| PP1 (P) | 0 | 0 | 0 | 0 a | 5 b | 5 b |
| PP1 (C) | 0 | 0 | 0 | 5 b | 5 b | 5 b |

The readings were taken on 10 shoots per modality, two shoots per tree, chosen at random.

The observation concerned all the shoot's leaves.

The different letters indicate results that differ significantly according to the Newman-Keuls test with an error threshold of 5%.

C/ Antibacterial test of PP1 on Xaj (table 6)

|  | T = 0 Diameter of the colonies | T = 3 days Diameter of the colonies | T = 7 days Diameter of the colonies |
|---|---|---|---|
| PP1 dose N | — | 2 mm | 6 mm |
| PP1 dose 2N | — | 2 mm | 6 mm |
| Sterile water | — | 2 mm | 6 mm |

No reduction was observed in the number and diameter of the colonies.

D/ Quantitative determination of the peroxidase activity in the leaves, as a function of time (nKat/mg protein) (table 7).

| 2017 dates | 06/06 | 06/13 | 06/16 | 06/20 | 07/04 | 07/18 | 08/01 |
|---|---|---|---|---|---|---|---|
| $T_0$ | 510 +/− 10 a | 605 +/− 15 a | 632 +/− 20 a | 640 +/− 15 a | 609 +/− 15 a | 640 +/− 25 a | 589 +/− 20 a |
| $T_{in}$ | 520 +/− 15 a | 562 +/− 20 a | 602 +/− 12 a | 514 +/− 20 a | 780 +/− 20 b | 802 +/− 32 b | 790 +/− 23 b |
| PP1 (P) | 580 +/− 20 a | 625 +/− 30 a | 989 +/− 10 b | 1030 +/− 35 b | 1820 +/− 35 c | 2103 +/− 35 c | 2408 +/− 48 c |
| PP1 (C) | 505 +/− 15 a | 542 +/− 25 a | 602 +/− 22 a | 901 +/− 20 b | 930 +/− 35 b | 1209 +/− 25 c | 1852 +/− 36 c |

The quantitative determination was carried out on 2 leaves of 6 different shoots chosen at random, per modality. The result is therefore the expression of the mean activity obtained on 12 leaves.

The different letters indicate results that differ significantly according to the Newman-Keuls test with an error threshold of 5%.

E/ Quantitative analysis of endogenous free salicylic acid (SA) (µg/g fresh material) in the leaves (table 8)

| 2017 dates | 06/06 | 06/13 | 06/16 | 06/20 | 07/04 | 07/18 | 08/01 |
|---|---|---|---|---|---|---|---|
| $T_0$ | 0.05 a | 0.07 a | 0.06 a | 0.08 a | 0.06 a | 0.03 a | 0.05 a |
| $T_{in}$ | 0.06 a | 0.05 a | 0.08 a | 0.07 a | 0.5 b | 0.8 b | 0.8 b |
| PP1 (P) | 0.08 a | 0.09 a | 1.0 c | 1.3 c | 1.9 c | 2.3 c | 2.0 c |
| PP1 (C) | 0.05a | 0.03 a | 0.5 b | 0.6 b | 1.5 c | 1.8 c | 1.9 c |

The quantitative determination was carried out on 2 leaves of 6 different shoots chosen at random, per modality. The result is therefore the expression of the mean activity obtained on 12 leaves.

The different letters indicate results that differ significantly according to the Newman-Keuls test with an error threshold of 5%.

IV/ Conclusion:

In this trial, the PP1 product was tested against Xaj on walnut trees, under preventive and curative conditions.

With regard to the appearance of symptoms, treatment with PP1 (P) under preventive conditions drastically and significantly reduced the number of leaves presenting symptoms. In fact, the first symptoms appeared as of Jul. 4, 2017 for the trees inoculated with *Xanthomonas* and NOT treated with PP1 whereas, during preventive treatments with PP1 (P), the symptoms only appeared at a low level on July 18 (table 4).

PP1 (C), as curative treatment, did not delay the date symptoms appeared (Jun. 4, 2017) but did not allow the disease to develop (table 4).

In terms of attack frequency, the two treatments, with PP1 (P) and PP1 (C), significantly reduced the number of infected leaves compared to the Control modality (32% of leaves attacked in the Control modality with inoculation, 5% and 7% of leaves attacked in the PP1 (P) and PP1 (C) modalities) on August 01 (table 4).

The two treatments PP1 (P) and PP1 (C) also significantly reduced the severity of the disease and prevented the disease from developing (38% of leaf area attacked in the Control modality, 5% and 5% of leaf area attacked in the PP1 (P) and PP1 (C) modalities) on August 01 (table 5).

The antibacterial activity test showed that the PP1 product did not act directly against the Xaj bacteria (table 6).

In this context, the quantitative determination of two biochemical markers known to be involved in plants' defense was performed:

The quantitative determination of the peroxidases, known to be involved in plant's defense against bacterial pathogenic agents, was carried out:

In the case of PP1 (P) as a preventive treatment, a very high peroxidase activity was observed 3 days after inoculation with Xaj (June 2016), and this activity continued to increase after this, through to the last sample (August 01) (table 7).

In the case of curative treatment with PP1, the peroxidase activity also increased significantly from June 20, but with slower kinetics over time (table 7).

On August 01 the mean peroxidase activities were 580 nKat of SA/mg proteins for the plants of the Control modality without inoculation, 790 nKat/mg proteins for the plants of the Control modality with inoculation, 2408 nKat/mg proteins and 1852 nKat/mg proteins respectively for the plants of the PP1 (P) and PP1 (C) modalities (table 7).

The quantitative determination of the SA was also carried out:

In the Control modality without inoculation, the SA synthesis took place late (July 04), and increased regularly after that, to reach a mean value of 0.8 µg of SA/g of fresh material on August 01 (table 8).

In the PP1 (P) modality used as a preventive treatment, a high synthesis of salicylic acid (1 µg of SA/g of fresh material) was observed from 3 days after infection, on June 16. This value continued to increase to reach 2 µg of SA/g of fresh material on August 01. In the PP1 (C) modality used as a curative treatment, the increase in the SA synthesis was also observed from June 16, but at a lower rate (0.5 µg of SA/g of fresh material), to reach 1.9 µg of SA/g of fresh material on August 01 (table 8).

The SA synthesis was considerably stimulated in the case of the preventive and curative treatments with PP1.

Note that the interaction monitored did not correspond to the installation of "gene-for-gene" resistance between the plant and the bacteria. Indeed, without treatment, the bacteria progressively invaded the plant.

The results observed, both in terms of the reduction of symptoms by the PP1 treatments and of the quantitative determinations of peroxidase and SA, indicate a phenomenon of potentiation, with an increase in the defense mechanisms from infection by the pathogen.

In both cases (preventive and curative treatments) PP1 enabled walnut trees, by stimulating their defenses, to fight effectively against the bacteriosis.

Example 9—Effectiveness of PP1 Against *Xanthomonas arboricola* pv *pruni* on Peach Trees (*Prunus persica*)

Introduction

*Xanthomonas arboricola* pv. *Pruni* is responsible for bacterial spot disease in stone fruit trees (*Prunus* spp.).

This pathogen mainly attacks apricot trees (*Prunus armeniaca*), cherry trees (*Prunus avium*), plum trees (*Prunus domestica*) and peach trees (*Prunus persica*).

This bacteria is currently spread throughout the world and is identified practically everywhere stone fruit trees are cultivated. In cases of severe infection, the damage causes a 70% crop loss.

This bacteria is classified as a quarantine pest in the European Union, and is treated as such in the Plant Protection Ordinance (PPO, RS 916.20).

In the absence of means for fighting this disease, it is essential to develop control means able to limit the spread of the disease, by significantly stimulating trees' defenses.

The treatments with PP1, able to fight effectively against this bacteria, have to (?) be able to limit contamination to other trees.

A trial was carried out on peach trees contaminated naturally, in order to know the tree's reaction to the disease, following treatment.

Used preventively, PP1 should be able to limit the spread of the epidemic of the bacteriosis (*Xanthomonas arboricola* pv. *Pruni*) of peach trees.

I/ Installation of the Trial:
  Year: 2017
  Peach variety: Summer Sweet
  Age of the trees: 4 years
  Location: Les Costières (Gard)
  Inoculation: Natural. The trial was carried out on plants already contaminated with *Xanthomonas arboricola* for 1 year.
  Number of modalities: Three modalities were tested.
  The modalities were the following:
  1/ Control
  2/ PP1 (t) sprayed at foliar level. PP1 (t) was extracted from *Eruca sativa* stems
  3/ PP1 (f) sprayed at foliar level. PP1 (f) was extracted from *Eruca sativa* leaves
  Each modality consisted of 20 trees (4 groups of 5 trees).
  The groups of 5 trees of all the modalities are assigned randomly in the plot.
  Recommendations: Application of PP1 every 14 days, from bud burst stage
  7 applications.
  Volume: 500 L/Ha (the equivalent of 10 g plants/L was ground, i.e. 5 Kg of plants to cover one Ha)
II/ Observations Made:
  A/ N Damage to shoots (foliage): The results were expressed in % of shoots infected, on a basis of 50 shoots per modality, chosen at random.
  B/ Damage to fruit: The disease in the fruit was estimated on the day of harvest (August 25). For this, 50 fruit per modality were observed. The results are expressed in % of fruit.
  The results were organized into 3 categories by modality: % healthy fruit, % fruit with moderate damage, % fruit with severe damage.
  C/ Mean number of new sprouts per branch on June 30, on a basis of 50 shoots per modality, chosen at random.
III/ Results:
  A/ N Damage to shoots (foliage) (Table 9)

| 08/25 | % of shoots affected |
|---|---|
| Control | 62 |
| PP1 (t) | 5 |
| PP1 (f) | 4 |

B/ Damage to fruit: The disease in the fruit was estimated on the day of harvest (August 25) (Table 10)

| 08/25 | % healthy fruit | % fruit with moderate damage | % fruit with severe damage |
|---|---|---|---|
| Control | 50 | 18 | 32 |
| PP1 (t) | 85 | 15 | 0 |
| PP1 (f) | 82 | 18 | 0 |

C/ Mean number of new sprouts per branch on June 13 (Table 11)

| 2017 dates | 06/13 |
|---|---|
| T | 12 |
| PP1 (t) | 28 |
| PP1 (f) | 25 |

VI/ Conclusion:
  The % of shoots affected was significantly reduced when PP1 was applied at a frequency of 14 days, from bud burst stage (62% of shoots affected in the control plants, 5% and 4% of shoots affected in the PP1 (t) and PP1 (f) modalities)
  With respect to the fruit: In the control modality, 50% of the fruit were healthy, whereas 85% and 82% of healthy fruit were recorded in the PP1 (t) and PP1 (f) modalities
  It is important to note that, in the PP1 modality, no fruit had severe damage, whereas 32% of the fruit in the control modality showed severe damage.
  PP1 also acts on the vigor of the orchard. In fact, a significantly higher number of new sprouts was observed in the PP1 modalities, compared to the control modalities (12 new shoots on average per branch in the control modalities, 28 and 25 new shoots on average per branch in the PP1 (t) and PP1 (f) modalities.
  The treatments with PP1 enabled an effective fight against *Xanthomonas arboricola* pv *pruni*.
  In one embodiment, the present invention relates to the use of an extract from at least one part of "rocket" plants in order to stimulate the defenses of plants or trees and reduce the effects of the Pear Decline *Phytoplasma* bacteria or *Candidatus Phytoplasma pyri* on pear trees, or *Candidatus Phytoplasma solani* bacteria on grape vines, lavender, potato plants, tomato plants, aubergine plants, pepper plants and tobacco plants.

Example 10—Effectiveness of PP1 Against *Candidatus phytoplasma pyri* on Pear Trees (Pear Decline)

Introduction

The phytoplasma *Candidatus phytoplasma pyri*, responsible for the rapid decline of pear trees, is present in most European Union countries where pear trees are cultivated. This disease has also been detected along the coasts of North America. It mainly affects plants of the *Pyrus* genus, fruit and ornamental trees. It can also be observed on quince trees, *Cydonia oblonga*.

Degradation of the phloem of contaminated trees leads to their dieback. However, depending on cultivation practices and the sensitivity of the rootstock, two types of symptoms can be distinguished: either a rapid dieback reflected in the desiccation of leaves in July-August, or a slow dieback that progressively weakens the tree.

Currently, there is no technique or treatment that makes it possible to eliminate phytoplasma in pear trees.

It is important to put in place a new treatment, able to stimulate the plant to fight against *Candidatus phytoplasma pyri*.

I/ Installation of the Trial:
  Year: 2017
  Pear variety: Bartlett
  Orchard planted: 2008
  Location: Provence-Alpes-Côte d'Azur region
  Inoculation: Natural: This orchard had been severely infected since 2016.
  Number of modalities: 2
  Three modalities were tested: 3 rows of 10 trees (30 trees). Each modality consisted of one row of 10 trees.
  The modalities were the following:
  1/ Control
  2/ PP1 (f) sprayed at foliar level. PP1 (f) was extracted from *Eruca sativa* leaves Recommendation: Application of PP1 every 10 days, from bud burst stage Advantage of PP1: No phytotoxicity at flowering stage.

Volume: 800 L/Ha (the equivalent of 10 g plants/L was ground, i.e. 8 Kg of plants to cover one Ha)

II/ Observations Made:

A/ Number of trees presenting the symptoms of rapid decline, per modality.

B/ Mean number of branches/tree presenting the symptoms, on 2 dates (June 5 and August 2).

These symptoms were divided into 2 observations: 1/ Symptoms in spring (reading on June 5): shoots presenting pale green leaves of reduced size and low leaf count, and 2/ so-called autumn symptoms (reading of August 2): the leaves prematurely turn red, the edges are curled.

III: Results:

A/ Number of trees presenting the symptoms per modality (table 1)

|         | Jun. 5, 2017<br>Spring symptoms | Aug. 2, 2017<br>Autumn symptoms |
|---------|---------|---------|
| Control | 30%     | 50%     |
| PP1 (f) | 30%     | 30%     |

B/ Mean number of branches/tree presenting the symptoms of decline (table 2)

|         | Jun. 5, 2017 | Aug. 2, 2017 |
|---------|---------|---------|
| Control | 47% a   | 100% a  |
| PP1 (f) | 26% b   | 30% b   |

IV: Discussion

The trees were severely attacked in 2016. In this context of strong parasite pressure, the symptoms were observed at two different times.

From spring 2017, and despite treatment with PP1, 30% of trees in the 2 modalities were observed to present spring symptoms (shoots presenting pale green leaves of reduced size and low leaf count) (table 1). These shoots stood out visually from the rest of the foliage in the plot.

In contrast, during treatment with PP1, a smaller number of trees were observed to present autumn symptoms (50% of trees for the controls, 30% for the PP1 (f) modality), during readings on Aug. 2, 2017 (table 1).

With respect to the mean number of branches/tree presenting the symptoms, the treatments with PP1 from bud burst made it possible to stimulate the defenses of trees and significantly reduce the number of shoots presenting symptoms per tree (table 2).

In fact, 47% of shoots/tree attacked by the disease were observed in the control plot, whereas only 26% of shoots/tree had been attacked in the plot treated with PP1 (f).

In August, 100% of the shoots of trees were contaminated in the control plot, whereas only 30% of shoots had been attacked in the plot treated with PP1 (f).

PP1 works by stimulating the tree's defenses and the metabolism. In the case of pear tree phytoplasma, the pathogen is installed in the conducting vessels of the phloem, and is concentrated in particular in the thinnest vessels. This infection causes significant impairment of the tissues, and callose accumulation on the walls of plant cells which blocks the passage of the sap. In reaction to this infection, the tree creates a larger or smaller replacement phloem, which enables it to live for a longer or shorter time.

It is suggested that PP1 works in various ways, by stimulating 1/ the tree's defense mechanisms, which are going to actively fight against the parasite, 2/ the plant's metabolism to increase the creation of new vessels, and 3/ the production enzymes that are going to trim the plugs of callose, tyloses that obstruct the vessels.

This same phenomenon was observed during treatments on olive trees, for fighting against *Xylella fastidiosa*.

The recommendation is therefore for pear orchards to be treated with PP1 as a preventive treatment, and for this treatment to be continued each year, to enable the plant to keep its defense mechanisms on alert each year, and on the appearance of symptoms.

Example 11—Effectiveness of PP1 Against *Candidatus phytoplasma solani* (*Stolbur phytoplasma*) on Grape Vines (*Vitis vinifera*)

I/ Introduction:

*Stobur phytoplasma* (*Candidatus phytoplasma solani*) is present in central and southern Europe, and in some Middle Eastern countries.

This bacteria belongs to the mycoplasma. These bacteria have the characteristic of having a small genome and lacking a cell wall. Within a plant, these organisms are exclusively located in the sieve tube elements of the phloem. Their pathogenic power may be explained by several phenomena: hampering the good circulation of sap within the infected plant, producing molecules having an interaction with the plant hormones linked to the plant's growth (for example, auxins), etc.

*Stobur phytoplasma* is transmitted to plants by means of leafhoppers, phloem-feeding insects of the *Hemiptera* family. Today, *Hyalesthes obsoletus* Signoret (*Hemiptera*, Cixiidae) is considered the main vector of bois noir disease ['black wood disease' in English] in Europe.

*Stolbur phytoplasma* infects plants of the Solanaceae family, mainly potato plants, tomato plants, aubergine plants, pepper plants and tobacco plants. It is also responsible for diseases in other cultivated species such as strawberry plants (marginal chlorosis), lavender plants (decline), grape vines (black wood disease) and beet plants ('basses richesses' syndrome). The Asteraceae, Convolvulaceae and Fabaceae families also contain plants susceptible to stolbur.

All European vineyards are affected by black wood disease, a yellowing disease of grape vines, non-contagious for the vineyard, that owes its name to the unlignified wood that blackens under the effects of frost. Its incidence from one year to another on vines is variable.

This disease leads to crop loss and affects the quality of the harvest. It can lead to the death of vine stocks and, as a result, shorten the life of the vines.

The increase, since the 2000 s, in the number of black wood cases in grape vines, and the fact that no chemical treatment can be envisaged for controlling the vector, shows that the importance of finding a new control solution.

Given the mode of action of PP1, able to effectively stimulate the defenses against bacterial diseases, the product has been used successfully in vineyards and in lavender fields.

II/ Installation of the Trial:

Year: 2016

Grape variety: Chardonnay, Pinot Noir grape varieties

To have a reliable statistical estimation, given the disease, two different vineyards were used to estimate the disease and the effectiveness of the PP1 product. In each vineyard, each modality consisted of 100 grape vines.

Age of the trees: 12 years for the Chardonnay and 14 years for the Pinot Noir

Maintenance of the plot: To favor the disease, in 2016 these vineyards were managed with non-controlled grass-covered soil Location: Montpellier (Hérault, France)/Nîmes (Gard, France)

Inoculation: Natural.

Number of modalities: Three modalities were tested.

The modalities were the following:

1/ Control

2/ PP1 (t) sprayed at foliar level. PP1 (t) was extracted from *Eruca sativa* stems 3/ PP1 (f) sprayed at foliar level. PP1 (f) was extracted from *Eruca sati* leaves Recommendations: PP1 application every 14 days, from the 2-3 leaves stage through to fruit ripening.

Volume: 500 L/Ha (the equivalent of 10 g plants/L was ground, i.e. 5 Kg of plants to cover one Ha).

III/ Observations Made:

A/ Percentage of plants attacked per vineyard, on August 31.

The symptoms were immediately visible in summer and could be exhibited on one portion or over the entire vine stock. Diseased plants could be recognized by their curled-down leaves which, depending on the variety, had red or yellow discolorations in patches or overall, including the veins. Their grape clusters withered prematurely and shoot maturation was impaired, either partially or completely absent.

B/ Quantitative determination of endogenous free jasmonic acid (JA).

Given the defense stimulation results observed on other models, it appeared interesting to carry out quantitative determination for the AJ.

At two different times (6 hrs. and 24 hrs.) after the 5$^{th}$ treatment, 5 leaves chosen at random on 10 healthy shoots (50 leaves) and 10 contaminated shoots (50 leaves) were collected.

After weighing, the leaves were plunged into liquid nitrogen N2. The ground material was then immersed in ethanol.

The various extractions were carried out in accordance with Gundlach et al., 1992. The JA was analyzed by GC/mass spectrometry.

Separations were performed on one DB-5 column (30 m×0.25 mm).

IV/ Results:

A/ Percentage of plants attacked per vineyard, on August 31.

Vine stocks presenting the symptoms were isolated in the plots, with no apparent grouping.

| 08/31 | Chardonnay variety | Pinot Noir variety |
|---|---|---|
| T | 17 | 24 |
|  | All symptoms linked with the disease were observed, with a majority of completely necrotic shoots on the plants recorded. | All symptoms linked with the disease were observed, with a majority of completely necrotic shoots on the plants recorded. |

| 08/31 | Chardonnay variety | Pinot Noir variety |
|---|---|---|
| PP1 (t) | 3 | 4 |
|  | The diseased shoots presented yellow leaves with leaf curl. No necrosis. | The diseased shoots presented yellow leaves with leaf curl. No necrosis. |
| PP1 (f) | 2 | 1 |
|  | The diseased shoots presented yellow leaves with leaf curl. No necrosis. | The diseased shoots presented yellow leaves with leaf curl. No necrosis. |

B/ Quantitative determination of endogenous free jasmonic acid (JA) (ng of JA/g of fresh material) on:

Healthy Plants:

|  | Chardonnay variety | | Pinot Noir variety | |
|---|---|---|---|---|
|  | +6 hrs. | +24 hrs. | +6 hrs. | +24 hrs. |
| T | 50 +/− 14 | 61 +/− 28 | 70 +/− 25 | 81 +/− 32 |
| PP1 (t) | 502 +/− 250 | 689 +/− 189 | 689 +/− 210 | 623 +/− 245 |
| PP1 (f) | 606 +/− 189 | 705 +/− 201 | 781 +/− 187 | 788 +/− 201 |

The results were expressed in ng of JA/g of fresh material. The results represent the mean of the quantitative determinations carried out on 50 leaves per modality Contaminated Plants:

|  | Chardonnay variety | | Pinot Noir variety | |
|---|---|---|---|---|
|  | +6 hrs. | +24 hrs. | +6 hrs. | +24 hrs. |
| T | 95 +/− 25 | 102 +/− 32 | 125 +/− 29 | 145 +/− 38 |
| PP1 (t) | 1203 +/− 152 | 909 +/− 95 | 1289 +/− 120 | 1248 +/− 104 |
| PP1 (f) | 1059 +/− 105 | 1352 +/− 145 | 1115 +/− 142 | 1489 +/− 152 |

The results were expressed in ng of JA/g of fresh material. The results represent the mean of the quantitative determinations carried out on 50 leaves per modality.

V/ Conclusion:

It is clearly apparent that the plots treated with PP1 had a significantly smaller number of vine stocks presenting symptoms linked to *Stobur phytoplasma* (*Candidatus phytoplasma solani*), compared with the untreated plots.

Indeed, in the control plots of the Chardonnay and Pinot Noir varieties 17% and 24% of vine stocks respectively presented symptoms, whereas only 3% and 4% of vine stocks presented symptoms for the modalities treated with PP1 (t), and 2% and 1% of vine stocks presented symptoms for the modalities treated with PP1 (f).

Note that the symptoms observed on the vine stocks treated with PP1 presented less "advanced" symptoms in the two varieties, compared with the control vine stocks. In fact, no necrosis was observed on the vine stocks of the treated modalities, only yellow discolorations with curled-up leaves.

Given the results obtained on this model, and given the results observed on other models (stimulation of plants' defenses with PP1), it was interesting to carry out (a test of ?) one of the compounds linked to plants' defense against insects: JA.

The quantitative determinations were carried out on 50 leaves chosen at random per modality, on healthy plants and those presenting symptoms.

In the plants presenting no symptoms, treatment with PP1 triggered significant production of JA in the leaves, 6 hrs. and even 24 hrs. after application, compared with the leaves collected from the control plants. Nevertheless, the JA levels would not exceed 705 ng of JA/g of Fresh Material (Chardonnay variety), and 788 ng of JA/g of Fresh Material (Pinot Noir variety) in the plants treated with PP1, 24 (hrs.?) after application.

Given that the maximum observed value of JA in the control plants was 81 ng of JA/g of Fresh Material (i.e. 8-9 times lower), the evaluated levels of JA in the treated plants might be involved (in association with other defense mechanisms not allowing the parasite to take hold) in effectively repelling phloem-feeding insects.

In the contaminated plants, a significant high production of JA was also observed 6 hrs. and 24 hrs. after treatment with PP1.

This time, the quantities of JA observed in the plants treated with PP1 were much higher (1352 ng of JA/g of Fresh Material for the Chardonnay variety; 1489 ng of JA/g of Fresh Material for the Pinot Noir variety), whereas the contaminated control plants produced 102 ng of JA/g of Fresh Material for the Chardonnay variety and 145 ng of JA/g of Fresh Material for the Pinot Noir variety.

As in other models of plants treated with PP1, it seems that a process of potentiation was established, with a high production of active molecules involved in defense, from the arrival of the pathogen.

Treatments with PP1 (extracts from leaves or stems) demonstrated an interesting and significant effectiveness against black wood disease on grape vines, and must be recommended as a preventive treatment, from the 2-3 leaves stage.

Example 12—Effectiveness of PP1 Against *Candidatus phytoplasma solani* (*Stolbur phytoplasma*) on Lavender Plants (*Lavandula augustiflora*)

I/ Introduction:

Lavender and lavandin, emblematic crops of the Haute Provence region (France), have been hit by dieback since the early 2000s. Lavender and lavandin farmers are faced with the early death of their crops, the main cause of which is *Stobur phytoplasma* (*Candidatus phytoplasma solani*), which is transmitted to plants by a vector insect, the leafhopper (*Hyalesthes obsoletus*).

*Stolbur phytoplasma* is a cell-wall-free bacteria that needs a "host"—either a plant or an insect—to survive. Once introduced into a lavender plant, it obstructs the vessels in which the sap circulates, thereby causing weakening of the plant. Crop stunting and yellowing of leaves and stems is thus observed, then the death of the plant.

No direct control of the *phytoplasma* exists, and direct control of the insect is not possible.

The PP1 product therefore finds its place in a control strategy for this disease.

II/ Installation of the Trial

Lavender fields:

The plant used in this trial was English Lavender (*Lavandula augustiflora*), commonly called true lavender. This trial was carried out in lavender plantations 6 years old located in the south of France (table 1).

Table 1. Location of the plot: Pézenas, France.

Treatments

During this trial, 8 lavender plants were treated with the PP1 product for comparison with untreated lavender plants. In this plot, all the lavender plants were diseased and presented symptoms of infection with *Candidatus Phytoplasma solani*.

For each treatment, 100 ml of PP1 were applied using a portable device, BERTHOUD COSMOS 18 PRO. Between March and July 2016, 10 applications of the PP1 product were made with an interval of 12 to 15 days (Table 2: Schedule of PP1 product applications)

| Treatment | A | B | C | D | E | F | G | H | I | J | — |
|---|---|---|---|---|---|---|---|---|---|---|---|
| Date | 03/08 | 03/21 | 04/05 | 04/19 | 05/04 | 05/17 | 05/31 | 06/15 | 06/27 | 07/12 | 07/25 |
| | 0DAA | 13DAA | 15DAB | 14DAC | 15DAD | 13DAE | 14DAF | 15DAG | 12DAH | 15DAI | 13DAJ |
| Reading | | | | | | X | | | | | X |

*"XDAY" means X days after application Y

III/ Observations Made:

During this trial, readings were taken on two dates. The first reading was taken on the same day as the sixth application (F; May 17, 2016) and the second on the last application (K; Jul. 25, 2016).

Readings were taken of the following five parameters:
the percentage of newly-formed secondary peduncles
the height of the newly-formed peduncle
the percentage of verticillate (group of calyces) per spear
the diameter of the plants
the height of the plants For the first three parameters, the evaluation was carried out on 50 peduncles chosen at random. For the last two parameters, the evaluation was carried out on the entire lavender plant. To evaluate the progress of the disease visually, a photo of the untreated plants and of the diseased plants treated with the PP1 product were taken on the two evaluation dates (May 17, 2016 and Jul. 25, 2016).

IV/ Results

FIG. 23: Development of physiological parameters of growth in treated lavender plants (black bars), compared with the untreated "controls" (white bars). The parts of FIG. 23 have the following meanings: A': mean percentage of newly-formed secondary peduncles, B': mean height of the newly-formed peduncles, C': mean percentage of verticillate (group of calyces) per spear, D': mean diameter of plants, E': mean height of the plants.

A, B, C n=50. D, E n=8. The significant differences between the treated plants and the "control" plants are indicated by ** ($P<0.001$)

FIG. 24 shows, in the form of photographs, the disease evolution caused by *Stolbur phytoplasma* (*Candidatus phytoplasma solani*) in control plants (A, C) and plants treated with PP1 (B, D).

V/ Conclusion:

On the two sampling dates, May 17 and July 25, the plants treated with PP1 had significantly better growth parameters than the untreated plants, for all readings and for all parameters. The differences between treated and untreated plants were very large (FIG. 23).

Visually, the results were also expressed very clearly (FIG. 24), since the untreated plants were completely desiccated on July 25, whereas the treated plants were green and showed flower buds.

These results show PP1 should be used in the fight against *Candidatus phytoplasma solani*, to preserve the lavender crops. PP1 should be incorporated in a preventive control program, in order to limit the epidemic, and to protect the lavender and lavandin fields.

Example 13—Effect of PP1 Against Oidium (*Podosphaera pannosa*) on Rose Bushes 1/ Introduction
1.1 Objective of the Trial Experimental tests on a new natural product (comprised 100% of a plant extract), called PP1, have made it possible to demonstrate very promising results, especially with respect to triggering the plant's defense mechanisms. The preliminary results have shown a preventive effect on the tested crops attacked by pathogenic fungi.

The objective of this trial was therefore to test this new product on a new model, i.e. evaluate the PP1 product's effect and effectiveness in fighting against oidium on rose bushes.

1.2 Information about the Pathogen Targeted

Oidium of roses is a cryptogamic disease, commonly called "rose powdery mildew". This fungus causes the appearance of a white mold on the leaves and young shoots. The very first symptoms are not very visible and are manifested by a slight discoloration on the underneath of leaves. When the attack is in place, the leaves can be deformed and the flower buds shriveled, considerably limiting the plant's development and flowering.

The oidium produces spores that will proliferate especially under the effect of warmth and a humidity level above 70% (in particular in greenhouses of ornamental rose crops). The oidium is transmitted very quickly from plant to plant and requires rapid effective treatment in order to limit the oidium's proliferation and protect the cultivation area.

This trial was carried out with artificial contamination with oidium.

1.3 Information about the Host Plant Targeted

The targeted crop is the rose bush.

This trial was carried out on ornamental rose plants in pots.

2/ Implementation of the Trial
2.1 Action Plan

In April 2018, an ornamental rose variety susceptible to oidium was placed in one of the greenhouses of the company Delphy in Boskoop (the Netherlands). When the young shoots were sufficiently developed, one part of the crop was treated with the PP1 product.

During the trial, the oidium's development was measured, compared with a chemical reference product and untreated plants.

If necessary, in order to prevent the development of other diseases (such as mildew), another reference product was to be applied on the rose plants so as to avoid any possible interference.

| Parameter | Level | Description |  |
|---|---|---|---|
| Crop | 1 | 1 | Rose bushes |
| Code/Treatment | 3 | 1 | Untreated control |
|  |  | 2 | Reference - ACE |
|  |  | 3 | PP1-1000 L/ha (100 ml/m$^2$) - ABCDE |
| Replications | 5 | Replications: 1, 2, 3, 4, 5 | |

2.3 Arrangement and Dimensions
1 (crop)×3 (treatments)×5 (replications)
Area: ≈48 m$^2$ (6×8 m)
Gross area: 1 m$^2$ (30 plants)
Net area: ≈0.4 m$^2$ (12 plants)
Dividing lines: at least 2 (1 surrounding each net plot)
2.4 Treatments and Readings
Number of treatments:
PP1: 5
Reference: 3
Application frequency with respect to the recommendations for use:
PP1: 10 days
Reference: 20 days
Number of readings: 6
Immediately after the first application
Then before each treatment
Method (EPPO PP1/196(2)—biological evaluation of fungicides—fungi of woody ornamentals):
In each plot, randomly select at least 50 leaves of a comparable age. Note the level of contamination: number of contaminated leaves and percentage of leaf area affected. A scale can be used, but must be described.
Rating Scale:

| Percentage of leaf area affected by oidium | 0% | 1-5% | 5-10% | 11-25% | 26-50% | >51% |
|---|---|---|---|---|---|---|
| Scale | 0 | 1 | 2 | 3 | 4 | 5 |

Additional measurements: weather conditions (temperature, humidity, light, etc.)
Medium of the readings: digital format (photos)
2.5 Analysis and Report
Reliability: 95% (P<0.05)
Delivery date: June 2018
2.6 Duration of the Trial
The duration of a greenhouse trial was a maximum of 12 weeks (because of the development of the crops and to ensure optimum conditions).

| Date | Apr. 5, 2018 | Apr. 13, 2018 | Apr. 24, 2018 | May 3, 2018 | May 16, 2018 | May 28, 2018 | Jun. 11, 2018 |
|---|---|---|---|---|---|---|---|
|  | — | 0 DA-A* | 11 DA-A* | 20 DA-A* | 33 DA-A* | 45 DA-A* | 59 DA-A* |
| Start | X | | | | | | |
| Treatment | | A | B | C | D | E | |
| Readings | | X | X | X | X | X | X |

*X DA-A: X days after the first treatment (A)

Table: Reading of the percentage of leaf area of rose bushes affected by oidium (by replication—scale 0 to 5)

|  | Apr. 13, 2018 0 DA-A | Apr. 24, 2018 11 DA-A | May 3, 2018 20 DA-A | May 16, 2018 33 DA-A | May 28, 2018 45 DA-A | Jun. 11, 2018 59 DA-A |
|---|---|---|---|---|---|---|
|  | | | Percentage of leaf area affected by oidium by replication (scale 0 to 5) | | | |
| Untreated control | 0 | 2 | 3 | 6 | 3 | 2 |
|  | 0 | 1 | 2 | 2 | 2 | 2 |
|  | 0 | 1 | 2 | 2 | 3 | 2 |
|  | 0 | 3 | 5 | 4 | 4 | 6 |
|  | 0 | 2 | 4 | 4 | 4 | 5 |
| Reference | 0 | 0 | 1 | 0 | 0 | 0 |
|  | 0 | 0 | 1 | 0 | 0 | 0 |
|  | 0 | 2 | 2 | 1 | 0 | 1 |
|  | 0 | 0 | 1 | 1 | 0 | 0 |
|  | 0 | 0 | 3 | 0 | 0 | 0 |
| PP1 | 0 | 0 | 0 | 0 | 0 | 0 |
|  | 0 | 1 | 3 | 1 | 1 | 1 |
|  | 0 | 1 | 0 | 1 | 1 | 0 |
|  | 0 | 0 | 2 | 1 | 1 | 1 |
|  | 0 | 1 | 1 | 1 | 1 | 1 |

Table: Reading of the percentage of leaf area of rose bushes affected by oidium (mean of the 5 replications)

|  | Apr. 13, 2018 0 DA-A | Apr. 24, 2018 11 DA-A | May 3, 2018 20 DA-A | May 16, 2018 33 DA-A | May 28, 2018 45 DA-A | Jun. 11, 2018 59 DA-A |
|---|---|---|---|---|---|---|
|  | | | Mean percentage of leaf area affected | | | |
| Untreated control | 0 a | 1.8 ab | 3.2 ab | 3.6 a | 3.2 a | 3.4 a |
| Reference | 0 a | 0.4 b | 1.6 b | 0.4 b | 0 b | 0.2 b |
| PP1 | 0 a | 0.6 b | 1.2 b | 0.8 b | 0.8 b | 0.6 b |

3/ Conclusions:

On all the sampling dates, the rose plants treated with the PP1 product and the rose plants treated with the chemical reference showed a leaf area affected by oidium that was statistically smaller than that of the untreated rose plants.

Fifty-nine days (59 DA-A) after the first application, the results showed that the rose plants treated with the PP1 product had less than 5% of their leaf area affected by oidium (scale 1:1 to 5% of leaf area affected).

All the readings showed disease control equivalent to the reference, from April 13 to June 11.

These results demonstrated that the PP1 product enabled an effective fight against oidium on rose bushes.

Example 14—Effectiveness of PP1 Against Downy Mildew (*Plasmapora viticola*) on Grape Vines (*Vitis vinifera*)

Downy mildew, caused by the fungus *Plasmapora viticola*, is present in the vast majority of vineyards throughout the world. In the absence of phytosanitary protection, the damage can be spectacular, through to total destruction of the harvest. Downy mildew of grape vines develops on all herbaceous organs of the grape vine, and especially those growing (rich in water).

With respect to the treatments against downy mildew, the strategy of copper treatments is generally followed by the farmers, and recommended by the technical services. In addition, it is the only product enabling control over Plasmopara *viticola* throughout the growing period.

In a context of limitations on quantities of copper per hectare, it is necessary to find alternatives for fighting against downy mildew of grape vines. PP1 is the ideal candidate for participating in the natural fight against grape vine diseases, by stimulating their natural defenses.

I/ Installation of the Trial:

Year: 2014

Location: South of France

Variety: Grenache Noir

Experimental scheme: The trial was implemented based on a scheme with blocks of 4 repetitions per modality.

The modalities:

1/ Control

2/ PP1

3/ Copper-based special product—Folpan 80WDG (registered trademarks) 1.9 kg/ha

Frequency of the treatments: 10-12 days

Observations:

Attack frequency: mean % of leaves contaminated per modality

Attack intensity: mean % of surface contaminated

Statistical analysis: Newman-Keuls test (threshold 5%)

II/ Results

| Measurements | | | | | LEAF | | GRAPE CLUSTERS | |
| --- | --- | --- | --- | --- | --- | --- | --- | --- |
| Dates | May 24 | June 3 | June 15 | June 27 | July 04 | | July 4 | |
| Stage BBCH | 57 | 71 | 73 | 75-77 | | | | |
| Application | A | B | C | D | | | | |
| Treatments | | | | | Attack frequency | Attack intensity | Attack frequency | Attack intensity |
| Untreated control | | | | | 78a | 39a | 40a | 20a |
| PP1 | yes | yes | yes | yes | 12b | 5b | 1b | 5b |
| Folpan 80WDG 1.9 kg/ha | yes | yes | yes | yes | 20b | 5b | 1b | 1b |
| Intervals between the treatments | | 10 | 12 | 12 | | | | |

| Measurements | | | LEAVES | | GRAPE CLUSTERS | |
| --- | --- | --- | --- | --- | --- | --- |
| Dates | July 08 | July 21 | July 26 | | July 26 | |
| Growth stage BBC | 79 | 79 | | | | |
| Application | E | F | | | | |
| Treatments | | | Attack frequency | Attack intensity | Attack frequency | Attack intensity |
| Untreated control | | | 72a | 51a | 45a | 39a |
| PP1 | yes | yes | 18b | 9b | 8b | 8b |
| Folpan 80WDG 1.9 kg/ha | yes | yes | 12b | 5b | 6b | 4b |
| Intervals between the treatments | 12 | 13 | | | | |

CONCLUSION: The PP1 product was sprayed on the grape vines, at a frequency of 10-13 days, to fight against downy mildew.

Note that the disease was still not yet established on May 24, the trial start date. PP1 was therefore used under curative conditions.

The disease quickly became established, and the parasite pressure rapidly became very strong, on both the leaves and the grape clusters.

PP1 managed to keep in check and restrict the disease, in terms of attack frequency (% of leaves or clusters attacked per modality) and of intensity (% of leaf area or grape cluster attacked by the disease).

At all the sampling times, the effectiveness of the PP1 product did not differ significantly from the effectiveness achieved by the reference product Folpan 80WDG (registered trademarks).

PP1 can be used in Organic Farming systems to control downy mildew of grape vines.

The trials with PP1 were mainly carried out with *Eruca sativa* on different plant/pathogen models (extract from leaves, stem, flowers, seeds or roots).

In this trial, some other rockets were also tested in order to know their capacity to trigger the defenses of plants. This list of rockets is not exhaustive.

Example 15—Trials on the Different Types of Rocket Against Oidium on Grape Vines The tests were carried out in a greenhouse, on two-year-old rootstock cuttings of the Carignan variety infected naturally by oidium (*Erysiphe necator*).

One of the easy-to-use markers is the peroxidase activity which, in this specific case and under these experimental conditions, allows it to be a marker of the triggering of the grape vine's defenses.

The plants were treated with PP1 extracted from different plants of the rocket family, and from different parts of plants.

Each modality consisted of 10 plants.

On the appearance of oidium symptoms on leaves, PP1 was sprayed on the grape vines every 10 days. The peroxidase activity was then measured, on 2 leaves per plant on all plants in the modality, 24 hrs. after the 4th spray.

The following table summarizes the modalities tested, and the peroxidase activity (nKat/mg protein):

| Modality | Quantitative determination of the peroxidase activity in the leaves of grape vines (nKat/mg protein) |
| --- | --- |
| Control (plants treated with water) | 200 +/− 30 |
| PP1 extracted from Eruca sativa | |
| Leaves | 1105 +/− 45 |
| Stems | 998 +/− 35 |
| Flowers | 825 +/− 22 |
| PP1 extracted from Diplotaxis tenuifolia | |
| Leaves | 982 +/− 32 |
| Stems | 928 +/− 15 |
| Flowers | 915 +/− 21 |
| PP1 extracted from Diplotaxis erucoides | |
| Leaves | 892 +/− 15 |
| Stems | 871 +/− 23 |
| Flowers | 928 +/− 25 |
| PP1 extracted from Brunias orientalis | |
| Leaves | 982 +/− 16 |
| Stems | 998 +/− 21 |
| Flowers | 821 +/− 33 |

| Modality | Quantitative determination of the peroxidase activity in the leaves of grape vines (nKat/mg protein) |
| --- | --- |
| PP1 extracted from Erucastrum nasturtiifolium | |
| Leaves | 895 +/− 32 |
| Stems | 825 +/− 45 |
| Flowers | 798 +/− 25 |
| Extracted from Valerianella locusta | |
| Leaves | 175 +/− 12 |

For the leaves, stems and flowers, the initial concentration per liter of filtrate obtained varied from 5 g/L to 20 g/L.

CONCLUSION: The results represent the mean of the peroxidase activity, in nKat/mg proteins, of 20 leaves selected at random (two leaves per plant).

These results show the effectiveness of the different rockets on the peroxidase activity in the grape vine's leaves.

Another plant species, with no presumed action, was tested as a $2^{nd}$ control, in order to check the viability of the model.

The four rocket varieties triggered the peroxidase activity, a marker of the triggering of the stimulation of the defenses, under these experimental conditions.

Other examples follow.

1. Trial on olive trees against *Xylella fastidiosa* (with a Certified GEP Company).

*Xylella fastidiosa*, very polyphage, is present throughout the American continent. In California, after its first identification on the grapevines (in 1892 by Newton Pierce), it is responsible for the "Pierce's disease" of the vineyards, where it caused considerable losses, and costs more than $104 million in annual losses to the Californian grape industry. It was also discovered on alfalfa, almond trees, peach, etc. In Brazil, the bacteria is responsible for chloroses on citrus fruits. It is present on coffee in South and Central America, on oleanders in Central and North America. In North America, it has the greatest impact on forest trees (oaks, sycamores, elms, etc.). A total of more than 300 plant species, in 63 families including 6 monocotyledons and 54 dicotyledons, have been described as host plants of *Xylella fastidiosa* and may exhibit symptoms of desiccation, which leads to the death of the plants and trees.

In Europe, first identified in Italy on olives in 2013, this bacterium is now a major phytosanitary priority for the European Union. In addition of its rapid and worrying increase in Italy on olive trees, this epidemic is already affecting several EU Member States, including France, Spain, Portugal according to the European Food Safety Authority (EFSA), and continue its alarming improvement.

Actually, there is no method of controlling this bacterium. Decision 2017/2352/EU, on control measures against *Xylella fastidiosa*, requires the elimination of all symptomatic and host plants within 100 metres of infected plants. The measures also consist of intensive phytosanitary treatments against insect vectors. Surveillance and plant movement procedures on EU territory are mandatory. These measures, while necessary, create ecological and human tragedies. For example, in the Apulia region of southern Italy, thousands of century-old olive trees are being uprooted. Nowadays, in Italy, the bacterium decimates 180,000 hectares of olive trees. The entire landscape has changed radically in just a few years, from a landscape dominated by old trees, to a devastated landscape populated by dead trees (EFSA; 2018). It is the loss of a patrimony and of an economic sector.

In view of the problem with *Xyella* and the urgent need to find an effective solution, the efficacy of PP1 was tested in southern Italy in a quarantine zone on olive trees infected with *Xylella fastidiosa*. PP1 was tested at three different concentrations (0.5N, 1N and 2N) and compared to the standard Ossiclor 35 WG (oxychloride copper 35%, WG).

2. 2017—Trial on Olive Trees Against *Xyella fastidiosa* (with a Certified GEP Company)

This trial was conducted in 2017. This is a test with multi-year evaluations (during 3 consecutive years 2017-2018. The trial was conducted near Ugento in Lecce province, Puglia region (Southern Italy), in a farm representative of this area in terms of varieties of trees and cultivation techniques of olive for oil production. Unfortunately, the presence of olive trees showing symptoms due to *Xylella fastidiosa* was previously confirmed in this area and in this field. The trial is conducted by a certified company.

Experimental Conditions

Plant Material

For this study, the trial is carried out using olive trees of the Olea europea genotype and the Carolea variety (transplanted on January 1993).

Design of the Trial

The trial design was a randomized complete block (RCB) with four replicates. The plot area was 96 m² (6×16 m) with 4 plants/plot.

Protocol

In this trial, PP1 was tested at three different concentrations (0.5N, 1N and 2N) and compared to the standard Ossiclor 35 WG (oxychloride copper 35%, WG). The treatments list is presented in the following Table 1:

TABLE 1

List of treatments

| N° of treatment | Type | Treatment Name | Concentration | Rate | Application | Interval between applications |
| --- | --- | --- | --- | --- | --- | --- |
| 1 | CHK | Not treated | — | — | — | — |
| 2 | FUNG | PP1 | 0.5N | — | 11 | 15 days |
| 3 | FUNG | PP1 | 1N | — | 11 | 15 days |
| 4 | FUNG | PP1 | 2N | — | 11 | 15 days |
| 5 | FUNG | Ossiclor 35 WG | 35% | 2.86 kg/ha | 3 | A: soon after pruning B: after flowering C: end of August beginning of September |

A total of 11 foliar applications were carried out, with an interval of 13-15 days between each application (see Table 2).

TABLE 2

| | Schedule of treatments with PP1 | | | | | | | | | | |
|---|---|---|---|---|---|---|---|---|---|---|---|
| Treatment | A | B | C | D | E | F | G | H | I | J | K |
| Trial 2017 | 06/01 | 06/15 | 06/29 | 07/24 | 07/28 | 08/10 | 08/24 | 09/09 | 09/22 | 10/05 | 10/26 |

Seven efficacy assessments were conducted, just before application timing. The assessments involved the evaluation of the following parameters:

- Number of new shoots per plant
- Crop vigor, expressed on a 0-10 scale, where 10=maximum crop vigor and 0=dead plant
- Average length of new shoot
- NDVI index (0-1)—Normalized Difference Vegetation Index
- Leaf transpiration, expressed as stomatal conductance (mmol/m$^2$×sec) measured by means of a porometer (average value obtained from four measurements per tree)
- Finally, at harvest, the yield (kg/plot), the weight of 100 olives (g) and the oil content (%) were determined.
- Crop selectivity assessments were conducted in order to detect any symptom of phytotoxicity (PHYGEN) due to the application of the experimental product such as chlorosis, yellowing, stunting, etc., through comparisons with the untreated plots.

Moreover, data were analyzed using ANOVA techniques within the research database software Agriculture Research Manager (ARM) version 2017.4. Where this implied statistically significant differences this was followed by Student-Newman-Keuls test, for significant difference at the 95% confidence level. Where two means share the same alphabetical notation, they are not significantly different.

Results

Before the beginning of the trial, the disease is considered as homogenous in the field, and corresponds to 10% of infection (average disease severity)

Number of New Shoots Per Plant and Vigor Assessment

The monitoring of morphological parameters related to the vegetative growth of olive trees has allowed to appreciate the changes following the application of the PP1 product. Indeed, *Xylella fastidiosa* is a degenerative disease, which is able to kill a centenary olive tree in 3 years. When a disease is installed, the trees are in a process of death. The vigor, the appearance of new shoots, or new leaves are the witness of the recovery of an active metabolism.

In terms of crop vigor, the best performance was achieved by treatment 4 (PP1 2N, see FIG. 15) which maintained the maximum vigor value of 10.0. Treatment 3 (PP1 1N) showed a slightly lower value of 9.5, followed by treatment 2 (PP1 0.5N) with 9.0. The lowest crop vigor among the treatments was obtained by commercial copper-based treatment (Ossiclor 35 WG).

Regarding the average number of new shoots per branch sampled, the untreated control gave 0.0 shoots/branch which is normal in control plants for a degenerative disease (see FIG. 14). The results recorded for the other treatments showed little change during the trial. Treatment 4 (PP1 2N) had the highest result with 2.13 new shoots/branch, followed by treatment 3 (PP1 1N) and treatment 2 (PP1 0.5N) with 1.23 and 1.15 new shoots/branch respectively. Finally, treatment 5 (Ossiclor 35 WG) recorded the lowest number of new shoots/branch, equal to 0.28.

As to FIGS. 14 to 17: Crop vigor, expressed on a scale of 0 to 10, where 10=maximum crop vigor and 0=dead plant; B: Number of new shoots/branch C: Average length of new shoots (cm); D: NDVI index (0-1): Normalized Difference Vegetation. Data were analyzed using ANOVA techniques within the research database software Agriculture Research Manager (ARM) version 2017.4. Where this implied statistically significant differences this was followed by Student-Newman-Keuls test, for significant difference at the 95% confidence level. Where two means share the same alphabetical notation, they are not significantly different.

The highest average shoot length was obtained by treatment 4 (2N), (8.72 cm, see FIG. 16), followed by treatment. 3 and 2 which are respectively 5.38 cm and 3.43 cm on average, while treatment 5 again records the lowest result, with only 1.22 cm. Considering the NDVI index (see FIG. 17), treatment 4 and 3 obtained the best performance, with an average NDVI of 0.78 and 0.77, followed by treatment 2 which obtained an average NDVI of 0.75. The lowest NDVI was recorded by treatment 5 (Ossiclor 35 WG), comparable to that of the control (NDVI equal to 0.71).

In conclusion, PP1 demonstrated an interesting vegetative response in olive trees affected by the pathogenic *Xylella fastidiosa* at all doses tested (0.5N, 1N and 2N). These results include an improvement of the vegetative activity of the plants evidenced by outcomes obtained from the investigated parameters (number of new shoots, length of new shoots, stomatal conductance, crop vigor, NDVI).

The overall performance of the tested product, with all the parameters described above, has always been better than the copper-based formulation (Ossiclor 35 WG), normally adopted by farmers. Our study therefore allows us to appreciate the positive effect of PP1 on the development of the plant in the event of infection by *Xylella*. To better understand the phenomenon, other metabolic parameters have been assessed:

Stomatal Conductance

Stomatal conductance is correlated with the plant's potential to manage the transport of sap from roots to leaves.

All trees treated with PP1 show a higher stomatal conductance compared to the control (throughout the trial) and significant levels (see FIG. 18). Indeed, the highest results were obtained by treatment 4 (2 N) and treatment 3 (1N), which had mean values of 383 and 379.5 mmol/m$^2$×sec, respectively, followed by treatment 2 (0.5N). The lowest stomatal conductance value was obtained by treatment 5 (Ossiclor 35 WG) with 329.5 mmol/m$^2$×sec which is not statistically different from the untreated control. The stomatal conductance values are directly correlated with the water potential of the plants. The higher conductivity measurements indicate an excellent ability of the bundles to transport water to the leaves.

In FIG. 18, data were analyzed using ANOVA techniques within the research database software Agriculture Research Manager (ARM) version 2017.4. Where this implied statistically significant differences this was followed by Student-Newman-Keuls test, for significant difference at the 95% confidence level. Where two means share the same alphabetical notation, they are not significantly different In conclusion, whatever the dose of PP1 product used, there is a significant increase in stomatal conductance compared to the control or commercial product. The stomatal conductance values are directly correlated with the water potential of the plants. The water potential and the highest conductivity measurements indicate an excellent ability of the bundles to transport water to the leaves.

These results suggest that PP1 would influence the movement of nutrients and water in the plant and allow for a better use of water and nutrients. This reflects a decrease in the bacterium's infection or a decrease in the activity of the bacteria, since it has the effect of blocking the xylem vessels, which then causes the decline of the trees by blocking water influx.

Crop Yield and Quality

At the end of the trial, the harvest and its quality are evaluated. The highest yield was recorded by treatment 4 (PP1 2N) with 176.30 kg/plot (see FIG. 4 A). Treatment 3 (PP1 1N) obtained a slightly lower result, equal to 167.74 kg/plot, followed by treatment 2 (PP1 0.5N) with 157.51 kg/plot. Treatment 5 (Ossiclor 35 WG) recorded 140.02 kg/plot and was slightly lower than the control (141.79 kg/plot).

The highest fresh olive weight of 100 olives, was recorded by treatment 4 (PP1 2N) with 439.99 g (see FIG. 4 B). Treatment 3 (PP1 1N) obtained a slightly lower result, equal to 426.99 g, followed by treatment 2 (PP1 0.5N) with 406.19 g. Treatment 5 (Ossiclor 35 WG) recorded 349.02 g which is not statistically different from the untreated control (358.14 g).

With regard to oil content (% by weight, see FIG. 4.C), it turned out that treatment 5 (Ossiclor 35 WG) and untreated control obtained statistically similar results, equal to 21.27% and 21.28% respectively, followed by treatment 3 (PP1 1N) and treatment 2 (PP1 0.5N) with 19.63% and 19.14%.

The results show an advantage to the application of PP1 on the drupes yield (fresh weight). Indeed, this difference in yield is significant, and we can observe a significant increase in yield depending on the application rates of the product compared to the control and commercial product. The application of PP1 allows the plant to invest energy in fruit production despite disease control. The drupe yield is increasing significantly, and the weight of olives is greater. The amount of oil (%) gives a tendency of reduction for the olive trees treated with PP1, but it is not significant, and the cultures are healthy.

FIGS. 19 to 21: Harvest yield and quality results

FIG. 19: fresh weight of olives per plot in kg/plot,

FIG. 20: Weight of 100 olives in gram,

FIG. 21: Oil concentration in %.

Data were analyzed using ANOVA techniques within the research database software Agriculture Research Manager (ARM) version 2017.4. Where this implied statistically significant differences this was followed by Student-Newman-Keuls test, for significant difference at the 95% confidence level. Where two means share the same alphabetical notation, they are not significantly different.

Crop Selectivity Assessments

The application of the tested product at all rates did not cause any symptom of phytotoxicity (Table 3) on olive trees of variety 'Carolea' during the whole trial period and no problems emerged in handling the experimental product.

TABLE 3

| Evaluation of phytotoxicity | | | | | |
|---|---|---|---|---|---|
| Date/ Treatments | 1: UNT Check | 2: PP1 0.5N | 3: PP1 1N | 4: PP1 2N | 5: Ossiclor 35 WG |
| Jul. 15, 2017 | 0.0 a | 0.0 a | 0.0 a | 0.0 a | 0.0 a |
| Jul. 29, 2017 | 0.0 a | 0.0 a | 0.0 a | 0.0 a | 0.0 a |
| Aug. 10, 2017 | 0.0 a | 0.0 a | 0.0 a | 0.0 a | 0.0 a |
| Aug. 24, 2017 | 0.0 a | 0.0 a | 0.0 a | 0.0 a | 0.0 a |
| Sep. 22, 2017 | 0.0 a | 0.0 a | 0.0 a | 0.0 a | 0.0 a |
| Oct. 26, 2017 | 0.0 a | 0.0 a | 0.0 a | 0.0 a | 0.0 a |

Data were analyzed using ANOVA techniques within the research database software Agriculture Research Manager (ARM) version 2017.4. Where this implied statistically significant differences this was followed by Student-Newman-Keuls test, for significant difference at the 95% confidence level. Where two means share the same alphabetical notation, they are not significantly different.

Conclusions

This trial allows us to assess the effectiveness of PP1. Indeed, no symptoms associated with leaf dieback or necrosis were observed on all olive trees treated with PP1, unlike other trees, which continued to develop symptoms.

PP1 is able to significantly eliminate *Xylella fastidiosa* symptoms in infected olive trees. After treatment with PP1, the plant crown of the olive trees becomes healthy again (development of new growth), no opportunistic diseases are present on the drupes, olive production is increasing and stomatal conductance is higher in the leaves of the treated olive trees, which indicates a resumption of sap transport in xylem vessels. This overall improvement in plant stomatal conductance and vital signs allows the plant to redirect its sources to growth and development.

Annex 1: Data Table—Trial *Xylella fastidiosa* on Olive Trees (with the Company AGRI2000—Trial A17-361-939XE)

TABLE 4

| Evaluation of percentage of disease | | | | | |
|---|---|---|---|---|---|
| Date/ Treatments | 1: UNT Check | 2: PP1 0.5N | 3: PP1 1N | 4: PP1 2N | 5: Ossiclor 35 WG |
| Jun. 1, 2017 | 10.8 a | 15.0 a | 11.3 a | 18.8 a | 15.0 a |
| Aug. 24, 2017 | 10.8 a | 15.0 a | 11.3 a | 18.8 a | 15.0 a |

TABLE 5

| Evaluation of crop vigor | | | | | |
|---|---|---|---|---|---|
| Date/ Treatments | 1: UNT Check | 2: PP1 0.5N | 3: PP1 1N | 4: PP1 2N | 5: Ossiclor 35 WG |
| Jul. 14, 2017 | 9 a | 9.3 a | 9.5 a | 10 a | 9.5 a |
| Jul. 28, 2017 | 9 a | 9.3 a | 9.5 a | 10 a | 9.5 a |
| Aug. 10, 2017 | 9 a | 9.3 a | 9.5 a | 10 a | 9.5 a |
| Aug. 24, 2017 | 9 a | 9.3 a | 9.5 a | 10 a | 9.5 a |
| Sep. 22, 2017 | 8.3 c | 9 bc | 9.5 ab | 10 a | 8.8 bc |
| Oct. 26, 2017 | 7.5 c | 9 bc | 9.5 ab | 10 a | 8.8 b |

TABLE 6

Evaluation of number of new shoots

| Date/Treatments | 1: UNT Check | 2: PP1 0.5N | 3: PP1 1N | 4: PP1 2N | 5: Ossiclor 35 WG |
|---|---|---|---|---|---|
| Sep. 22, 2017 | 0 b | 1.15 ab | 1.23 ab | 2.13 a | 0.28 b |
| Oct. 26, 2017 | 0 b | 1.15 ab | 1.23 ab | 2.13 a | 0.28 b |

TABLE 7

Evaluation of length of new shoot

| Date/Treatments | 1: UNT Check | 2: PP1 0.5N | 3: PP1 1N | 4: PP1 2N | 5: Ossiclor 35 WG |
|---|---|---|---|---|---|
| Sep. 22, 2017 | 0 b | 2.1 ab | 2.69 ab | 6.18 a | 0.65 b |
| Jun. 11, 2017 | 0 b | 3.43 ab | 5.38 ab | 8.72 a | 1.22 b |

TABLE 8

Evaluation of NDVI index

| Date/Treatments | 1: UNT Check | 2: PP1 0.5N | 3: PP1 1N | 4: PP1 2N | 5: Ossiclor 35 WG |
|---|---|---|---|---|---|
| Sep. 22, 2017 | 0.71 c | 0.74 b | 0.76 ab | 0.77 a | 0.72 c |
| Oct. 26, 2017 | 0.71 c | 0.75 b | 0.77 ab | 0.78 a | 0.72 c |

TABLE 9

Evaluation of stomatal conductance

| Date/Treatments | 1: UNT Check | 2: PP1 0.5N | 3: PP1 1N | 4: PP1 2N | 5: Ossiclor 35 WG |
|---|---|---|---|---|---|
| Oct. 12, 2017 | 303.8 c | 360.1 ab | 378.2 a | 374.5 a | 331.6 bc |
| Nov. 06, 2017 | 299.6 c | 348.1 ab | 379.5 a | 383 a | 329.5 bc |

TABLE 10

Evaluation of oil content (%)

| Date/Treatments | 1: UNT Check | 2: PP1 0.5N | 3: PP1 1N | 4: PP1 2N | 5: Ossiclor 35 WG |
|---|---|---|---|---|---|
| Sep. 09, 2017 | 21.28 a | 19.14 a | 19.63 a | 17.89 a | 21.27 a |

TABLE 11

Evaluation of the yield (kg/plot)

| Date/Treatments | 1: UNT Check | 2: PP1 0.5N | 3: PP1 1N | 4: PP1 2N | 5: Ossiclor 35 WG |
|---|---|---|---|---|---|
| Sep. 09, 2017 | 141.79 c | 157.51 b | 167.74 ab | 176.3 a | 140.02 c |

TABLE 12

Evaluation of the weight of 100 olives (g)

| Date/Treatments | 1: UNT Check | 2: PP1 0.5N | 3: PP1 1N | 4: PP1 2N | 5: Ossiclor 35 WG |
|---|---|---|---|---|---|
| Sep. 09, 2017 | 358.15 c | 406.19 b | 426.99 ab | 439.99 a | 349.02 |

2018—Trial *Xylella fastidiosa* on Olive Trees (with a GEP Certified Company.

This trial started in 2018. This is a test with multi-year evaluations (during 2 consecutive years 2017-2018). For the second year, the trial was conducted near Ugento in Lecce province, Puglia region (Southern Italy), in a farm representative of this area in terms of varieties of trees; and cultivation techniques of olive for oil production. Unfortunately, the presence of olive trees showing symptoms due to *Xylella fastidiosa* was previously confirmed in this area and in this field. The trial is conducted by a certified company.

Experimental Conditions

Plant Material

For this study, the trial is carried out using olive trees of the Olea europea genotype and the Carolea variety (transplanted on January 1993).

Design of the Trial:

The trial design was a randomized complete block (RCB) with four replicates. The plot area was 96 m² (6×16 m) with 4 plants/plot.

Protocol

In this trial, PP1 was tested at three different concentrations (0.5N, 1N and 2N) and compared to the standard Ossiclor 35 WG (oxychloride copper 35%, WG). The list of treatments is presented in Table 13.

TABLE 13

List of treatments

| N° of treatment | Type | Treatment Name | Concentration | Rate | Application | Interval between applications |
|---|---|---|---|---|---|---|
| 1 | CHK | Not treated | — | — | — | — |
| 2 | FUNG | PP1 | 0.5N | — | 10 | 15 days |
| 3 | FUNG | PP1 | 1N | — | 10 | 15 days |
| 4 | FUNG | PP1 | 2N | — | 10 | 15 days |
| 5 | FUNG | Ossiclor 35 WG | 35% | 2.86 kg/ha | 3 | A: soon after pruning B: after flowering C: end of August beginning of September |

A total of 10 foliar applications were carried out, with an interval of 13-15 days between each application (see Table 14).

TABLE 14

Schedule of treatments with PP1

| Treatment | A | B | C | D | E | F | G | H | I | J |
|---|---|---|---|---|---|---|---|---|---|---|
| Trial 2018 | 06/16 | 06/29 | 07/13 | 07/27 | 08/10 | 08/24 | 09/07 | 09/27 | 10/05 | 10/20 |

Seven different assessments were conducted: just before application timing. The assessments involved the evaluation of the following parameters:

Number of new shoots per plant

Crop vigor, expressed on a 0-10 scale, where 10=maximum crop vigor and 0=dead plant Average length of new shoot NDVI index (0-1)—Normalized Difference Vegetation Index Leaf transpiration, expressed as stomatal conductance (mmol/m$^2$×sec) measured by means of a porometer (average value obtained from four measurements per tree)

Finally, at harvest, the yield (kg/plot), the weight of 100 olives (g) and the oil content (%) were determined.

Crop selectivity assessments were conducted in order to detect any symptom of phytotoxicity (PHYGEN) due to the application of the experimental product such as chlorosis, yellowing, stunting, etc., through comparisons with the untreated plots.

Moreover, data were analyzed using ANOVA techniques within the research database software Agriculture Research Manager (ARM) version 2017.4. Where this implied statistically significant differences this was followed by Student-Newman-Keuls test, for significant difference at the 95% confidence level. Where two means share the same alphabetical notation, they are not significantly different.

Results

Vigor Assessment and Number of New Shoots Per Plant and

The monitoring of morphological parameters related to the vegetative growth of olive trees has allowed to appreciate the changes following the application of the PP1 product. Indeed, *Xylella fastidiosa* is a degenerative disease, which is able to kill a centenary olive tree in 3 years. When this disease is installed, the trees are in a process of death. The vigor, the appearance of new shoots, or new leaves are the witness of the recovery of an active metabolism.

In terms of crop vigor, after a first year of experiment in this same field, the best performance was achieved by treatment 4 (PP1 2N, see FIG. 25) which maintained the maximum vigor value of 10.0. Treatment 3 (PP1 1N) showed a slightly lower value of 9.5, followed by treatment 2 (PP1 0.5N) with 9.0. The lowest crop vigor among the treatments was obtained by commercial copper-based treatment (Ossiclor 35 WG). This second year of experiment, we can see that the vigor is improving globally for the trees treated with PP1, and is always maximum for the treatment with PP1 2 N. For the untreated plant, the level of vigor is decreasing again comparing to the first year of experimentation.

Regarding the average number of new shoots per branch sampled, the untreated control gave 0.0 shoots/branch which is normal for a degenerative disease (see FIG. 26). Treatment 4 (PP1 2N) had the highest result with 1.9 new shoots/branch, followed by treatment 3 (PP1 1N) and treatment 2 (PP1 0.5N) with 1.05 and 0.58 new shoots/branch respectively. Finally, treatment 5 (Ossiclor 35 WG) recorded the lowest number of new shoots/branch, equal to 0.08.

In FIGS. 25 to 28: Evaluation of parameters related to vegetative growth

FIG. 25: Crop vigor, expressed on a scale of 0 to 10, where 10=maximum crop vigour and 0=dead plant;

FIG. 26: Number of new shoots

FIG. 27: Average length of new shoots (cm);

FIG. 28: NDVI index (0-1): Normalized Difference Vegetation Index.

Data were analyzed using ANOVA techniques within the research database software Agriculture Research Manager (ARM) version 2018.3. Where this implied statistically significant differences this was followed by Student-Newman-Keuls test, for significant difference at the 95% confidence level. Where two means share the same alphabetical notation, they are not significantly different.

The highest average shoot length was obtained by treatment 4 (2N), (14.7 cm, see FIG. 27), followed by treatment. 3 and 2 which are respectively 9.7 cm and 4.29 cm on average, while treatment 5 again records the lowest result, with only 0.43 cm. Considering the NDVI index (see FIG. 28), treatment 4 and 3 obtained the best performance, with an average NDVI of 0.79 and 0.77, followed by treatment 2 which obtained an average NDVI of 0.75. The lowest NDVI was recorded by treatment 5 (Ossiclor 35 WG), comparable to that of the control (NDVI equal to 0.72).

We can see that the length of shoots is improving comparing to the previous year.

In conclusion, PP1 demonstrated an interesting vegetative response in olive trees affected by the pathogenic *Xylella fastidiosa* at all doses tested (0.5N, 1N and 2N). These results include an improvement of the vegetative activity of the plants evidenced by outcomes obtained from the investigated parameters (number of new shoots, length of new shoots, stomatal conductance, crop vigor, NDVI).

The overall performance of the tested product, with all the parameters described above, has always been better than the copper-based formulation (Ossiclor 35 WG), normally adopted by farmers. Our study therefore allows us to appreciate the positive effect of PP1 on the development of the plant in the event of infection by *Xylella*.

It is interesting to note that the conditions of health of the treated plants by PP1 are improving, whereas the health of the control plants is decreases.

Stomatal Conductance

Stomatal conductance is correlated with the plants potential to manage the transport of sap from roots to leaves. If increasing, this parameter is the witness of the decrease of the disease, the bacteria locking the xylem vessels.

Figure 29:
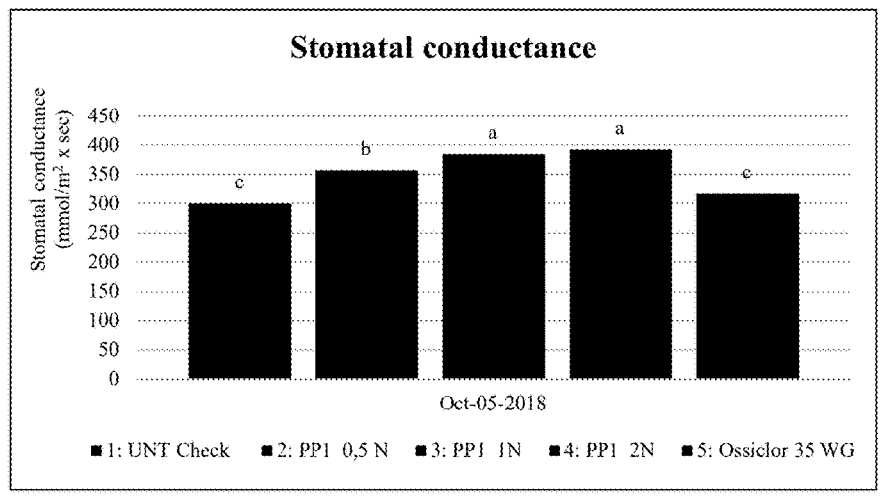

All trees treated with PP1 show a higher stomatal conductance compared to the control (throughout the trial) and significant levels (see FIG. 29). Indeed, the highest results were obtained by treatment 4 (2 N) and treatment 3 (1N), which had mean values of 392.68 and 384.55 mmol/m$^2$×sec, respectively, followed by treatment 2 (0.5N). The lowest stomatal conductance value was obtained by treatment 5 (Ossiclor 35 WG) with 317.33 mmol/m$^2$×sec which is not statistically different from the untreated control. The stomatal conductance values are directly correlated with the water potential of the plants. The higher conductivity measurements indicate an excellent ability of the bundles to transport water to the leaves.

The results are confirmed, like the previous year, but the difference of the level of stomatal conductance is now significant for all the PP1 treatments, compared to the control plants and plants treated with copper reference.

FIG. 29: Stomatal conductance during the trial

Data were analyzed using ANOVA techniques within the research database software Agriculture Research Manager (ARM) version 2018.3. Where this implied statistically significant differences this was followed by Student-Newman-Keuls test, for significant difference at the 95% confidence level. Where two means share the same alphabetical notation, they are not significantly different.

In conclusion, whatever the dose of PP1 product used, there is a significant increase in stomatal conductance compared to the control or commercial product. The stomatal conductance values are directly correlated with the water potential of the plants. The water potential and the highest conductivity measurements indicate an excellent ability of the bundles to transport water to the leaves, which is improving.

These results suggest that PP1 would influence the movement of nutrients and water in the plant and allow for a better use of water and nutrients. This reflects a decrease in the bacterium's infection or in the activity of bacteria, since it has the effect of blocking the xylem vessels, which then causes the decline of the trees by blocking water influx.

Crop Yield and Quality

At the end of the trial, the harvest and its quality are evaluated. The highest fresh olive weight per plot was recorded by treatment 4 (PP1 2N) with 132.85 kg/plot (see FIG. 30). Treatment 3 (PP1 1N) obtained a slightly lower result, equal to 127.28 kg/plot, followed by treatment 2 (PP1 0.5N) with 121.97 kg/plot. Treatment 5 (Ossiclor 35 WG) recorded 112.38 kg/plot which is not statistically different from the untreated control (111.31 kg/plot).

Figure 31:
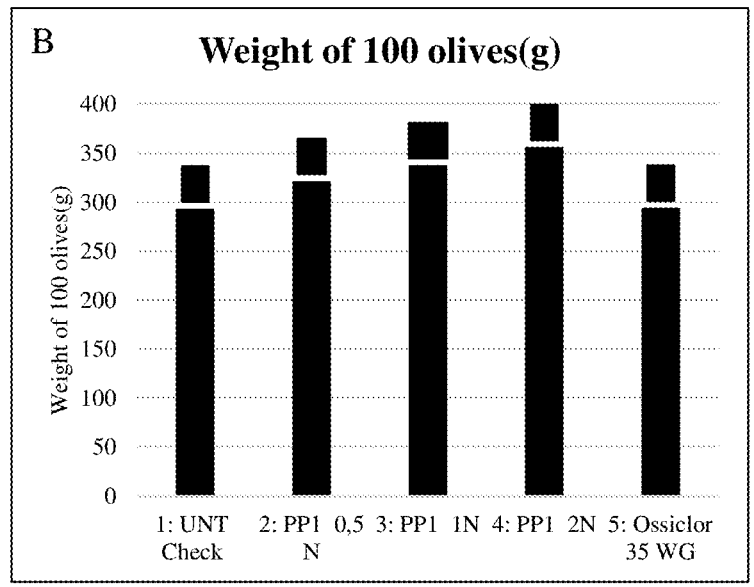

The highest fresh olive weight of 100 olives, was recorded by treatment 4 (PP1 2N) with 355.08 g (see FIG. 31). Treatment 3 (PP1 1N) obtained a slightly lower result, equal to 336.46 g, followed by treatment 2 (PP1 0.5N) with 320.29 g. Treatment 5 (Ossiclor 35 WG) recorded 293.06 g which is not statistically different from the untreated control (292.15 g).

With regard to oil content (% by weight, see FIG. 32), it turned out that untreated control obtained the best result with 22.01%, followed by treatment 2 (PP1 0.5 N) and treatment 5 (Ossiclor 35 WG) with 20.05% and 19.98% respectively, followed by treatment 4 (2N) and treatment 3 (1N).

Figure 30:
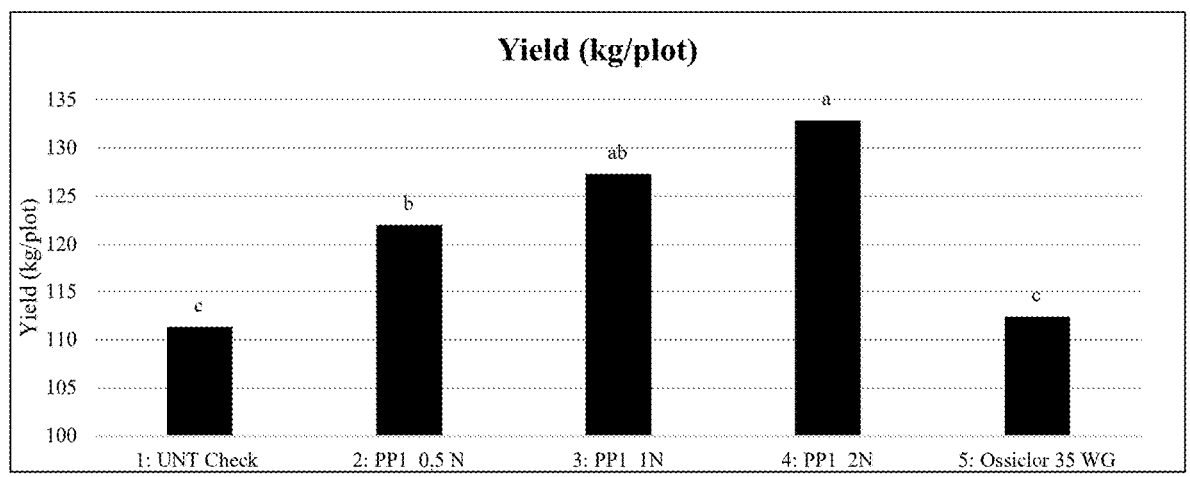
Figure 32:
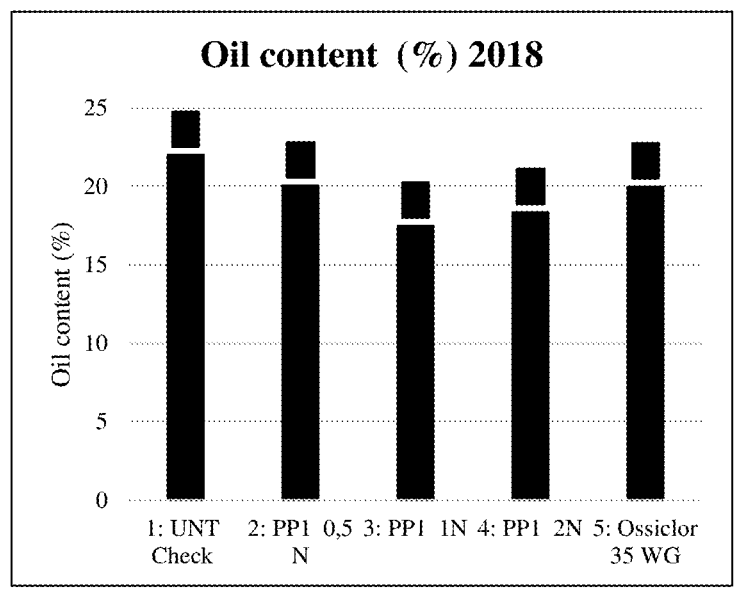

FIGS. 30 to 32: Harvest yield and quality results

FIG. 30: fresh weight of olives per plot in kg/plot,

FIG. 31: Weight of one hundred olives,

FIG. 32: Oil concentration in %.

Data were analyzed using ANOVA techniques within the research database software Agriculture Research Manager (ARM) version 2018.3. Where this implied statistically significant differences this was followed by difference at the 95% confidence level. Where two means share the same alphabetical notation, they are not significantly different.

The results show an advantage to the application of PP1 on the drupes yield (fresh weight). Indeed, this difference in yield is significant, and we can observe a significant increase in yield depending on the application rates of the product compared to the control and commercial product. The application of PP1 allows the plant to invest energy in fruit production despite disease control.

Because the plant actively defends itself against the disease to stay alive and develop, there is an increase in the harvest and an increase in the weight of olives. Nevertheless, the counterpart to this positive fight, seems to be a decrease in the percentage of oil. However, it must be taken into account that, following treatment with PP1:

1/ Symptoms of the disease recede and fade, tree vigor is maximal

2/ Based on the results from FIG. 8, it is possible to make the comparison between productions:

On the FIGS. 30 to 32, from the graphs of FIG. 31 (yield (Kg/plot) and 32 (oil content (%)), it is possible to calculate the olive oil weight per plot (Untreated tree: 24.42 Kg; Treated tree with PP1 0.5 N:24.40 Kg; Treated tree with PP1 N:22.22 Kg; Treated tree with PP1 2 N:23.94 Kg) Finally, the decrease in oil production is minimal (less than 10%), and the advantage of the treatment in indisputable to keep the olive trees alive and the cultures healthy and sustainable.

Crop Selectivity Assessments

The application of the tested product at all rates did not cause any symptom of phytotoxicity (Table 15) on olive trees of variety 'Carolea' during the whole trial period and no problems emerged in handling the experimental products.

TABLE 15

Evaluation of phytotoxicity

| Date/ Treatments | 1: UNT Check | 2: PP1 0.5N | 3: PP1 1N | 4: PP1 2N | 5: Ossiclor 35 WG |
|---|---|---|---|---|---|
| Aug. 10, 2018 | 0.0 a | 0.0 a | 0.0 a | 0.0 a | 0.0 a |
| Sep. 07, 2018 | 0.0 a | 0.0 a | 0.0 a | 0.0 a | 0.0 a |
| Sep. 27, 2018 | 0.0 a | 0.0 a | 0.0 a | 0.0 a | 0.0 a |
| Oct. 05, 2018 | 0.0 a | 0.0 a | 0.0 a | 0.0 a | 0.0 a |
| Oct. 20, 2018 | 0.0 a | 0.0 a | 0.0 a | 0.0 a | 0.0 a |

Data were analyzed using ANOVA techniques within the research database software Agriculture Research Manager (ARM) version 2018.3. Where this implied statistically significant differences this was followed by Student-Newman-Keuls test, for significant difference at the 95% confidence level. Where two means share the same alphabetical notation, they are not significantly different.

Conclusions

This trial allows us to assess the effectiveness of PP1. Indeed, no symptoms associated with leaf dieback or necrosis were observed on all olive trees treated with PP1, unlike other trees, which continued to develop symptoms.

PP1 is able to significantly eliminate *Xylella fastidiosa* symptoms in infected olive trees. After treatment with PP1, the plant crown of the olive trees becomes healthy again (development of new shoots), no opportunistic diseases are present on the drupes, olive production is increasing and stomatal conductance is higher in the leaves of the treated olive trees, which indicates a resumption of sap transport in xylem vessels. This overall improvement in plant stomatal conductance and vital signs allows the plant to redirect its sources to growth and development.

Annex 2: Data table—Trial *Xylella fastidiosa* on olive trees (with the company AGRI2000—Trial A18-466-939XE)

TABLE 16

| Evaluation of percentage of disease | | | | | |
|---|---|---|---|---|---|
| Date/ Treatments | 1: UNT Check | 2: PP1 0.5N | 3: PP1 1N | 4: PP1 2N | 5: Ossiclor 35 WG |
| Sep. 7, 2018 | 19.8 a | 29.1 a | 18.3 a | 27.4 a | 23.1 a |

TABLE 17

| Evaluation of crop vigor | | | | | |
|---|---|---|---|---|---|
| Date/ Treatments | 1: UNT Check | 2: PP1 0.5N | 3: PP1 1N | 4: PP1 2N | 5: Ossiclor 35 WG |
| Aug. 10, 2018 | 7.3 d | 9.0 b | 9.5 ab | 10.0 a | 8.3 c |
| Sep. 7, 2018 | 7.0 e | 9.0 c | 9.5 b | 10.0 a | 8.3 d |
| Sep. 27, 2018 | 7.0 e | 9.0 c | 9.5 b | 10.0 a | 8.0 d |
| Oct. 05, 2018 | 6.8 e | 9.0 c | 9.5 b | 10.0 a | 8.0 d |
| Oct. 20, 2018 | 6.8 e | 9.0 c | 9.5 b | 10.0 a | 8.0 d |

TABLE 18

Evaluation of number of new shoots

| Date/Treatments | 1: UNT Check | 2: PP1 0.5N | 3: PP1 1N | 4: PP1 2N | 5: Ossiclor 35 WG |
|---|---|---|---|---|---|
| Oct. 05, 2018 | 0.0 c | 0.58 bc | 1.05 b | 1.9 a | 0.08 c |
| Dec. 21, 2018 | 0.0 c | 0.58 bc | 1.05 b | 1.9 a | 0.08 c |

TABLE 19

Evaluation of length of new shoot

| Date/Treatments | 1: UNT Check | 2: PP1 0.5N | 3: PP1 1N | 4: PP1 2N | 5: Ossiclor 35 WG |
|---|---|---|---|---|---|
| Oct. 20, 2018 | 0 d | 2.00 c | 4.30 b | 8.01 a | 0.22 d |
| Dec. 21, 2018 | 0 d | 4.29 c | 9.70 b | 14.70 a | 0.43 d |

TABLE 20

Evaluation of NDVI index

| Date/Treatments | 1: UNT Check | 2: PP1 0.5N | 3: PP1 1N | 4: PP1 2N | 5: Ossiclor 35 WG |
|---|---|---|---|---|---|
| Oct. 05, 2018 | 0.70 c | 0.75 b | 0.77 ab | 0.79 a | 0.72 c |

TABLE 21

Evaluation of stomatal conductance

| Date/Treatments | 1: UNT Check | 2: PP1 0.5N | 3: PP1 1N | 4: PP1 2N | 5: Ossiclor 35 WG |
|---|---|---|---|---|---|
| Oct. 05, 2018 | 300.13 c | 356.86 b | 384.55 a | 392.68 a | 317.33 c |

TABLE 22

Evaluation of oil content (%)

| Date/Treatments | 1: UNT Check | 2: PP1 0.5N | 3: PP1 1N | 4: PP1 2N | 5: Ossiclor 35 WG |
|---|---|---|---|---|---|
| Oct. 24, 2018 | 22.01 a | 20.05 b | 17.49 e | 18.35 d | 19.98 c |

TABLE 23

Evaluation of the yield (kg/plot)

| Date/Treatments | 1: UNT Check | 2: PP1 0.5N | 3: PP1 1N | 4: PP1 2N | 5: Ossiclor 35 WG |
|---|---|---|---|---|---|
| Oct. 24, 2018 | 111.31 c | 121.97 b | 127.28 ab | 132.85 a | 112.38 c |

TABLE 24

Evaluation of weight of 100 olives (g)

| Date/Treatments | 1: UNT Check | 2: PP1 0,5 N | 3: PP1 1N | 4: PP1 2N | 5: Ossiclor 35 WG |
|---|---|---|---|---|---|
| Oct. 24, 2018 | 292.15 c | 320.29 b | 336.46 ab | 355.08 | 293.06 |

2018—Trial *Xanthomonas arboricola* Pv *Juglandis* on Walnut with a GEP Certified Company Introduction/Problematic

*Xanthomonas arboricola* pv. *Juglandis* is the causal agent of walnut blight. The bacterium overwinters in infected buds and catkins. Buds with the highest bacterial populations are the ones most likely to develop blight. During early spring growth, bacteria spread along developing shoots and nuts. On leaves, infection appears first as reddish-brown spots, on the stems as black, slightly depressed spots often girdling the shoots. Young, infected leaf and catkin buds turn dark brown or black and soon die. The disease is serious on nuts, where it causes black slimy spots of varying sizes.

Walnut blight causes severe damage to leaves, twigs and fruits and results in a significant loss (about 50-70%) of the crop. In addition, the emergence of copper resistance makes the only authorized chemical treatments ineffective and copper has been classified as a candidate for substitution by the authorities.

In view of the problem with *Xanthomonas* and the urgent need to find an effective solution, the efficacy of PP1 was tested in northern Italy on walnut infected with *Xanthomonas arboricola* pv *Juglandis*. PP1 was tested and compared to the standard Ossiclor 35 WG (oxychloride copper 35%, WG).

This trial was conducted in 2018, in a farm representative of that area in terms of varieties and cultivation techniques of walnut production. The trial was conducted near Pettorazza Grimani in Rovigo province, Veneto region (Northern Italy), in a farm representative of that area in terms of varieties and cultivation techniques of walnut production and where the presence of walnut showing symptoms due to *Xanthomonas arboricola* pv *Juglandis* was previously confirmed.

Experimental Conditions

Plant Material

The common walnut (Juglans regia) is a large, deciduous tree attaining heights of 25-35 m and a trunk up to 2 m diameter. For this study, the trial is carried out using common walnut of the Chandler variety (transplanted on April 1995).

Design of the Trial

The trial was conducted in a farm representative of that area in terms of varieties and cultivation techniques of walnut production and where the presence of walnut showing symptoms due to *Xanthomonas arboricola* pv *Juglandis* was previously confirmed. The trial design was a randomized complete block (RCB) with seven replicates. The plot area was 130.2 m$^2$ (7×18.6 m).

Protocol

In this trial, PP1 was tested at one concentration and compared to the standard Ossiclor 35 WG (oxychloride copper 35%, WG). The list of treatments is presented in Table 25.

TABLE 25

List of treatments

| N° of treatment | Type | Treatment Name | Concentration | Rate | Application | Interval between applications |
|---|---|---|---|---|---|---|
| 1 | CHK | Not treated | — | — | — | |
| 2 | FUNG | PP1 | 2N | — | 7 | 15 days |
| 3 | FUNG | Ossiclor 35 WG | 35% | 2.86 kg/ha | 3 | A: soon after pruning B: after flowering C: end of August beginning of September |

A total of 7 foliar applications were carried out, with an interval of 14-18 days between each application (see Table 26).

TABLE 26

Schedule of treatments with PP1

| Treatment | A | B | C | D | E | F | G |
|---|---|---|---|---|---|---|---|
| Trial 2018 | 15 Jun. 2018 | 29 Jun. 2017 | 13 Jul. 2018 | 27 Jul. 2018 | 15 Aug. 2018 | 30 Aug. 2018 | 13 Sep. 2018 |

The efficacy assessments were conducted just before application timing. The assessments involved the evaluation of the following parameters:
- Assessments on leaves and fruits were conducted by evaluating the number of leaves/fruits infected on 100 leaves/fruits for plot (PESINC)
- Assessments on leaves and fruits were conducted by evaluating the area infected on leaves (PESSEV).
- Finally, at harvest, the yield (kg/plot) and the weight of unmarketable husks (kg/plot) were determined.
- Crop selectivity assessments were conducted in order to detect any symptom of phytotoxicity (PHYGEN) due to the application of the experimental product such as chlorosis, yellowing, stunting, etc., through comparisons with the untreated plots.

Moreover, data were analyzed using ANOVA techniques within the research database software Agriculture Research Manager (ARM) version 2018.3. Where this implied statistically significant differences this was followed by Student-Newman-Keuls test, for significant difference at the 95% confidence level. Where two means share the same alphabetical notation, they are not significantly different.

Results

Evaluations of Parameters Related to the Leaves

Regarding the assessment of severity (PESSEV, FIGS. 33 and 34) and disease incidence (PESINC, FIG. 9.B), we can observe that treatment with PP1 allows a decrease in symptom expression during the trial compared to the commercial reference (statistically significant for PESSEV and equivalent to the reference for PESINC).

Figure 33:
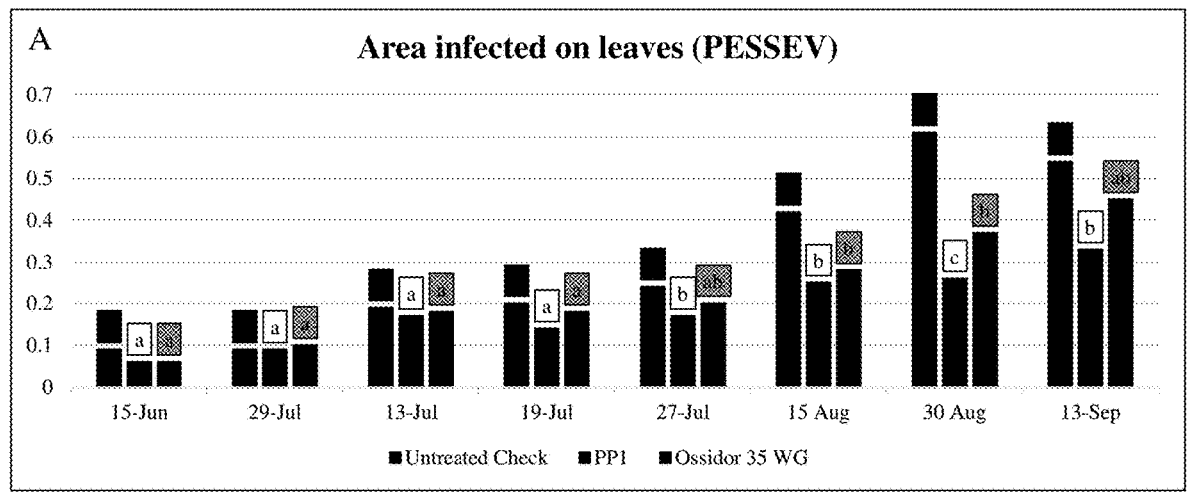
Figure 34:
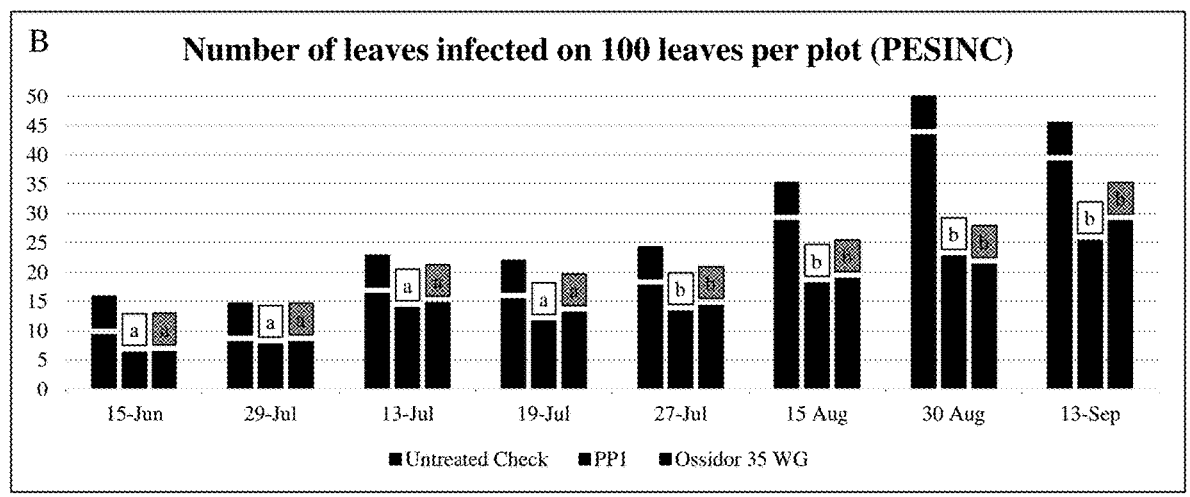

FIGS. 33 and 34: Evaluations of parameters related to the leaves

FIG. 33: Evaluation of the area infected on leaves (PESSEV)

FIG. 34: Evaluation of the number of leaves infected on 100 leaves per plot (PESINC).

Data were analyzed using ANOVA techniques within the research database software Agriculture Research Manager (ARM) version 2018.3. Where this implied statistically significant differences this was followed by Student-Newman-Keuls test, for significant difference at the 95% confidence level. Where two means share the same alphabetical notation, they are not significantly different.

PP1 is able to significantly eliminate *Xanthomonas arboricola* symptoms on leaves in infected walnut. PP1 effectively stimulates the plant's defense mechanisms and prevents the development of the disease in the plant and limits the spread of the disease within the plant, and reverses the kinetics of this epidemic, which has not yet encountered any obstacles.

Evaluations of Parameters Related to the Husks

Figure 35:
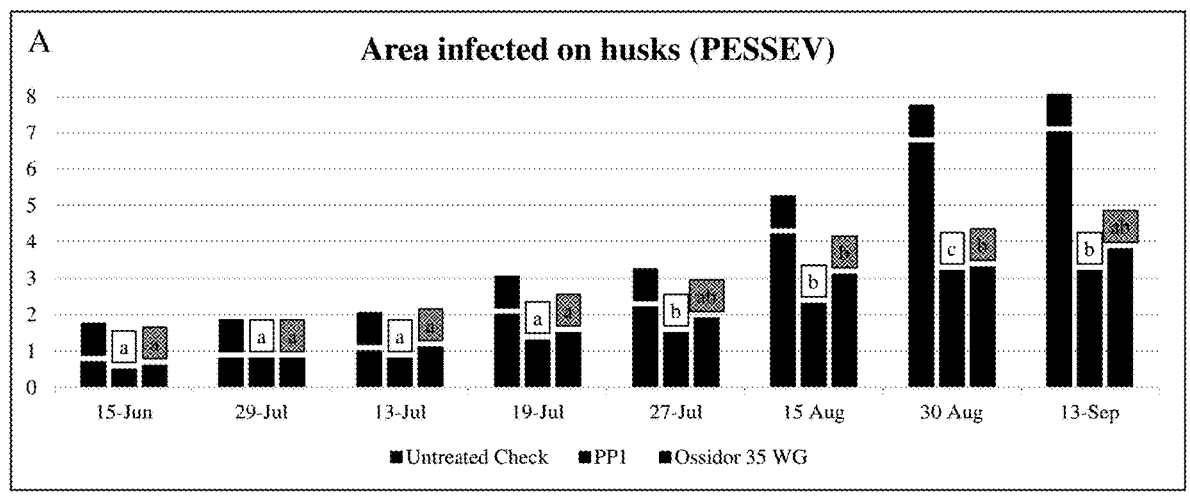
Figure 36:
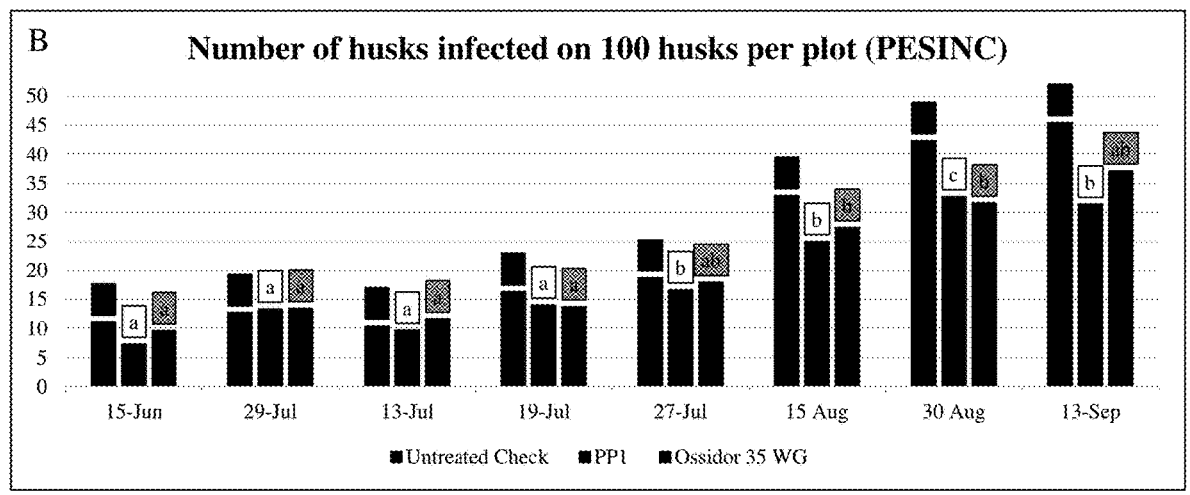

As with results on leaves, we can observe that treatment with PP1 allows a decrease in symptom expression during the trial compared to the commercial reference (see FIGS. 35 and 36, statistically significant for PESSEV and PESINC).

FIGS. 35 and 36: Evaluations of parameters related to the husks

FIG. 35: Evaluation of the area infected on husks (PESSEV)

FIG. 36: Evaluation of the number of husks infected on 100 husks per plot (PESINC).

Data were analyzed using ANOVA techniques within the research database software Agriculture Research Manager (ARM) version 2018.3. Where this implied statistically significant differences this was followed by Student-Newman-Keuls test, for significant difference at the 95% confidence level. Where two means share the same alphabetical notation, they are not significantly different.

PP1 is able to significantly eliminate *Xanthomonas arboricola* symptoms on leaves and on husks in infected walnut. PP1 effectively stimulates the plant's defense mechanisms and prevents the development of the disease in the plant and limits the spread of the disease, and reverses the kinetics of this epidemic, which has not yet encountered any obstacles.

Evaluations of Yield

At the end of the trial, the harvest and its quality are evaluated. The highest yield was recorded by treatment PP1 2N with 7.4 kg/plot (see FIG. 37). Treatment with Ossiclor 35 WG obtained a slightly lower result, equal to 7.34 kg/plot.

No statistical difference is observed between these 3 treatments, but a clear trend is emerging. Indeed, we can observe a higher yield for walnut trees treated with PP1 compared to the control and the commercial reference.

Figure 38:
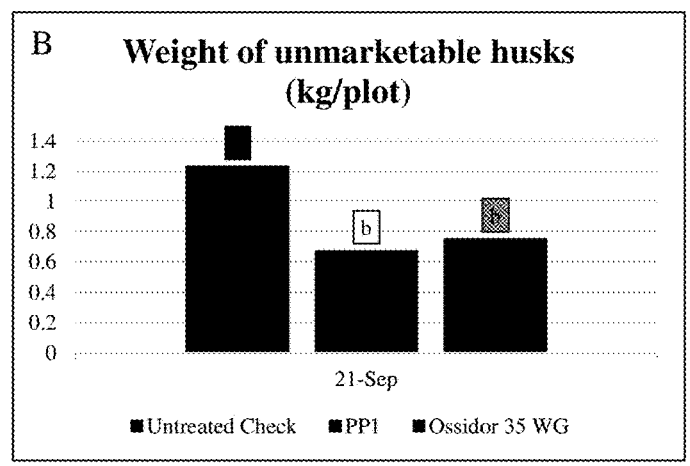

Concerning the evaluation of the weight of unmarketable husks, the best result is obtained by the by treatment PP1 2N with 0.67 kg/plot (see FIG. 38). Treatment with Ossiclor 35 WG obtained a slightly higher result, equal to 0.75 kg/plot (but not statically different between the PP1 treatments).

Figure 37:
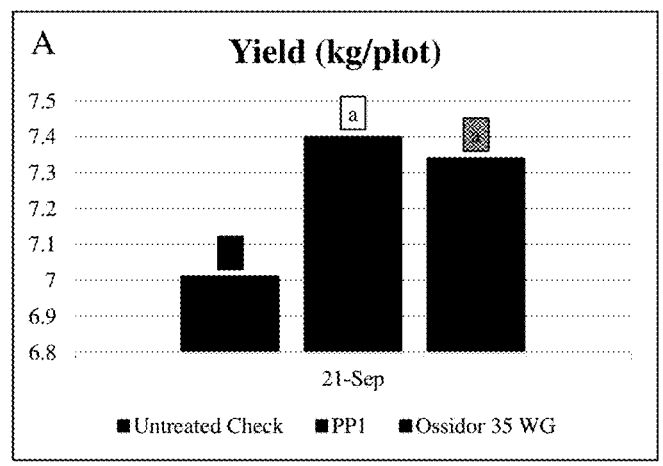

FIGS. 37 and 38: Evaluation of the yield

FIG. 37: Evaluation of the yield in kg/plot

FIG. 38: Evaluation of the weight of unmarketable husks.

Data were analyzed using ANOVA techniques within the research database software Agriculture Research Manager (ARM) version 2018.3. Where this implied statistically significant differences this was followed by Student-Newman-Keuls test, for significant difference at the 95% confidence level. Where two means share the same alphabetical notation, they are not significantly different.

As seen previously, PP1 is able to significantly eliminate *Xanthomonas arboricola* symptoms on leaves and on husks in infected walnut. But PP1 also allows walnuts to reinvest their energy in fruit production, increasing their yield and reducing the weight/number of fruits that are unmarketable due to the potential presence of disease symptoms on the husks.

Crop Selectivity Assessments

The application of the tested product did not cause any symptom of phytotoxicity (Table 27) on common walnut of variety 'Chandler' during the whole trial period and no problems emerged in handling the experimental products.

TABLE 27

Evaluation of phytotoxicity

| Date/ Treatments | 1: UNT Check | 2: PP1 2 N | 3: Ossiclor 35 WG |
|---|---|---|---|
| Jun. 29, 2018 | 0.0 a | 0.0 a | 0.0 a |
| Jul. 13, 2018 | 0.0 a | 0.0 a | 0.0 a |
| Jul. 19, 2018 | 0.0 a | 0.0 a | 0.0 a |
| Jul. 27, 2018 | 0.0 a | 0.0 a | 0.0 a |
| Aug. 15, 2018 | 0.0 a | 0.0 a | 0.0 a |
| Aug. 30, 2018 | 0.0 a | 0.0 a | 0.0 a |
| Sep. 13, 2018 | 0.0 a | 0.0 a | 0.0 a |
| Sep. 21, 2018 | 0.0 a | 0.0 a | 0.0 a |

Conclusions

PP1 is able to significantly eliminate *Xanthomonas arboricola* pv *Juglandis* symptoms in infected common walnut. Indeed, after treatments with PP1, allows a reduction in the

TABLE 28

Evaluation of area infected on leaves (PESSEV)

| | Jun-15 | Jun-26 | Jul-13 | Jul-19 | Jul-27 | Aug-15 | Aug-30 | Sep-13 |
|---|---|---|---|---|---|---|---|---|
| Untreated Check | 0.09 a | 0.09 a | 0.19 a | 0.2 a | 0.24 a | 0.42 a | 0.61 a | 0.54 a |
| PP1 | 0.06 a | 0.09 a | 0.17 a | 0.14 a | 0.17 b | 0.25 b | 0.26 c | 0.33 b |
| Ossidor 35 WG | 0.06 a | 0.1 a | 0.18 a | 0.18 a | 0.2 ab | 0.28 b | 0.37 b | 0.45 ab |

TABLE 29

Evaluation of the number of leaves infected on 100 leaves per plot (PESINC)

| | Jun-15 | Jun-29 | Jul-13 | Jul-19 | Jul-27 | Aug-15 | Aug-30 | Sep-13 |
|---|---|---|---|---|---|---|---|---|
| Untreated Check | 9.3 a | 8.1 a | 16.3 a | 15.4 a | 17.7 a | 28.7 a | 43.4 a | 38.9 a |
| PP1 | 6.3 a | 7.7 a | 13.9 a | 11.6 a | 13.3 b | 18.1 b | 22.7 b | 25.4 b |
| Ossidor 35 WG | 6.4 a | 8.1 a | 14.7 a | 13.1 a | 14.3 b | 18.9 b | 21.3 b | 28.7 b |

TABLE 30

Evaluation of area infected on husks (PESSEV)

| | Jun-15 | Jun-29 | Jul-13 | Jul-19 | Jul-27 | Aug-15 | Aug-30 | Sep-13 |
|---|---|---|---|---|---|---|---|---|
| Untreated Check | 0.7 a | 0.8 a | 1 a | 2 a | 2.2 a | 4.2 a | 6.7 a | 7 a |
| PP1 | 0.5 a | 0.8 a | 0.8 a | 1.3 a | 1.5 a | 2.3 b | 3.2 b | 3.2 b |
| Ossidor 35 WG | 0.6 a | 0.8 a | 1.1 a | 1.5 a | 1.9 a | 3.1 ab | 3.3 b | 3.8 b |

TABLE 31

Evaluation of the number of husks infected on 100 husks per plot (PESINC)

| | Jun-15 | Jun-29 | Jul-13 | Jul-19 | Jul-27 | Aug-15 | Aug-30 | Sep-13 |
|---|---|---|---|---|---|---|---|---|
| Untreated Check | 11.1 a | 12.7 a | 10.4 a | 16.3 a | 18.7 a | 32.9 a | 42.3 a | 45.4 a |
| PP1 | 7.3 a | 13.3 a | 9.7 a | 14 a | 16.6 a | 25 b | 32.7 b | 31.4 b |
| Ossidor 35 WG | 9.6 a | 13.4 a | 11.6 a | 13.7 | 17.9 a | 27.4 ab | 31.6 b | 37.1 b |

TABLE 32

Evaluation of the yield (kg/plot)

| | Sep. 21, 2018 |
|---|---|
| Untreated Check | 7.01 a |
| PP1 | 7.4 a |
| Ossidor 35 WG | 7.34 a |

TABLE 33

Evaluation of the weight of unmarketable husks

| | Sep. 21, 2018 |
|---|---|
| Untreated Check | 1.23 a |
| PP1 | 0.67 b |
| Ossidor 35 WG | 0.75 b |

2019—Trial Powdery Mildew on Rosa with a GEP Certified Company

Introduction/Problematic (See Also Example 13 Above)

The rose is one of the most popular flowering ornamental plants in the world. Imports of fresh cut roses into the European Union (EU) from third countries (extra-EU trade) increased from E563 million to E692 million between 2014 and 2017 and are expected to increase further in the future.

Powdery mildew is probably one of the most common and widespread diseases in greenhouse plants. This disease is responsible for significant economic losses in many greenhouse floricultural crops, especially roses. Infections do not usually cause plant death but they significantly reduce the esthetics and value of roses, making them unmarketable.

PP1 has the effect to support the plant defense mechanisms. Preliminary results have shown a prevent effect at tested crops attacked by phytopathogenic fungi. As a result, PP1 was tested against the major fungi attacking cut flowers (Downy mildew, powdery mildew, and botrytis). The target crop is Rosa, because of the high-quality standard. Moreover, the annual economic loss in a powdery mildew susceptible Rosa cultivar (reduced yield, increasing labor is significant.

This trial was carried out in 2018 in a greenhouse in Hazerswoude-Dorp in the Netherlands.

Experimental Conditions

Plant Material

A rose is a woody perennial flowering plant of the genus Rosa, in the family Rosaceae, or the flower it bears. There are over three hundred species and thousands of cultivars. They form a group of plants that can be erect shrubs, climbing, or trailing, with stems that are often armed with sharp prickles. Flowers vary in size and shape and are usually large and showy, in colours ranging from white through yellows and reds. For this trial, the rose of the variety "The fairy" has been selected.

Design of the Trial

For this trial, the rose of the variety "The fairy" has been selected. These plants were planted in 2 L pots on Apr. 5, 2018. 15 plants/m² are distributed in greenhouses according to the plan of FIG. 39 (Design of the trial).

The experimental product was applied 5 times, the chemical benchmark 3 times. Benchmark product conform restrictions of intended use which are: 4 applications/year and 21 days interval between treatments. The list of treatments is presented in Table 34.

TABLE 34

List of treatments

| N° of treatment | Type | Treatment Name | Concentration | Rate | Application | Interval between applications |
|---|---|---|---|---|---|---|
| 1 | CHK | Not treated | — | — | — | — |
| 2 | FUNG | Reference/ a.i fluopyram | — | — | 3 | 21 days |
| 3 | FUNG | PP1 | 2N | — | 7 | 15 days |

A total of 5 foliar applications were carried out, with an interval of 15 days between each application (Table 35). All treatments were applied with pressed air belt sprayer with a volume of 1000 l/ha.

TABLE 35

Schedule of treatments with PP1

| Treatment | A | B | C | D | E |
|---|---|---|---|---|---|
| PP1 | Mar. 13, 2018 | Mar. 24, 2018 | May 5, 2018 | May 16, 2018 | May 29, 2018 |
| Reference | Mar. 13, 2018 | May 5, 2018 | May 29, 2018 | — | — |

Two efficacy assessments were conducted. The assessments involved the evaluation of the following parameters:

Phytotoxicity: 0% no phytotoxicity, 100% severe phytotoxicity, plants dead). In case of phytotoxicity the symptoms are described and digital photographs are made.

Efficacy: at random 50 leaves per plot selected and presence and coverage of powdery mildew is assessed conform a 0-5 scaling range Results 1. Evaluation of Phytotoxicity No phytotoxic reactions of the crop related to the treatments and applications is reported.

2. Efficacy Results

The start of the trial was proper and no infection of powdery mildew was reported. After 10 days a significant number of leaves was infected with mildew at all strategies.

The most excessive infection is reported at the 3rd of May at the untreated strategy (See FIGS. 40 and 41). Powdery mildew spots are assessed at 31 percent of the leaves. At this date, the infection of powdery mildew is reduced to 18 percent at the reference strategy and at 13.2 percent for the PP1 strategy.

As a result, we can observe when there is a high infestation, the PP1 product allows a significant reduction in disease that is generally equivalent to the commercial reference.

FIGS. 40 and 41: Means frequency and intensity of disease

Data were analyzed using ANOVA techniques. Where two means share the same alphabetical notation, they are not significantly different.

However, we can observe that compared to the untreated roses, a significant reduction of powdery mildew is achieved at the roses which are treated with the experimental product. Indeed, only after two applications and a 10/11 days interval with the experimental product the reduction of mildew is significant.

Conclusions

PP1 is able to permanently limit the effects and symptoms of the disease associated with *Sphaerotheca pannosa* on artificially inoculated roses. Indeed, the surface of the leaves and stems shows no or very few symptoms of oidium infection.

PP1 effectively stimulates the plant's defense mechanisms against *Sphaerotheca pannosa* and therefore prevents the development of the disease in the plant and limits the spread of the disease, and reverses the kinetics of this epidemic which has not yet encountered any obstacles.

Annex 4: Data Table—Trial Powdery Mildew on Rosa (with the Company DELPHY-A2018001 S4U-515055)

TABLE 36

Data on Disease frequency

| | March 13 | March 24 | May 3 | May 16 | May 28 |
|---|---|---|---|---|---|
| Untreated | 0 a | 14 a | 31.2 a | 24 a | 22 a |
| Reference | 0 a | 5.2 b | 18 a | 2.8b | 1.6 b |
| PP1 | 0 a | 7.6 a | 13.2 b | 6.8b | 6.8 c |

TABLE 37

Data on disease intensity

| | Mar. 13, 2018 | Mar. 24, 2018 | May 3, 2018 | May 16, 2018 | May 28, 2018 |
|---|---|---|---|---|---|
| Untreated | 0 a | 0.82 a | 1.7 a | 1.84 a | 1.82 a |
| Reference | 0 a | 0.3 b | 0.94 a | 0.18 b | 0.1 b |
| PP1 | 0 a | 0.38 a | 0.66 b | 0.36 b | 0.46 c |

Trial *Plasmopara viticola* on Grapevine (with a Private Winegrower-2019)

Introduction/Problematic

The grapevine is the most widely cultivated and economically important fruit species worldwide. Downy mildew produced by *Plasmopara viticola*, which occurs throughout the world's vineyard, is one of the most destructive of all grapevine diseases. This disease causes significant damage each year and requires treatments with several fungicides during the season.

In organic farming, copper is the only product effective against this pathogen accepted under European organic farming regulation EC 889/2008. Recently, due to its high environmental impact, the use of copper in organic farming has been limited by legislation its use will probably be even more restricted in the future. We must note that copper is an active substance candidate to substitution at the European level.

In view of the problem with *Plasmopara viticola* and the urgent need to find an effective natural solution, the efficacy of PP1 was tested in open field with a private winegrower. PP1 was tested at one concentration and compared to the standard Mikal (mixture of Folpet and Fosetyl).

This trial was conducted in 2019 in open field with a private winegrower, located in Fouzilhon in south of France.

Experimental Conditions

Plant material

Vineyard of "Grenache noir"

Protocol

The trial aimed to model the efficacy of PP1 against *Plasmopara viticola*. The experimental product was tested and compared to a chemical reference called Mikal (mixture of Folpet and Fosetyl). Nine foliar treatments were performed with an interval of 10-11 days between each treatment. The parameters evaluated in the trial are the frequency and intensity of the disease.

Results

Please find below in FIG. 42, the results of the assessment of the incidence of attack on leaves and bunches as well as the severity of the disease on leaves and bunches.

FIG. 42: Evaluation of incidence and severity of the disease

We can observe that for the two parameters evaluated we have a decrease in disease symptoms when grapevine is treated with PP1. In addition, we can observe that PP1 is equivalent to the commercial reference.

Conclusions

As a result, PP1 is able to significantly eliminate the effects caused by *Plasmopara viticola*. PP1 is an alternative solution to the pesticides used excessively against this serious disease. Indeed, the intensive and inappropriate use of plant protection products to limit the transmission and spread of diseases has serious consequences by changing ecological and environmental balances. PP1 is an environmentally and life-friendly product that is effective in preventing the devastating effects of this disease that is becoming unavoidable today.

Annex 5. Data Table—Trial *Plasmopara viticola* on Grapevine (with a Private Winegrower-2019)

TABLE 38

Data on intensity disease on leaf

| Date/Treatments | 1: UNT Check | 2: PP1 | 3: Reference |
|---|---|---|---|
| Aug. 26, 2019 | 58 a | 19 b | 11 c |

TABLE 39

Data on severity disease on leaf

| Date/Treatments | 1: UNT Check | 2: PP1 | 3: Reference |
|---|---|---|---|
| Aug. 26, 2019 | 30 a | 5 b | 5 b |

TABLE 40

Data on intensity disease on bunch

| Date/Treatments | 1: UNT Check | 2: PP1 | 3: Reference |
|---|---|---|---|
| Aug. 26, 2019 | 25 a | 10 b | 8 b |

TABLE 41

Data on severity disease on bunch

| Date/Treatments | 1: UNT Check | 2: PP1 | 3: Reference |
|---|---|---|---|
| Aug. 26, 2019 | 45 a | 5 b | 5 b |

The following experimental study was performed by Dr. Jean-Luc Montillet, Direction de la Recherche Fondamentale, BIAM, Biosciences and Biotechnologies, Institute of Aix-Marseille, CEA de Cadarache, St Paul Lez Durance.

It relates to investigation of PP1 impact on defense of Arabidopsis against pathogens It aims to investigate the ability of PP1 preparation to stimulate, on the plant model Arabidopsis, a panoply of defenses against pathogens. In an attempt to carry out this specific task we have planed several approaches that are summarized hereafter.

GUS Reporter System

The first one because of its easy implementation have already been set up and consists to treat with PP1 preparation, transgenic Arabidopsis plants, carrying genetic constructs where a peculiar gene promoter to analyze is fused to the reporter gene named GUS (β-glucuronidase). A blue staining appears on plant tissues every time the gene of interest is activated by PP1. Besides some genes related to defense of plants against microorganisms we are intending as well to investigate different hormonal pathways which could be activated by this preparation. The experiment reported below is an example of this approach.

Impact of PP1 on the plant/pathogen interaction: Arabidopsis thaliana/*Pseudomonas syringae* pv tomato DC3000

Wild type plants Col0 of Arabidopsis are susceptible to infection with the strain DC3000 of the bacterium *Pseudomanas syringae* pv tomato. FIG. 43 shows typical symptoms of chlorosis and necrosis 4 days after inoculation of 9 week-old plants with an inoculum dose of $5 \cdot 10^7$ cfu·mL$^{-1}$. On the basis of these observations we have planed to pre-treated plants with PP1 in order to study potential impacts on outcome of the interaction.

Gene reprogramming analysis by NGS-RNA-seq in Arabidopsis in response to PP1.

Next-generation sequencing technologies not only enable detections and evaluations of alternative gene spliced transcripts, post-transcriptional modifications, gene fusions, mutations but also make accessing easier to study of changes in gene expression over time, or else in different groups or treatments. We chose of making use of this approach to evaluate impact of PP1 on gene expression as a whole. This way, we will be able to evaluate ability of the preparation to activate various sets of genes (particular emphasis will be put on defense-related genes) or to potentiate this gene reprogramming after bacterial infection. Knowledge gained in task #2 will be exploited to only consider both pertinent time points and conditions.

Results

As mentioned above, the results reported below relies on the GUS reporter system.

Briefly, Arabidopsis plantlets were grown in Petri dishes on agar gel containing Murashige and Skoog salt mixture under «short day» light regime (8 h at 22° C. and a light intensity of 180 µE·m$^{-2}$·s$^{-1}$/16 h at 18° C. in the dark). Plantlets aged of 19 days were treated by three successive sprays (for a total of approximately 20 µL solution on each plant) of either PP1 solution diluted 10 times in water or of water. Plantlets were then sampled at different time points and histochemical staining was performed at 37° C. using 5-bromo-4-chloro-3-indolyl glucuronide (X-Gluc) as substrate of the expressed β-glucuronidase. Appearance of blue staining on plant tissues reveals activation of the promoter of the gene of interest and so expression of the latter in response to the treatment.

PP1 activates expression of gene encoding the transcription factor AtWRKY29 which controls immunity and resistance in Arabidopsis It is now well documented that innate immune system in plants is based on the perception of pathogen or microbial-associated molecular patterns (PAMPs/MAMs) or microbial effector proteins. The recognition of PAMPs (such as flagellin 22, flg22, a small conserved 22-residue peptide of bacterial flagellin of *Pseudomonas*) by plant cell surface pattern recognition receptors (PRRs) triggers a complex network of intracellular signaling cascades which lead to a series of defense responses known as PAMP-triggered immunity or PTI (see FIG. 44). It is now generally accepted that this mechanism consists of the first line of defense reaction in plants (Prado et al., 2018).

The transgenic line of Arabidopsis bearing the following construct: promoter of WRKY29 fused with GUS gene (Prom WRKY29::GUS) was kindly provided by Prof. Dr. Paul Schulze-Lefert, (Max Planck Institute for Plant Breeding Research Department of Plant Microbe Interactions Köln, Germany) and used to test ability of PP1 to trigger defense of the plants.

This experiment has been carried out according to the protocol described above.

Activity of WRKY29 Promoter in Response to PP1 and flg22

Immediately after spraying of PP1 on the transgenic plantlets (t0), very faint staining only on few roots could be observed, reflecting a very low constitutive activity of WRKY29 promoter (See FIG. 45). However, 1 h post treatment, staining was more intense and affected a larger number of roots. Additionally, blue spots were also visible on leaves. A comparable observation was made 5 and 24 h after spraying PP1 or in response to the PAMP of Pst, 1 µM flg22, used as positive control.

Conclusion

These data clearly indicate that PP1 activates transcription of WRKY29 gene. This activation not only shows ability of PP1 to induce early defense-related genes, but also strongly suggests its potential to limit pathogen infection and to prime plants against future attacks.

Endogenous phytohormones such as salicylic acid (SA), jasmonic acid (JA) and ethylene (ET), should also be produced in response to PP1, contributing so to plant immunity. Perspectives of this work will address identification of hormonal actors SA or JA/ET actively committed to PP1-induced defense.

Evaluation of the effect of a product on the growth of six microbial strains. Bacteria: *Burkholderia cepacia, Pseudomonas cichorii, Pseudomonas fluorescens*. Moulds: *Alternaria alternata, Aspergillus brasiliensis, Aureobasidium melanogenum* (former *A. pullulans*)

Tests carried out from Jun. 1, 2018 to Jun. 11, 2018

Samples:

PP1 ready for use

Summary:

Under laboratory conditions, after 3 and 7 days of contact, the PP1 sample did not show any toxic effect on the strains studied, and it even seems, for some strains, to promote their development.

Experimental Conditions

Operating Modes:

Internal: M-BP-MO001, M-BP-MO005

European Pharmacopoeia—9th edition § 5.1.3. Effectiveness of antimicrobial conservation Culture Media and Reagents

| DESCRIPTION | BATCH NUMBER |
| --- | --- |
| TSA agar (Tryptic Soy Agar) | G0265W/180528 H0089W/180605 |
| Sabouraud agar | 1364/180524-180605 |

Equipments:

| DESCRIPTION | CODIFICATION |
| --- | --- |
| Micropipette | MAT-072/MAT-073/MAT-085/MAT-086/MAT-087 |
| Microbiological Safety Station | MAT-004/MAT-065 |
| Oven | MAT-009/MAT-088/MAT-089 |

Analysts: Ms. Manuela Bros and Ms. Emilie Sauvat Operators

Approved: Mr. Thierry Lacour, Study Director

Evaluation of the effect of a product on the growth of 6 microbial strains

The protocol followed is based on the European Pharmacopoeia—9th edition § 5.1.3.

Effectiveness of Antimicrobial Conservation.

The sample is filtered at 0.22 μm and stored in a cool place before use.

The strains studied are detailed in the table below showing compositions of inocula

| Microorganism | Reference | Microorganism | Reference |
| --- | --- | --- | --- |
| Bacteria | | Yeast/Mould | |
| Burkholderia cepacia | DSM 7288 | Alternaria alternata | DSM 62010 |
| Pseudomonas cichorii | DSM 50259 | Aspergillus brasiliensis | DSM 1988 |
| Pseudomonas fluorescens | DSM 50090 | Aureobasidium melanogenum | DSM 2404 |

For each strain, an inoculum at $10^4$-$10^6$ CFU/ml is contacted with the product for 3 and 7 days at 22° C.±2° C. Physiological water (NaCl 9 g/l) is subjected to the same treatment as a control.

In order to quantify the contamination at each measuring time, a count is carried out by spreading decimal dilutions on the surface or in mass from 0.1 ml of sample on the following media:

TSA (Tryptic Soy Agar) agar for bacterial enumeration (incubation: 2-5 days at 30° C.±2° C.) Sabouraud agar for mould enumeration (incubation: 3-7 days at 23° C.±2° C.).

The results are expressed in "colony-forming unit" per millilitre (CFU/ml).

This analytical method can detect contamination from 10 CFU/ml (detection limit).

Contamination less than 10 CFU/ml (<10) will not be detected.

Results

Number of Viable Microorganisms (CFU/ml) at Different Contact Times

| | Product | t = 0 | t = 3 days | t = 7 days |
| --- | --- | --- | --- | --- |
| Bacteries strain | | | | |
| Burkholderia cepacia | NaCl 9/l | $1.6\ 10^6$ | $3.1\ 10^6$ | $9.7\ 10^5$ |
| | PP1 | $1.1\ 10^6$ | $6.0\ 10^7$ | $5.0\ 10^7$ |
| Pseudomonas cichorii | NaCl 9/l | $6.0\ 10^5$ | $1.1\ 10^5$ | $1.5\ 10^5$ |
| | PP1 | $4.2\ 10^5$ | $5.7\ 10^6$ | $1.1\ 10^7$ |
| Pseudomonas fluorescens | NaCl 9/l | $1.6\ 10^6$ | $2.1\ 10^6$ | $2.5\ 10^6$ |
| | PP1 | $9.4\ 10^5$ | $2.7\ 10^7$ | $3.2\ 10^7$ |
| Mould strain | | | | |
| Alternaria alternata | NaCl 9/l | $1.5\ 10^4$ | $1.0\ 10^3$ | $2.2\ 10^2$ |
| | PP1 | $5.0\ 10^4$ | $6.0\ 10^2$ | $2.0\ 10^3$ |
| Aureobasidium melanogenum | NaCl 9/l | $9.5\ 10^4$ | $2.1\ 10^4$ | $6.5\ 10^4$ |
| | PP1 | $6.6\ 10^4$ | $8.8\ 10^4$ | $5.4\ 10^5$ |
| Aspergillus brasiliensis | NaCl 9/l | $8.6\ 10^4$ | $1.2\ 10^4$ | $3.3\ 10^4$ |
| | PP1 | $7.6\ 10^4$ | $2.1\ 10^4$ | $8.6\ 10^4$ |

See graphical representations on FIGS. 46 to 51.

Conclusion:

With regard to bacteria, the same behaviour is observed for all three strains (*B. cepacia, P. cichorii, P. fluorescens*).

There is a maintenance of populations in physiological water and an increase in contact with the PP1 sample.

As far as moulds are concerned,

For *A. alternata*, populations decrease over time in physiological water and in the PP1 sample.

For *A. melanogenum*, the population is maintained in physiological water and increased in the PP1 sample.

For *A. brasiliensis*, there is a slight decrease in the population in physiological water and a retention in the PP1 sample.

However, it should be noted that the results for moulds are to be qualified due to the formation of filaments that make the count less accurate than for bacteria.

BIBLIOGRAPHY

Aires, A., Mota, V. R., Saavedra, M. J., Rosa, E. A. & Bennett, R. N. (2009). The antimicrobial effects of glucosinolates and their respective enzymatic hydrolysis products on bacteria isolated from the human intestinal tract. J Appl Microbiol 106, 2086-2095.

Arora R., Sharma D., Kumar R., Singh B., Vig A. P., Arora S. (2014) Evaluating extraction conditions of glucosinolate hydrolytic products from seeds of *Eruca sativa* (Mill.) Thell. using GC-MS. Journal of Food Science.; 79(10) C1964-9.

Beattie, G. A., (2011). Water relations in the interaction of foliar bacterial pathogens with plants. Annu. Rev. Phytopathol. 49, 533-555.

Berne, S. & Javornik, B. (2016). In Abiotic and Biotic Stress in Plants-Recent Advances and Future Perspectives (eds Shanker, A. K. & Shanker, C.) Ch. 18 (In Tech, Rijeka).

Bones A. M., Rossiter J. T. (1996) The myrosinase-glucosinolate system, its organization and biochemistry, Physiol. Plantarum 97, 194-208.

Bones A. M., Rossiter J. T. (2006) The enzymic and chemically induced decomposition of glucosinolates, Phytochemistry 67, 1053-1067.

Bones, A. M. and J. T. Rossiter (1996) The myrosinase-glucosinolate system, its organisation and biochemistry. Physiol. Plantarum 97: 194-208.

Bones, A. M. and J. T. Rossiter (2006) The enzymic and chemically induced decomposition of glucosinolates. Phytochemistry 67: 1053-1067.

Choat, B., Gambetta, G. A., Wada, H., Shackel, K. A. & Matthews, M. A., (2009). The effects of Pierce's disease on leaf and petiole hydraulic conductance in *Vitis vinifera* cv. Chardonnay. Physiol. Plant 136, 384-394.

Daugherty, M., Lopes, J. S., and Almeida, R. P., (2010). Strain-specific alfalfa water stress induced by *Xyella fastidiosa*. Eur. J. Plant Pathol. 127, 333-340.

Dufour V, Stahl M, Baysse C. (2015) The antibacterial properties of isothiocyanates. Microbiology 161, 229-243. (doi:10.1099/mic.0.082362-0).

Dufour V., Stahl M., Baysse C. The antibacterial properties of isothiocyanates. Microbiology. 2015; 161:229-243. doi: 10.1099/mic.0.082362-0.

Fahey J. W., Zacmann A. T., Talalay P. (2001) The chemical diversity and distribution of glucosinolates and isothiocyanates among plants, Phytochemistry 56, 5-51.

Fenwick, G. R., R. K. Heaney and W. J. Mullin (1983) Glucosinolate and their breakdown products in food and plants. Crit. Rev. Food Sci. Nutr. 18: 123-201.

Fradin, E. F., and Thomma, B. P. H. J. (2006). Physiology and molecular aspects of *Verticillium* wilt diseases caused by *V. dahliae* and *V. alboatrum*. Mol. Plant Pathol. 7, 71-86.

Ganin, H., Rayo, J., Amara, N., Levy, N., Krief, P. & Meijler, M. M. (2013). Sulforaphane and erucin, natural isothiocyanates from broccoli, inhibit bacterial quorum sensing. Med Chem Comm 4, 175-179.

Halkier B A, Gershenzon J (2006) Biology and biochemistry of glucosinolates. Annu Rev Plant Biol 57:303-333. doi: 10.1146/annurev.arplant.57.032905.105228.

Hilaire, E. et al. Vascular defense responses in rice: peroxidase accumulation in xylem parenchyma cells and xylem wall thickening. Mol. Plant Microbe Interact. 14, 1411-1419 (2001).

J. W. Fahey, K. K. Stephenson, K. L. Wade, P. Talalay, (2013). Urease from Helicobacter pylori is inactivated by sulforaphane and other isothiocyanates. Biochem. Biophys. Res. Commun. 435 1-7.

Klosterman, S. J., Atallah, Z. K., Vallad, G. E., and Subbarao, K. V. (2009). Diversity, pathogenicity, and management of *Verticillium* species. Annu. Rev. Phytopathol. 47, 39-61.

Koubaa M., Driss D., Bouazi F., Ghorbel R. E., Chaabouni S. E. (2015) Antioxidant and antimicrobial activities of solvent extract obtained from rocket (*Eruca sativa* L.) flowers. Free Radicals and Antioxydants. 5, 29-34.

Lazzeri L, Tacconi R, Palmieri S, 1993. In vitro activity of some glucosinolates and their reaction products toward a population of the nematode Heterodera schachtii. Journal of Agricultural and Food Chemistry 41, 825-9.

Lazzeri L, Leoni O, Manici L, Palmieri S, Patalano G (2004) Use of seed flour as soil pesticide. Patent WO 2004 017739 A1

Lord J S, Lazzeri L, Atkinson H J, Urwin P E. (2011) Biofumigation for control of pale potato cyst nematodes: activity of Brassica leaf extracts and green manures on Globodera pallida in vitro and in soil. J Agric Food Chem.; 59(14):7882-7890. doi: 10.1021/jf200925k.

Manici L M, Lazzeri L, Palmieri S. In vitro fungitoxic activity of some glucosinolates and their enzyme-derived products toward plant pathogenic fungi. Agric Food Chem. 1997; 45:2768-2773.

Müller C., Sieling N. (2006) Effects of glucosinolate and myrosinase levels in Brassica juncea on a glucosinolate-sequestering herbivore and vice versa, Chemoecology 16, 191-201.

Ngala B M, Haydock P P, Woods S, Back M A. (2015) Biofumigation with Brassica juncea, Raphanus sativus and *Eruca sativa* for the management of field populations of the potato cyst nematode Globodera pallida. Pest Manag Sci.; 71(5):759-769. doi: 10.1002/ps.3849.

Pérez-Donoso A. G., Greve L. C., Walton J. H., Shackel K. A., Labavitch J. M. (2007). *Xylella fastidiosa* infection and ethylene exposure result in xylem and water movement disruption in grapevine shoots. Plant Physiol 143: 1024-1036.

Ramirez-Prado J S, Abulfaraj A A, Rayapuram N, Benhamed M4, Hirt H. Trends Plant Sci. 2018 September; 23(9):833-844. Plant Immunity: From Signaling to Epigenetic Control of Defense.

Rapicavoli J. N., Blanco-Ulate B., Muszynski A., Figueroa-Balderas R., Morales-Cruz A., Azadi P., Dobruchowska J. M., Castro C., Cantu D., M. Caroline Roper M. C., (2018). Lipopolysaccharide O-antigen delays plant innate immune recognition of *Xylella fastidiosa* Nature Communications volume 9, Article number: 390, doi:10.1038/s41467-018-02861-5.

Rask L., Andreasson E., Ekbom B., Eriksson S., Pontoppidan B., Meijer J. (2000) Myrosinase: gene family evolution and herbivore defence in Brassicaceae, Plant Mol. Biol. 42, 93-113.

Rep, M. et al. Mass spectrometric identification of isoforms of PR proteins in xylem sap of fungus-infected tomato. Plant Physiol. 130, 904-917 (2002).

Riga E., Pierce F., and Collins H. P., (2006), Performance of arugula (*Eruca sativa*) as a green manure and trap crop for fungal pathogens and parasitic nematode suppression in potato, American Phytopathological Society Abstracts, pp: 96-97

Riga E. (2011) The effects of Brassica green manures on plant parasitic and free living nematodes used in combination with reduced rates of synthetic nematicides. Journal of nematology 45(2) 119-121.

Solana M., Boschiero I, Dall'Acqua S, Bertucco (2014) Extraction of Bioactive enriched fractions from *Eruca sativa* leaves by supercritical CO2 technology using different co-solvents (2014) The journal of Supercritical fluids. 94, 245-251

Sun, Q., Sun, Y., Walker, M. A. & Labavitch, J. M. Vascular occlusions in grapevines with Pierce's disease make disease symptom development worse. Plant Physiol. 161, 1529-1541 (2013).

Textor, S. and Gershenzon, J. (2009) Herbivore induction of the glucosinolate-myrosinase defense system: major trends, biochemical bases and ecological significance. Phytochem Rev. 8: 149-170.

Tong-Xian Liu, Le Kang, ed. (2011). Recent Advances in Entomological Research: From Molecular Biology to Pest Management. Springer. p. 38. ISBN 9783642178153.

Wittstock U., Agerbirk N., Stauber E. J., Olsen C. E., Hippler M., Mitchell-Oids T., Gershenzon J., Vogel H. (2004) Successful herbivore attack due to metabolic diversion of a plant chemical defense, Proc. Natl Acad. Sci. (USA) 101, 4859-4864.

Wittstock, U., Gershenzon, J., (2002). Constitutive plant toxins and their role in defense against herbivores and pathogens. Curr. Opin. Plant Biol. 5 300-307.

Yadeta, K. A. & Bart, P. H. The xylem as battleground for plant hosts and vascular wilt pathogens. Front Plant Sci. 4, 97 (2013).

The invention claimed is:

1. A method for stimulating the defenses of a plant or tree against an infection of bacterium or fungus, comprising the application on said plant or said tree of an aqueous extract from at least leaves of a Rocket plant, wherein the application on the plant or tree is achieved by foliar spray.

2. The method of claim 1, wherein said Rocket plant is selected from the following genera: *Eruca, Diplotaxis, Bunias, Erucastrum*, and *Cakile*.

3. The method of claim 2, wherein said Rocket plant is selected from: *Eruca sativa, Eruca vesicaria, Diplotaxis erucoides, Diplotaxis tenuifolia, Diplotaxis muralis, Bunias erucago, Bunias orientalis, Erucastrum nasturtiifolium*, and *Erucastrum incanum*.

4. The method of claim 2, wherein said plant to which the extract is applied is a cultivated plant.

5. The method of claim 1, wherein said bacterium or fungus is selected from:

*Xylella fastidiosa* bacteria on myrtle-leaf milkwort, grape vines, olive trees, citrus trees, oleander, almond trees, coffee trees, peach trees and stone fruit trees, oak trees, lavender, rosemary, or broom,

*Pseudomonas syringae* pv *actinidiae* bacteria on plants of the *Actinidia* genus,

*Xantomonas arboricola* pv *juglandis* bacteria on walnut trees,

*Xanthomonas arboricola* pv. *Pruni* bacteria on *Prunus* spp.,

Pear Decline Phytoplasma bacteria,

*Candidatus Phytoplasma pyri* on pear trees,

*Candidatus Phytoplasma solani* bacteria on grape vines, lavender, potato plants, tomato plants, aubergine plants, pepper plants and tobacco plants,

*Plasmapora viticola* fungus on grape vines,

*Phytophtora infestans* on potato plants and tomato plants,

*Phytophtora citrophtora* on citrus trees,

*Phytophtora cactorum* on pear trees and apple trees,

*Bremia lactucae* on artichokes,

*Podosphaera pannosa* on rose bushes,
*Erysiphe necator*, formerly known as *Uncinula necator*, on grape vines, and
oidia on tomato plants, lettuces, cucumbers, strawberry plants, raspberry plants, currant bushes, peach trees, pear trees, privet, carnations.

6. The method of claim 1, wherein said bacteria is *Xylella fastidiosa* and said plant or tree is selected from myrtle-leaf milkwort, grape vines, olive trees, citrus trees, oleander, almond trees, coffee trees, peach trees and stone fruit trees, oak trees, lavender, rosemary, and broom.

7. The method of claim 1, wherein the application on the plant or tree is achieved with a dilution of the composition in water between 2 g/L and 150 g/L expressed in grams of plants on which the extraction was carried out per liter of product.

8. The method of claim 1, wherein the application on the plant or tree is achieved with a dilution of the composition in water between 5 g/L and 70 g/L expressed in grams of plants on which the extraction was carried out per liter of product.

9. The method of claim 1, wherein said extract of at least leaves of the Rocket plant is an aqueous extract of Rocket plants obtained from ground material of said Rocket plants, and the method to obtain said aqueous extract comprises:

a) grinding said Rocket plants in an aqueous medium;
b) filtering the ground material obtained; and
c) recovering the liquid extract of Rocket plants obtained after filtering.

10. The method of claim 9, wherein said extract of at least leaves of the Rocket plant is an aqueous extract of Rocket of the *Eruca sativa* species.

11. The method of claim 9, wherein said extract of at least leaves of the Rocket plant is an aqueous extract of Rocket of the *Diplotaxis* genus.

12. The method of claim 11, wherein said extract of at least leaves of the Rocket plant is an aqueous extract of Rocket of the *Diplotaxis tenuifolia* species.

13. The method of claim 9, wherein said extract of at least leaves of the Rocket plant includes at least 75% of dry Rocket leaves by weight, relative to the total dry weight of rocket, before grinding in the aqueous medium.

14. The method of claim 9, wherein the method to obtain said aqueous extract further comprises, after recovering the liquid extract, drying the liquid extract to obtain a composition formulated in the form of powder, soluble powder, wettable powder, granules, dispersible granules, wettable granules or slow-diffusion granules.

15. The method of claim 14, wherein the composition formulated in the form of powder, soluble powder, wettable powder, granules, dispersible granules, wettable granules or slow-diffusion granules, is diluted in water at the time of application on the plant or tree.

16. The method of claim 1, wherein the aqueous extract from at least leaves of a Rocket plant comprises no Erucin or comprises Erucin having a concentration less than a detection limit, when analyzed by Gas Chromatography/Mass Spectrometry.

17. A method for inducing production of at least one of jasmonic acid, salicylic acid and peroxidases in a plant or tree, comprising the application on said plant or said tree of a dried aqueous extract from at least leaves of a Rocket plant, wherein the application on the plant or tree is achieved by foliar spray.

18. The method of claim 17, wherein the dried aqueous extract from at least leaves of a Rocket plant comprises no Erucin or comprises Erucin having a concentration less than a detection limit, when analyzed by Gas Chromatography/Mass Spectrometry.

19. The method of claim 17, wherein the dried aqueous extract from at least leaves of a Rocket plant comprises molecules inducing, in the plant or tree, a cascade of defense reactions against pathogenic agent, wherein said molecules exhibit no direct antibacterial or antifungal effect.

20. A method for stimulating the defenses of a plant or tree, wherein the plant or tree is diseased due to a pathogenic bacterium or fungus, comprising the application on said plant or said tree of an aqueous extract from at least leaves of a Rocket plant, wherein the application on the plant or tree is achieved by foliar spray.

* * * * *